United States Patent
Patterson et al.

(10) Patent No.: US 8,321,328 B2
(45) Date of Patent: Nov. 27, 2012

(54) ELECTRONIC CREDIT DEFAULT FUTURES MARKET

(75) Inventors: David G. Patterson, Toronto (CA); Annie Theriault, Oakville (CA); John T. Rickard, Larkspur, CO (US)

(73) Assignee: Exchange Holdings Inc., Toronto (CA)

( * ) Notice: Subject to any disclaimer, the term of this patent is extended or adjusted under 35 U.S.C. 154(b) by 0 days.

(21) Appl. No.: 12/783,485

(22) Filed: May 19, 2010

(65) Prior Publication Data

US 2011/0087580 A1    Apr. 14, 2011

Related U.S. Application Data

(63) Continuation-in-part of application No. 12/186,321, filed on Aug. 5, 2008, now Pat. No. 7,970,670.

(51) Int. Cl.
*G06Q 40/00* (2012.01)

(52) U.S. Cl. ............... 705/37; 705/35; 705/36 R

(58) Field of Classification Search ......... 705/37, 705/35, 36 R
See application file for complete search history.

(56) References Cited

U.S. PATENT DOCUMENTS

| | | | |
|---|---|---|---|
| 5,978,779 A * | 11/1999 | Stein et al. | 705/37 |
| 6,105,005 A * | 8/2000 | Fuhrer | 705/35 |
| 6,317,727 B1 | 11/2001 | May | |
| 7,246,093 B1 | 7/2007 | Katz | |
| 7,272,580 B2 | 9/2007 | Brady et al. | |
| 7,333,950 B2 | 2/2008 | Shidler et al. | |
| 7,467,112 B2 | 12/2008 | Frankel | |
| 7,533,054 B2 | 5/2009 | Hausman et al. | |
| 7,587,355 B2 | 9/2009 | Hirani et al. | |
| 7,702,563 B2 | 4/2010 | Balson et al. | |
| 2002/0147670 A1 | 10/2002 | Lange | |
| 2003/0028476 A1 | 2/2003 | Jenkins et al. | |
| 2003/0061148 A1 | 3/2003 | Alavian | |
| 2003/0236738 A1 * | 12/2003 | Lange et al. | 705/37 |
| 2005/0080734 A1 | 4/2005 | Lynch et al. | |
| 2005/0114256 A1 | 5/2005 | Booth et al. | |
| 2005/0149428 A1 | 7/2005 | Gooch et al. | |
| 2006/0106707 A1 | 5/2006 | Shetty et al. | |
| 2006/0224491 A1 * | 10/2006 | Pinkava | 705/37 |
| 2006/0253368 A1 | 11/2006 | O'Callahan et al. | |
| 2006/0253369 A1 | 11/2006 | O'Callahan | |

(Continued)

FOREIGN PATENT DOCUMENTS

WO    WO 01/88820    11/2001

(Continued)

OTHER PUBLICATIONS

Notice of Allowance for U.S. Appl. No. 12/186,321, mail date Feb. 23, 2011, 8 pages.

(Continued)

*Primary Examiner* — Olabode Akintola
(74) *Attorney, Agent, or Firm* — Foley & Lardner LLP

(57) ABSTRACT

Systems and methods are provided for providing a credit default futures market. A system providing the credit default futures market includes a processor, memory and an interface. The interface is configured to display credit default futures contracts that subscribe to a set of standard terms and conditions. The processor is configured to settle certain credit futures contracts in kind and other in cash, depending on, at least in part, the maturity date of the futures contract. A method is presented for electronically clearing and settling probability of default futures contracts.

46 Claims, 13 Drawing Sheets

U.S. PATENT DOCUMENTS

| | | | |
|---|---|---|---|
| 2006/0271452 A1 | 11/2006 | Sparaggis | |
| 2007/0083447 A1 | 4/2007 | Corcoran et al. | |
| 2007/0106583 A1 | 5/2007 | Hiatt et al. | |
| 2007/0162373 A1 | 7/2007 | Kongtcheu | |
| 2007/0239576 A1 | 10/2007 | Hirani et al. | |
| 2008/0010183 A1 | 1/2008 | Holmes et al. | |
| 2008/0033863 A1 | 2/2008 | Simons et al. | |
| 2008/0082436 A1 | 4/2008 | Shalen et al. | |
| 2008/0082437 A1 | 4/2008 | Co et al. | |
| 2008/0103961 A1 | 5/2008 | Ramani et al. | |
| 2008/0120249 A1 | 5/2008 | Hiatt | |
| 2008/0162373 A1* | 7/2008 | Adler et al. | 705/36 R |
| 2008/0195519 A1 | 8/2008 | Stevens | |
| 2008/0195553 A1* | 8/2008 | Umlauf | 705/36 R |
| 2008/0215430 A1 | 9/2008 | Ellis et al. | |
| 2009/0012892 A1 | 1/2009 | Biase | |
| 2009/0187504 A1 | 7/2009 | Monaco | |
| 2009/0210338 A1 | 8/2009 | Hor et al. | |
| 2010/0036757 A1 | 2/2010 | Patterson et al. | |
| 2010/0125517 A1 | 5/2010 | Jacob et al. | |
| 2010/0125518 A1 | 5/2010 | Jaffrey | |
| 2010/0153254 A1 | 6/2010 | Shalen | |
| 2010/0191639 A1 | 7/2010 | Johnson et al. | |
| 2010/0223175 A1 | 9/2010 | Miglis et al. | |
| 2010/0223201 A1 | 9/2010 | Callaway et al. | |
| 2010/0268665 A1 | 10/2010 | Lutnick et al. | |

FOREIGN PATENT DOCUMENTS

WO    WO 02/19223 A1    3/2002

OTHER PUBLICATIONS

Arora, Recovery Risk, Moody's Corporation & NYU Stern School of Business, 5th Annual Credit Risk Conference, May 15, 2008, 20 pages.

CME Group, Interest Rate Products, Eurodollar Futures, Eurodollar futures allow you to hedge fluctuations in short-term U.S. interest rates, 2009, 2 pages, CME Group Inc., Chicago.

CME Memo, Exhibit A and Attachments C, D, E, F, Jun. 5, 2007, 51 pages.

CME Memo, Exhibits B & C, Jan. 31, 2007, 52 pages.

Cookbook of CBOE Credit Event Binary Options (CEBO), Single-Name and Basket Options, 2007, 17 pages, Chicago Board Options Exchange, Incorporated.

International Monetary Fund: Global Financial Stability Report Containing Systemic Risks and Restoring Financial Soundness, Published Apr. 2008 [online], 211 pages, retrieved in Nov. 2009 at capitalism.net/Documents_files/imf%20report%202008.pdf.

International Search Report and Written Opinion for International Application No. PCT/US09/052711, mail date Feb. 23, 2010, 8 pages.

iTraxx, Eurex Credit Futures, 2007, 34 pages.

JP Morgan, Corporate Quantitative Research, Credit Derivatives Handbook, Dec. 2006 (Parts 1 and 2), 179 pages.

Office Action for U.S. Appl. No. 12/186,321, mail date Jul. 15, 2010, 9 pages.

Rowan, Moody's Rating Methodology, Probability of Default Ratings and Loss Given Default Assessments for Non-Financial Speculative-Grade Corporate Obligors in the United States and Canada, Aug. 2006, 16 pages, Moody's Investors Service, Inc.

Amendment and Reply for U.S. Appl. No. 12/186,321, mail date Jan. 14, 2011, 27 pages.

Communication for European Application No. 09805441.4, mail date Apr. 19, 2011, 2 pages.

Response to Communication for European Application No. 09805441.4, mail date May 6, 2011, 6 pages.

European Search Report for Application No. 11166782.0, mail date Nov. 17, 2011, 6 pages.

International Preliminary Report for Application No. PCT/US2009/052711, mail date Feb. 17, 2011, 7 pages.

* cited by examiner

ELECTRONIC CREDIT DEFAULT FUTURES MARKET

CROSS REFERENCE TO RELATED APPLICATION

The present application is a continuation in part of and claims priority to U.S. patent application Ser. No. 12/186,321 entitled ELECTRONIC CREDIT DEFAULT FUTURES MARKET, filed Aug. 5, 2008. The entire contents of which is hereby incorporated by reference in its entirety.

BACKGROUND

1. Field of Invention

Aspects of the present inventions relate to methods and systems useful for electronic brokerage services and, more particularly, to methods and systems for providing an electronic market for futures contracts and associated instruments.

2. Discussion of Related Art

Buyers and sellers of various financial instruments currently transact business within a variety of established markets. Some of these established markets are over the counter markets that operate using voice or electronic communication among trading desks, some are traditional, brick and mortar exchanges with a trading floor, and others are virtual, electronic exchanges.

A particular example of an over the counter market is the current market for credit default swaps (CDSs) and other related instruments such as fixed recovery CDS and recovery locks (also referred to as recovery default swaps (RDS)). A credit default swap is a contract between a buyer and a seller which shifts the financial risk that a reference entity may experience a credit default event from the buyer to the seller. In exchange for assuming this risk, the seller receives some form of consideration from the buyer, such as periodic cash payments or the combination of an upfront cash payment and standardized periodic cash payments. In addition to the default risk, the seller of CDS also has exposure to the recovery rate of the underlying bond since the loss on default will depend on the amount recovered for the bond. Fixed recovery CDS shift some of this risk back to the buyer of the CDS as they function exactly like ordinary CDS with the exception of having a fixed recovery rate that is a pre-specified percent of notional negotiated by the counterparties at inception. The seller's obligation in a CDS, whether it is a regular CDS or a fixed recovery CDS, is triggered if the reference entity defaults on a credit obligation, such as by entering bankruptcy.

A recovery lock is an over-the-counter instrument that allows traders to lock-in or speculate on the recovery rate on the obligations of a corporation or government entity upon the occurrence of a credit event. Upon the occurrence of a credit event, either the buyer or the seller will have an obligation to pay its counterparty, depending on the difference between the realized and fixed recovery rate. Typically, recovery locks are structured such that no consideration is paid by either party at any point during the term of the contract if the reference entity does not experience a credit event.

Along with the three above mentioned over the counter credit derivatives that consist the foundation of the over the counter credit derivatives market, this market includes many other financial instruments. Thus, the current over the counter credit derivatives market provides sundry instruments for executing financial tactics such as hedging and speculation.

Public markets also offer similar instruments or have attempted to do so in the past. In particular, these products include the CME credit event futures, the CBOE credit event binary option and the Eurex credit futures. The CME credit event futures are not currently offered for trading. They were futures contracts that allowed the transfer of credit risk from buyer to seller on a futures exchange without any consideration transferred from buyer to seller at the outset of the trade. The gain or loss was made based on the starting and final settlement price of the futures contract, which was a function of both the state of the reference entity and the recovery rate on the debt of the underlying reference entity. The CBOE credit event binary options are option contracts that allow buyers to obtain protection in the event of a default by the reference entity or defaults by a basket of reference entities in exchange for the upfront payment of a premium. Upon the occurrence of one or more defaults, the contracts are automatically exercised and provide a pre-determined cash payoff to the buyer. Similar options are also offered on a basket of reference entities, with payoffs occurring either upon each occurrence or at expiration based on the default history of the basket of reference entities. Lastly, the credit futures traded on the Eurex are index futures linked to iTraxx®. The final settlement value of these contracts are determined by the number of names contained in the index, the default status of the reference entities are determined by the ISDA® rules and the ISDA® committee.

Together, these contracts provide some publically traded instruments to move credit risk among participants on an exchange facility.

There are related markets for the transfer of natural catastrophe risk, where the final value of the instrument or the payoff in the case of an option structure depend on the occurrence of natural catastrophes such as hurricanes, earth quakes and floods. Examples of such markets include the over the counter markets for insurance or reinsurance swaps, catastrophe bonds (CAT bonds) and industry loss warrants (ILWs) and the traditional electronic market for insurance futures.

The over the counter markets for insurance or reinsurance swaps, CAT bonds and ILWs function like the market for CDS and related products. Insurance or reinsurance swaps are contracts between a buyer and a seller that shift the financial risk from the buyer to the seller in the event of the occurrence of a natural catastrophe, as defined in the contract. In some cases, the mere occurrence of the event is not the trigger, but rather payment from the seller to the buyer may depend on the losses incurred as a result of the event breaching a certain threshold. In exchange for assuming this risk, the seller receives some form of consideration from the buyer, such as periodic cash payments. Catastrophe bonds are financial instruments where a buyer of the bond, an investor, lends funds to the seller, typically an insurance company, in exchange for periodic interest payments. In the event of a default and, in some cases in the event that the losses realized by the seller meets certain criteria such as exceeding a threshold, the seller only returns a portion of the principal, if any remains after the amount defined in the debenture is retained. CAT bonds are also traded in the secondary market after they are issued. ILWs are options on natural disasters. In exchange for a premium, a buyer receives the right to a pre-defined payoff in the event that a natural disaster causes a pre-specified amount of industry loss. There are many variations on the exact terms and triggers of these over the counter insurance products that allow market participant to receive tailored or generic hedges and to speculate on events.

Insurance futures are traded on exchanges such as the Insurance Futures Exchange, and have a binary settlement value determined by the occurrence of a natural catastrophe. The final settlement value may also depend on the level of industry losses caused by the natural catastrophe. For example, the Florida Hurricane contracts traded on the Insurance Futures Exchange settle at 100, in the event of a Florida hurricane causing more than $US 20 Billion in industry losses. Otherwise, if either no events occur or if the event does not cause more than $US 20 Billion in industry losses, the contract settles at 0.

SUMMARY

According to one embodiment, a method for exchanging credit futures and bond recovery rate contracts is provided. The method includes acts of receiving a first trade order requesting a long position on a probability of default (POD™) futures contract or bond recovery rate (REC) futures contract, the POD™ futures or the REC futures having a reference entity, a maturity date and a settlement value at the maturity date based at least in part on the solvency of the reference entity for both types of futures and also on the realized recovery rate for the REC futures in the event of a default for the reference entity, receiving a second trade order requesting a short position on the POD™ futures or REC, futures matching the first trade order with the second trade order and recording, on a computer readable storage medium, a completed transaction, the completed transaction indicating the first trade order and the second trade order.

In the method, the act of receiving the first trade order may include an act of receiving the first trade order from a first party, and the method may further include an act of determining whether the first party has sufficient resources to meet a margin requirement for the position requested in the first trade order. Moreover, the act of receiving the first trade order may include an act of receiving the first trade order from a first party and the act of receiving the second trade order may include an act of receiving the second trade order from a second party. The method may further include an act of recording a clearing house as a counterparty to both the first party and the second party.

The method may further include an act of settling the POD™ futures to zero or any other fixed amount, including a value near zero, when the reference entity is insolvent at the maturity date. Additionally, the method may include an act of settling the POD™ futures to face value when the reference entity is solvent at the maturity date. Similarly, the method may include an act of settling the REC futures to zero, or any other fixed amount, including a value near zero, when the reference entity is solvent at the maturity date and an act of settling the REC futures to the realized bond recovery rate value when the reference entity is insolvent at the maturity date, the realized recovery rate being determined either from public sources such as a public auction or by a survey of market participants. Moreover, the method may include an act of settling the POD™ futures or the REC futures in kind at a time prior to the maturity date. The act of settling the POD™ futures or the REC futures in kind may include an act of settling the POD™ futures or REC futures in kind based at least in part on a comparison between the maturity date and an identified date. More particularly, the act of settling the POD™ futures or REC futures in kind may include an act of settling the POD™ futures or REC futures in kind when a difference between the maturity date and the identified date is 3 years, or some other arbitrary time period.

In the method, the act of settling the POD™ futures or REC futures in kind may also include settling the POD™ futures or REC futures into a series of POD™ futures or REC futures contracts, each of the series of POD™ futures or REC futures contracts having a reference entity, a maturity date and a settlement value at the maturity date based at least in part on solvency of the reference entity for both types of futures and also on the realized recovery rate for the REC futures in the event of a default for the reference entity, none of the series of POD™ futures or REC futures contracts sharing a common maturity date. The act of settling the POD™ futures or REC futures into the series of POD™ futures or REC futures contracts may include an act of settling the POD™ futures or REC futures into a series of POD™ futures or REC futures contracts with each of the series of POD™ futures or REC futures contracts having a shorter time to maturity than the contract exchanged, for example settling an annual maturity contract into a series of quarterly maturity date contracts. Further, the method may include an act of settling each of the series of POD™ futures subsequent to one of the series of POD™ futures when the one of the series of POD™ futures settles to zero or any other fixed value, including a value near zero. Similarly for REC futures, the method may include an act of settling each of the series of REC futures subsequent to one of the series of REC futures when one of the series of REC futures settles to the realized recovery rate.

According to another embodiment, another method for exchanging futures contracts is provided. The method includes acts of recording, on a computer readable storage medium, a completed transaction including at least one first trade order, at least one second trade order and clearing the completed transaction using a clearing house. In the method, the act of recording may include an act of recording at least one first trade order that requests a long position on a series of futures contracts, each of the series of futures contact having at least one of reference entity and a settlement value at a maturity date, the settlement value at the maturity date being based at least in part on solvency of at least one reference entity and also on the realized bond recovery rate for the REC futures in the event of a default for the reference entity, none of the series of futures contracts sharing a common maturity date. Furthermore, the act of recording may include an act of recording at least one second trade order that requests a short position on the series of futures contracts.

In the method, the act of recording, on a computer readable storage medium, a completed transaction may include an act of recording at least one first trade order requesting a long position on a series of POD™ futures or REC futures contracts. Furthermore, the act of recording, on a computer readable storage medium, a completed transaction may include an act of recording a long position on a series of probability of default index futures contracts or recovery index futures contracts. In addition, the act of recording, on a computer readable storage medium, a completed transaction may include an act of recording a long position on a series of probability of default index tranche futures contracts or on a series of recovery index tranche futures.

According to another embodiment, another method for exchanging futures contracts is provided. The method includes acts of receiving at least one first trade order requesting a long position on a futures contract, the futures contract having a binary reference event, a maturity date and a settlement value at the maturity date, the binary reference event having two possible outcomes and the settlement value at the maturity date being based at least in part on which of the two possible outcomes occurs with a time period ending at the maturity date and also potentially being based on the value of a random variable contingent on the occurrence of one of states of the reference event, receiving at least one second trade order requesting a short position on the series of futures contracts, matching at least one first trade order with at least one second trade order and recording, on a computer readable storage medium, a completed transaction indicating at least one first trade order and indicating at least one second trade order. The method may further include an act of settling subsequent futures contracts of the series after one of the two possible outcomes occurs.

According to another embodiment, a computer readable medium comprising computer readable instructions that, as a result of being executed by a processor, instruct the processor to perform a method is provided. The method executed by the processor includes acts of receiving a first trade order requesting a long position on a POD™ futures contract or REC futures, the POD™ futures and the REC futures having a reference entity, a maturity date and a settlement value at the maturity date based at least in part on solvency of the reference entity and the REC futures having a settlement value also being based at least in part on the realized bond recovery rate for the REC futures in the event of a default for the reference entity, receiving a second trade order requesting a short position on the POD™ futures, matching the first trade order with the second trade order and recording, on a computer readable storage medium, a completed transaction, the completed transaction indicating the first trade order and the second trade order.

According to another embodiment, a system providing a credit futures contract and REC futures exchange is provided. The system includes an order interface configured to receive trade requests for positions on a futures contract, the POD™ futures and the REC futures having at least one reference entity, a maturity date and a settlement value at the maturity date based at least in part on solvency of at least one reference entity and the REC futures having a settlement value also being based at least in part on the realized bond recovery rate for the REC futures in the event of a default for the reference entity, a portion of the trade requests being offsetting trade requests, an auction engine configured to match the offsetting trade requests and store the offsetting trade requests as completed transactions and a settlement engine configured to settle at least a portion of the completed transactions. In the system, the futures contract may include at least one of a POD™ futures, a REC futures, a probability of default index futures contract and a probability of default index tranche futures contract.

According to another embodiment, a method for exchanging an index of credit futures contracts or an index of bond recovery rate contracts or an index of a combination of credit futures contracts and bond recovery rate futures contracts is provided. The method includes acts of receiving a first trade order requesting a long position on one of the index contracts, the index having a settlement value based at least in part on a plurality of POD™ futures or REC futures contracts or a combination of POD™ futures and REC futures contracts, receiving a second trade order requesting a short position on the index, matching the first trade order with the second trade order and recording, on a computer readable storage medium, a completed transaction, the completed transaction indicating the first trade order and the second trade order.

The method may further include an act of settling the index in kind at a time prior to a maturity date of the index. In the method, the act of the index in kind comprises settling the index in kind based at least in part on a comparison between the maturity date and an identified date. Moreover, the act of settling the index in kind may include an act of settling the index in kind when a difference between the maturity date and the identified date is 3 years, or some other arbitrary time period. Additionally, the act of settling the index in kind may include an act of settling the index into a series of index contracts, each of the series of index contracts having a settlement value based at least in part on a plurality of POD™ futures or REC futures contracts or a combination of POD™ futures and REC futures contracts, none of the series of index contracts sharing a common maturity date. Furthermore, the act of settling the index into the series of index contracts may include an act of settling the index into a series of index contracts, each of the series of index contracts having a quarterly maturity date. The method may also include an act of settling each of the series of index contracts subsequent to one of the series of index contracts when one of the series of index contracts settles to zero for an index of POD™ futures or when one of the series of index contracts experiences sufficient defaults to cause all of its members to be settled early for an index of REC futures.

According to another embodiment, a method for exchanging a tranche in an index of credit futures contracts or an index of bond recovery rate futures contracts or an index of a combination of credit futures contracts and bond recovery rate futures contracts is provided. The method includes acts of receiving a first trade order requesting a long position on the tranche, the tranche having a settlement value based at least in part on a settlement value of the index, receiving a second trade order requesting a short position on the tranche, matching the first trade order with the second trade order and recording, on a computer readable storage medium, a completed transaction, the completed transaction indicating the first trade order and the second trade order.

The method may further include an act of settling the tranche in kind at a time prior to a maturity date of the tranche. In the method, the act of settling the tranche in kind may include an act of settling the tranche in kind based at least in part on a comparison between the maturity date and an identified date. Further, the act of settling the tranche in kind may include an act of settling the tranche in kind when a difference between the maturity date and the identified date is 3 years, or some other arbitrary time period. Additionally, the act of settling the tranche in kind may include an act of settling the tranche into a series of tranche contracts, each of the series of tranche contracts having a settlement value based at least in part on the settlement value of the index, none of the series of tranche contracts sharing a common maturity date. Moreover, the act of settling the tranche into the series of tranche contracts may include an act of settling the tranche into a series of tranche contracts, each of the series of tranche contracts having a quarterly maturity date. The method may also include an act of settling each of the series of tranche contracts subsequent to one of the series of tranche contracts when the one of the series of tranche contracts settles to zero or to another fixed value, which may be close to zero, for an index of POD™ futures or when one of the series of index contracts experiences sufficient defaults to cause all of its members to be settled early for an index of REC futures or an index of a combination of POD™ futures and REC futures contracts.

According to another embodiment, another method for exchanging a series of futures contracts is provided. The method includes acts of receiving a first trade order requesting a long position on at least one of the series of futures contracts, the series of futures contracts having a risk period substantially equivalent to a risk period of a previously traded futures contract, each of the series of futures contracts having a maturity date, none of the series of futures contracts sharing a common maturity date, receiving a second trade order requesting a short position on at least one of the series of futures contracts, matching the first trade order with the second trade order and recording, on a computer readable storage medium, a completed transaction, the completed transaction indicating the first trade order and the second trade order. In the method, the act of receiving a first trade order may include an act of receiving a first trade order requesting a long position on at least one of the series of futures contracts, each of the series of futures contracts having a quarterly maturity date.

According to another embodiment, another method for exchanging a series of futures contracts is provided. The method includes acts of receiving a first trade order requesting a long position on one of the series of POD™ futures contract, receiving a second trade order requesting a long position on at least one of the series of REC futures, both futures having substantially the same risk period and the same underlying name, matching the first trade order with the second trade order and recording, on a computer readable storage medium, a completed transaction, the completed transaction indicating the first trade order and the second trade order. In the method, the act of receiving a first trade order may include an act of receiving a first trade order requesting a long position on at least one of the series of futures contracts, each of the series of futures contracts having a quarterly maturity date. Similarly, the method may be applied to the case where short positions are taken for both the REC futures and the POD™ futures.

According to another embodiment, another method for exchanging a series of futures contracts is provided. The method includes acts of receiving a first trade order requesting a long position on one index of credit futures contract, receiving a second trade order requesting a long position on at least one index of bond recovery rate futures contracts, both futures having substantially the same risk period and the same reference entities, matching the first trade order with the second trade order and recording, on a computer readable storage medium, a completed transaction, the completed transaction indicating the first trade order and the second trade order. In the method, the act of receiving a first trade order may include an act of receiving a first trade order requesting a long position on at least one of the series of futures contracts, each of the series of futures contracts having a quarterly maturity date. Similarly, the method may be applied to the case where short positions are taken for both the index of credit futures and the index of REC futures.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

The accompanying drawings are not intended to be drawn to scale. In the drawings, each identical or nearly identical component that is illustrated in various FIGS. is represented by a like numeral. For purposes of clarity, not every component may be labeled in every drawing. In the drawings.

Figure 1A:
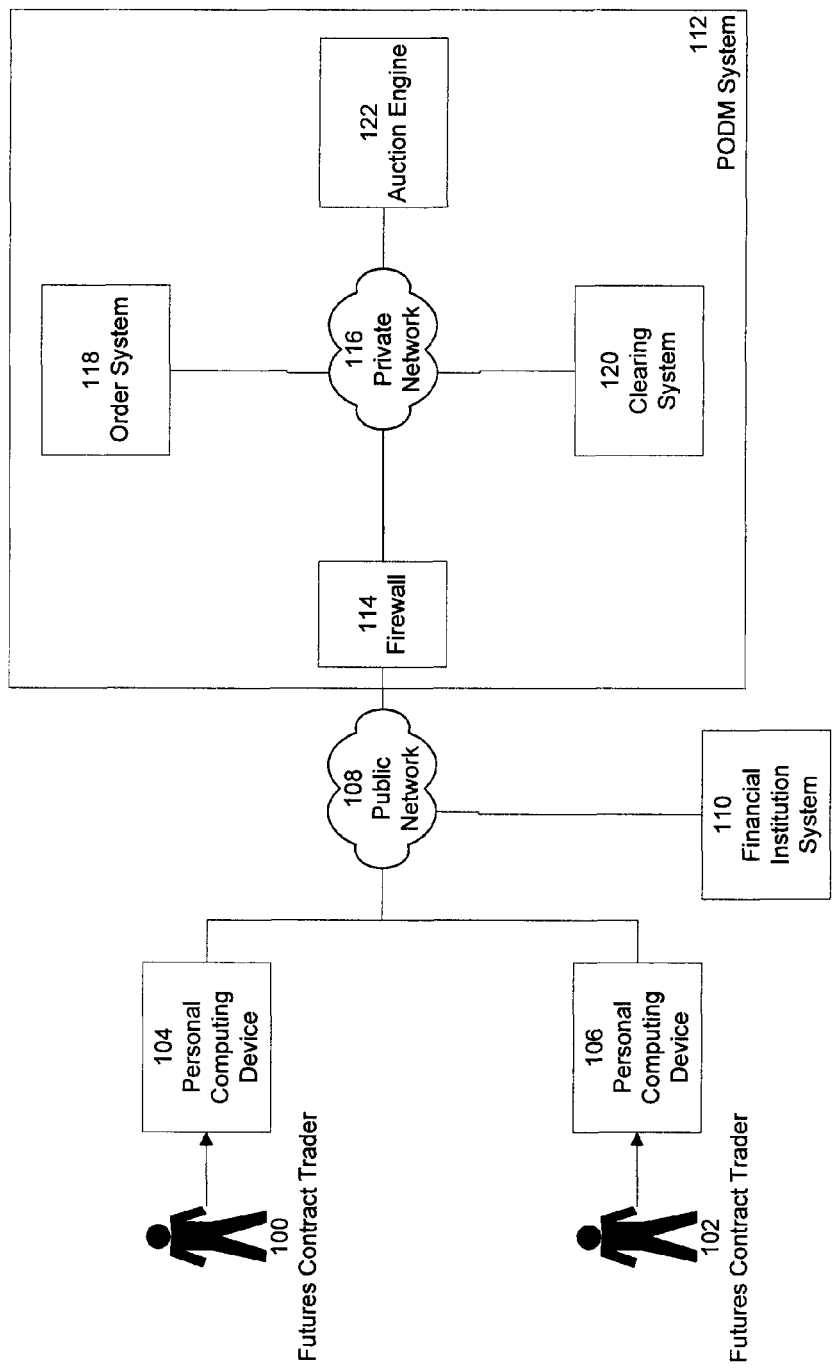
FIG. 1A is a block diagram of one example of a network environment that includes a POD™ futures contract market system.

It will be recognized that some or all of the FIGS. are schematic representations for purposes of illustration and do not necessarily depict the actual relative sizes or locations of the elements shown. The FIGS. are provided for the purpose of illustrating one or more embodiments with the explicit understanding that they will not be used to limit the scope or the meaning of the claims.

DETAILED DESCRIPTION

As discussed below, aspects and embodiments disclosed herein provide for a probability of default futures contract market (PODM) system and methods that allow investors to trade credit and bond recovery rate based futures contracts. The formulation of useful systems and methods for managing these transactions is impacted by the unique manner in which a PODM system may be structured and organized. The credit based futures contracts may include probability of default (POD™) futures contracts, which may be standardized in order to ease usage in a PODM system, and futures contracts derived from POD™ futures, such as POD™ indexes futures and POD™ index tranche futures. The bond recovery rate based futures contracts may include the recovery rate (REC) futures contracts, which may be standardized in order to ease usage in a PODM system, futures contracts derived from REC futures, such as REC index futures and REC index tranche futures, and futures derived from combinations of POD™ futures and REC futures contracts. Each of these credit futures contracts may have specialized attributes that may make each suited for one or more particular investment tactics, such as speculation or hedging, in the context of a system built for PODM.

According to certain aspects of the present invention, a facility is provided for trading of futures contracts with a settlement value based at least in part on a binary reference event or on the combination of a binary reference event and the value of a random variable when one of the two potential outcomes occurs. A binary reference event may be an event that is defined such that the event has only two potential outcomes. As one example, a binary reference event may be an event that occurs or does not occur within a specified time frame. In some embodiments, a random variable may be defined as any variable that determines the final price of the futures contract and that is not pre-determined prior to the occurrence or non-occurrence of the binary event. More particularly, according to certain aspects, a facility allowing for the trading of credit default futures and bond recovery rate futures is provided. Various embodiments related to the provision of these services can address or permit a variety of advantages to allow trading these interests. For example, one embodiment provides for the trading of standardized POD™ futures and other futures contracts based thereon and for the trading of standardized REC futures and other futures contracts based thereon. As is discussed further below, POD™ futures and REC futures contracts allow market participants to financially express their views on the likelihood of default of a given reference entity over a specified period of time and the REC futures also allow market participants to financially express their views on the bond recovery rate in the event of a default of a given reference entity over a specific period of time. Certain other embodiments are directed toward systems and methods for providing an electronic PODM system. A PODM system may use software and hardware to provide buyers and sellers of credit futures contracts and bond recovery rate futures contracts a virtual exchange in which to transact trades. The PODM system may include methods and facilities to match trade requests, monitor investor positions and report information related to those positions to interested entities. The PODM may also include a clearing house function that provides a well established counterparty to market participants.

For instance, the PODM system may provide an order request interface to both buyers and sellers. This order interface may be used by the buyers and sellers to post trade requests on the PODM system. The PODM system may match offsetting order requests and consummate transactions based on the matched orders. Additionally, the PODM system may provide a facility for a market maker to provide bids and offers in the market, thereby enhancing liquidity for other market participants. Also, a clearing house function may insert a clearing house as the buyer to every seller and as the seller to every buyer. Consequently, in regards to clearing and settlement, both of the original parties to the contract may be, in fact, dealing with the central counterparty, with consideration and performance flowing appropriately between all three parties according to the rights and obligations of the contract.

Furthermore, the PODM system may maintain near real-time indications of the current trading prices, such as bid prices and ask prices, of various instruments, such as POD™ futures, options and indexes. The PODM system may also maintain an accounting of investor positions and may report this accounting through various interfaces to external entities, such as users or other systems, or may take other actions depending upon the PODM system configuration. For instance, the PODM system may expose user and system interfaces to summarized market data. This market data may include trading volumes, futures contract prices and the market's view on the probability of default of various reference entities. This information may be provided to external entities, by the administrator of the PODM system, in exchange for a fee.

The aspects disclosed herein, which are in accord with the present invention, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Standard Form of Probability of Default Futures Contracts

According to one embodiment, a standard form of contract may be provided for specification of a credit default futures contract. One example of certain terms for a credit default futures contract is explained with reference to Table 1a.

TABLE 1a

Contract Description $1,000,000 in face value of default exposure on a specific corporate, government, institutional or financial entity (reference entity) for a specific Risk Period, ending at 11:59 p.m. Greenwich Mean Time (GMT) on the 20th calendar day of the Settlement Month.
A Reference Entity will be declared to be in default if a Credit Event has occurred as defined in section 4.1. of the 2003 Credit Derivatives Definitions where section 4.2. (Bankruptcy) and section 4.5. (Failure to Pay) shall only apply.
Contract Name "[Entity name] probability of default (POD ™) futures"
Final Settlement Price Contracts will settle with a final settlement price of zero (0) if there has been a Credit Event or at one hundred (100) if there has been no Credit Events. Since the contract size is $1,000,000 the price will be multiplied by $10,000 to obtain the value of the contract.

TABLE 1a-continued

Tick Size

Minimum price fluctuations will be .01. A tick of .01 will represent $100 of value.
Multiplier $10,000
Contracts Listed Contracts expiring quarterly for three years: March, June, September, December;
and contracts expiring annually for 7 additional years: December ("Settlement Month")
Risk Period 1. Quarterly Contracts
A period of one quarter beginning at 12:00 am (GMT) on the 21st calendar day of
the month that is 3 months before the Settlement Month and ending at 11:59 pm (GMT)
on the 20th calendar day of the Settlement Month.
2. Annual Contracts
A period of one year beginning at 12:00 am (GMT) on the 21st calendar day of the
month that is 12 months before the Settlement Month and ending at 11:59 pm (GMT) on
the 20th calendar day of the Settlement Month.
Last Trading Day Trading terminates upon the earlier of the Credit Event Determination Date or the
close of business on the $20^{th}$ calendar day of the Settlement Month. If the $20^{th}$ calendar
day of the Settlement Month is a non-business day, trading shall cease on the last business
day preceding the $20^{th}$ calendar day of the settlement month.
Credit Event Determination Date The Credit Event Determination Date will be the third business day following the
earlier of (a) the announcement of the occurrence of a Credit Event on the exchange's
website or (b) the 20th calendar day of the Settlement Month. The Credit Event
Determination Date may be postponed ("Postponement") by up to four additional business
days if the exchange is not satisfied of the state of the Reference Entity by 9:15 p.m.
(GMT). In the event of a Postponement, the Credit Event Determination Date will be the
Date on which a final determination is announced by the exchange.
Under special circumstances ("Special Circumstances"), the exchange may delay
the Credit Event Determination Date until a conclusive determination can be made.
Settlement Day The next business day following the Credit Event Determination Date.
Trading Hours Electronic Trading from 6:30 pm to 4:00 pm (New York time) time Sunday to
Friday. For expiring contracts last trade on the last trading day will be at 12:00 noon
(New York time).
Settlement Procedure 1. Credit Event
Upon the declaration of a Credit Event for the Reference Entity, the exchange will
post an announcement on its website. This determination is considered preliminary. Any
evidence to the contrary must be presented to the exchange by 5:00 p.m. (GMT) on the
Credit Event Determination Date. Under normal circumstances, the final determination of
the exchange shall be made by 9:15 p.m. (GMT) and a cash settlement shall occur on the
following business day if it is determined that a Credit Event did occur or if the contract
has expired. In the event of a Postponement, the final determination shall be announced
by the exchange as soon as a decision is reached and a cash settlement shall occur on the
following business day if it is determined that a Credit Event did occur or if the contract
has expired.
2. No Credit Event
If no Credit Event is declared by the exchange by the $20^{th}$ calendar day of the
Settlement Month at 11:59 p.m. (GMT), the exchange will post on its website the
determined final settlement price of the expiring contract to be one hundred (100). This
determination is considered preliminary. Any evidence to the contrary must be presented
to the exchange by 5:00 p.m. (GMT) on the Credit Event Determination Date. Under
normal circumstances, the final determination of the exchange shall be made by 9:15 p.m.
(GMT) and a cash settlement shall occur on the following business day. In the event of a
Postponement, the final determination shall be announced by the exchange as soon as a
decision is reached and a cash settlement shall occur on the following business day.
3. Special Circumstances
A ruling may be delayed if a conclusive determination cannot be made by the
seventh business day at 9:15 p.m. (GMT) following the announcement of a Credit Event.
If the contract has expired, a new contract would be issued for the purpose of position
transfer. The final determination shall be announced by the exchange as soon as a
decision is reached and a cash settlement shall occur on the close of business on the day
following the Credit Event Determination Date.
Early Settlement:

All later contracts in any series of contracts will immediately settle at 100 if any
early contract in the series settles at zero.

TABLE 1a-continued

Settlement Procedure for Annual Contracts:

Annual contracts will settle on the delivery date with three years to final maturity. They will settle in kind, with both long and short positions delivering four quarterly equivalent contracts each at the following function of the last traded price of the annual contract in question. Each quarterly contract will initially be priced at P = (price of annual contract − 100) ÷ 4) + 100.

In this example, the contract is for a credit default future in an individual credit contract, denoted as "[Entity name]" which corresponds to the entity for which a default contract is purchased. In this example, the face value is the monetary value of the settlement in the event that the entity referred in the contract does not suffer a default event (bankruptcy or insolvency) in the specified time period. In this example, the face value of the contract is $1,000,000, and in this particular example, the face value of each contract monitored for exchange by a PODM system, is the same.

In alternative embodiments, the face values may be constrained to a limited number of potential face values, e.g., two or three (although other embodiments may have more or unlimited possibilities). By constraining the face value of the contract (or other terms of the contract) to a fixed number of possibilities, the ability to establish a uniform, automated exchange facility is promoted. In other embodiments, the exchange may be structured by fixing aspects of the contract other than the face value.

In this example, another contract term that is constrained is the period for which a futures contract is made. In this example, the face value is fixed at $1,000,000 for specific periods of time (which are constrained in this example to quarterly contracts for the first three years and annual contracts for an additional seven years). If at the end of the specified period no default has occurred, the long receives and the short position pays a final settlement based on a final settlement price equal to the face value of the futures contract. On the other hand, if a default does occur in the specified time period, then the long pays and the short receives a final settlement based on a final settlement price equal to a value of zero or any other fixed value, including a value near zero. In this example, as indicated in "early settlement," if a default occurs in advance of the specified time period for a particular contract on a particular reference entity, an early settlement is triggered on these later contracts where the long position receives and the short pays a final settlement based on a final settlement price equal to the face value of those later contracts. In this embodiment, the risk associated with short term default is separated from the risk associated with a default in the longer term (assuming there is no short-term default). Thus, with this embodiment, tightness in the short term credit market may not spill over to the same degree to the long term credit market.

In other embodiments, an earlier default could result in the contract taking a final settlement value of zero or a fixed number close to zero. Also, other embodiments may manifest different relationships between defaults and obligations to pay. For example, in one embodiment, final settlement at the face value of the contract may be obliged when a reference entity defaults within a specified time period. In another embodiment, final settlement at the face value of the contract may be obliged when a reference entity defaults in a particular manner (for example, filing for bankruptcy) within a specified time period.

In other embodiments, payments may be based on events other than default and, depending on the nature of the possibility of multiple occurrences of these events, may or may not have a similar "early settlement" provision for later contracts. More specifically, embodiments in accord with the present invention may provide for contracts valued by occurrence or non-occurrence of a single occurrence event, i.e. a binary reference event, and may provide for similar "early settlement" of particular single occurrence futures contracts.

Other time periods for the futures contracts may be fixed and the face value could either be the same, or different, for different time periods. For example, a POD™ futures could be limited only to quarterly, to quarterly for some time frames and annual for others (as in the example illustrated in Table 1a), or may permit quarterly and annual (or other time frame) contracts to be placed at any particular time through the PODM.

In one embodiment, the probability of default associated with these contracts is determined by the market based on the trading price for the particular POD™ futures, and the price of the contracts is set accordingly. In this example, the pricing mechanism used by the market for these contracts may be $(100-(P \times 100))$ to two decimal places, where P is the probability of default as determined by the market for the period specified. In this example, the multiplier is $10,000 and the tick size is 0.01. Changes in contract prices may be cleared and settled daily. Thus, the profit or loss that a trader incurs on a given day of trading is based upon the change in the market's perception of the value of P at the end of that day. For example, if the $P_p$ at the end of the previous trading day was 8% and the $P_c$ at the end of the current trading day is 10% the amount of money lost by the long position (and the amount of money gained by the short position) on a $1,000,000 face value contract would be $20,000 as shown by the following calculations:

$$\$10,000 \times (100 - (P_c \times 100)) = \$10,000 \times (100 - (.10 \times 100)) = \$900,000$$

$$\$10,000 \times (100 - (P_p \times 100)) = \$10,000 \times (100 - (.08 \times 100)) = \underline{\$920,000}$$

$$(\$20,000)$$

In this embodiment, price at contract maturity may be determined in the same manner. For example, at maturity the P is either 1 or 0. Thus, where P=0 the settlement price of the contract would be:

$$\$10,000 \times (100-(0 \times 100)) = \$1,000,000$$

Similarly, were the P=1, the settlement price of the contract would be 0. Thus, the amount of money gained or lost by the long on the maturity date would be the difference between either the face value of the contract or zero and the contract price at the end of the previous day multiplied by $10,000, and the amount gained or lost by the short on the maturity date would be the difference between the contract price at the end of the previous day multiplied by $10,000 and either the face value of the contract or zero.

Since the value of P is determined by the market, in this example, in establishing the price of a contract with a face value of $1,000,000, rather than expressly agreed upon as such or set by an external entity, different entities in the market may arrive at different estimates of the value of P and, therefore, wish to enter into or exchange a credit default contract for this reason (of course, other reasons may exist for motivating a sale or purchase). Additionally, other models may be applied for determining price, e.g., the model above was linear and nonlinear models may be applied. Moreover, other factors (such as time value of money, tolerance to risk or currently held assets/positions) may be reflected in a trader determining a price point at which they are willing to enter the market.

The tick size, or smallest unit of increasing or decreasing the change of the price of a particular contract, in this example, is 0.01 and therefore corresponds to $100. Establishing a tick size can assist in facilitating the setting of prices and trading of interests.

In this example, there is a fixed time for permitting trading of futures contracts and a fixed time and mechanism identified for establishing whether a default has occurred, as illustrated in Table 1a. This permits orderly trading and administration of futures contracts and settlement of futures contracts.

As described above, in this example and for quarterly contracts, if there is no default in the time period specified in a futures contract, the settlement is in cash at a final settlement value equal to the face amount of the contract (e.g., 100 times the multiplier of $10,000 which is $1,000,000). If there is a default, the final settlement value is zero.

In this example, annual contracts may also be purchased for time periods more than three years out. These contracts could also be settled in cash at the end of the specified period, with a final settlement value equal to a face amount when there is no default occurring in the specified period as for quarterly contracts.

In an alternative embodiment, and in particular the one illustrated in Table 1a, the annual contract may instead be settled in kind (e.g., in exchange for other futures contracts) when its final maturity is within an identified period of time from the present which may be any period of time greater than the shortest risk period available. For example, when the final maturity is three years out, an annual futures contract could be converted into four quarterly futures contracts, one for each of the four quarters leading up to the final maturity date. Thus, the entire series, taken as a whole, may have the same risk period as the previously traded futures contract, e.g. one year. In this example, the face amount of the quarterly contract would be equal to the face value of the annual contract.

In an alternative embodiment, the futures contracts for time periods farther than three years out may also be maintained as separate quarterly contracts. For those periods, the PODM may require trading of contracts in blocks of four, one for each quarter of the applicable calendar year. This would achieve a similar effect, without a formal in-kind settlement of annual futures contracts into quarterly ones. In other embodiments as described above, such a restriction could be omitted and only quarterly (or some other time unit) time periods employed for all periods of time for which a futures contract may be specified.

By allowing sale of credit default futures contracts in specified time periods, an institution may hedge when considering entering into a loan transaction with a company. For example, if an institution is considering making a large loan but is concerned about a short-term default event, the institution may make the loan and sell default futures contracts to cover the risk of a short term default. Any increase from the sale price of the contracts would be the net cost of the hedging in the event no default occurs, but in the event of a default, the institution will net the decrease from sale price of the contract, which could provide a hedge in addition to covering the margin between sale price and the face values of any other futures contracts that were sold (i.e., cover the payout for those time periods where no default occurred, either before or after the actual default). Thus, this type of facility can permit institutions to continue to make long-term loans even in the face of fear of short-term default by providing a vehicle for an institution to hedge against short-term default risk.

An example of an alternative set of standard terms for a credit futures contract is given in Table 1b.

TABLE 1b

Contract Description $100,000 in face value of default exposure on a specific corporate, government, institutional or financial entity (reference entity), for a Specific Risk Period beginning from the listing date and ending at 11:59 p.m. Greenwich Mean Time (GMT) on the 20th calendar day of the Settlement Month.
A Reference Entity will be declared to be in default if a Credit Event has occurred as defined in section 4.1. of the 2003 Credit Derivatives Definitions where section 4.2. (Bankruptcy) and section 4.5. (Failure to Pay) shall only apply.
Contract Name "[Entity name] probability of default (POD ™) futures"
Final Settlement Price Contracts will settle with a final settlement price of zero (0) if there has been a Credit Event or at one hundred (100) if there has been no credit events. Since the contract size is $100,000 the price will be multiplied by $1,000 to obtain the value of the contract.
Tick Size Minimum price fluctuations will be .01. A tick of .01 will represent $10 of value.
Multiplier $1,000
Contracts Listed Contracts expiring quarterly for five years: March, June, September, December TABLE 1b-continued Risk Period A period beginning from the initial date of listing of the contract and ending at 11:59 pm (GMT) on the $20^{th}$ calendar day of the Settlement Month.

Last Trading Day

Trading terminates upon the earlier of the Credit Event Determination Date or the close of business on the $20^{th}$ calendar day of the Settlement Month. If the $20^{th}$ calendar day of the Settlement Month is a non-business day, trading shall cease on the last business day preceding the $20^{th}$ calendar day of the settlement month.

Credit Event Determination Date

The Credit Event Determination Date will be the third business day following the earlier of (a) the announcement of the occurrence of a Credit Event on the exchange's website or (b) the 20th calendar day of the Settlement Month. The Credit Event Determination Date may be postponed ("Postponement") by up to four additional business days if the exchange is not satisfied of the state of the Reference Entity by 9:15 p.m. (GMT). In the event of a Postponement, the Credit Event Determination Date will be the Date on which a final determination is announced by the exchange.
Under special circumstances ("Special Circumstances"), the exchange may delay the Credit Event Determination Date until a conclusive determination can be made.

Settlement Day

The next business day following the Credit Event Determination Date.

Trading Hours

Electronic Trading from 6:30 pm to 4:00 pm (New York time) time Sunday to Friday. For expiring contracts last trade on the last trading day will be at 12:00 noon (New York time).

Settlement Procedure

1. Credit Event
Upon the declaration of a Credit Event for the Reference Entity, the exchange will post an announcement on its website. This determination is considered preliminary. Any evidence to the contrary must be presented to the exchange by 5:00 p.m. (GMT) on the Credit Event Determination Date. Under normal circumstances, the final determination of the exchange shall be made by 9:15 p.m. (GMT) and a cash settlement shall occur on the following business day if it is determined that a Credit Event did occur or if the contract has expired. In the event of a Postponement, the final determination shall be announced by the exchange as soon as a decision is reached and a cash settlement shall occur on the following business day if it is determined that a Credit Event did occur or if the contract has expired.
2. No Credit Event
If no Credit Event is declared by the exchange by the $20^{th}$ calendar day of the Settlement Month at 11:59 p.m. (GMT), the exchange will post on its website the determined final settlement price of the expiring contract to be one hundred (100). This determination is considered preliminary. Any evidence to the contrary must be presented to the exchange by 5:00 p.m. (GMT) on the Credit Event Determination Date. Under normal circumstances, the final determination of the exchange shall be made by 9:15 p.m. (GMT) and a cash settlement shall occur on the following business day. In the event of a Postponement, the final determination shall be announced by the exchange as soon as a decision is reached and a cash settlement shall occur on the following business day.
3. Special Circumstances
A ruling may be delayed if a conclusive determination cannot be made by the seventh business day at 9:15 p.m. (GMT) following the announcement of a Credit Event. If the contract has expired, a new contract would be issued for the purpose of position transfer. The final determination shall be announced by the exchange as soon as a decision is reached and a cash settlement shall occur on the close of business on the day following the Credit Event Determination Date.

Early Settlement:

All later contracts in any series of contracts will immediately settle at 0 if the exchange determines that a Credit Event has occurred for the Reference Entity.

In this example, all contracts on a reference entity have exposure to the default of the reference entity from the first date that they are listed until the 20$^{th}$ calendar day of the settlement month of the contract. Contracts also have a smaller notional outstanding of $100,000.

Standard Form of Bond Recovery Rate Futures Contracts

According to one embodiment of the present inventions, a standard form of contract may be provided for specification of a bond recovery rate futures contract. One example of certain terms for a bond recovery rate futures contract is explained with reference to Table 2. In this example, Credit Event shall have the meaning ascribed in the contract specification of the POD™ Futures (Table 1a); Special Circumstances shall have the meaning ascribed in the contract specification of the POD™ Futures (Table 1a); and Credit Event Determination Date shall have the meaning ascribed in the contract specification of the POD™ Futures (Table 1a).

TABLE 2a

| Contract Description |
|---|
| $1,000,000 in face value linked to the recovery rate of a specific corporate, government, institutional or financial entity (reference entity) for a specific period in the event that a Credit Event occurs for the Reference Entity causing the POD ™ Futures for the Reference Entity to settle at zero(0). |
| Contract Name |
| "[Entity name] bond recovery rate (REC) futures" |
| Final Settlement Price |
| Contracts will settle at 100 × R to two decimal places, where R is the recovery rate of the Reference Entity ("Settlement Recovery Rate") and is a number from 0 to 1 inclusive. |
| Tick Size |
| Minimum price fluctuations will be .01. A tick of .01 will represent $100 of value. |
| Multiplier |
| $10,000 |
| Contracts Listed |
| Contracts expiring quarterly contracts for three years: March, June, September, December; and contracts expiring annually for 7 additional years: December ("Settlement Month") |
| Risk Period |
| 1. Quarterly Contracts<br>A period of one quarter beginning at 12:00 am (GMT) on the 21st calendar day of the month that is 3 months before the settlement month and ending at 11:59 pm (GMT) on the 20th calendar day of the Settlement Month.<br>2. Annual Contracts<br>A period of one year beginning at 12:00 am (GMT) on the 21st calendar day of the month that is 12 months before the settlement month and ending at 11:59 pm (GMT) on the 20th calendar day of the Settlement Month. |
| Recovery Rate Determination Date |
| The Recovery Rate Determination Date shall not occur any later than 45 calendar days after the 20th calendar day of the Settlement Month unless Special Circumstances ("Special Circumstances") apply.<br>1. Credit Event<br>If ISDA ® also recognizes the Credit Event for a specific Reference Entity and determines that it will have an auction, the Recovery Rate Determination Date ("Recovery Rate Determination Date") will be the date of the ISDA ® auction. If ISDA ® does not hold an auction either because it determines that it will not hold an auction, because it cancels an auction, or because it does not recognize the Credit Event, the Recovery Rate Determination Date will be the later of a) third business day following a decision by ISDA ® not to hold an auction or to cancel an auction or b) the third business day following the Credit Event Determination Date.<br>2. No Credit Event<br>If the exchange determines that no Credit Event has occurred prior to the expiration of the POD ™ Futures on the Reference Entity, the Recovery Rate Determination Date shall be the Credit Event Determination Date. |
| Last Trading Day |
| Trading terminates on the Recovery Rate Determination Date. |
| Settlement Day |
| The next business day following the Recovery Rate Determination Date. |
| Trading Hours |
| Electronic Trading from 6:30 pm to 4:00 pm (New York time) time Sunday to Friday. For expiring contracts last trade on the last trading day will be at 12:00 noon (New York time). |
| Settlement Procedure |
| The settlement of the REC Futures is dependent upon the settlement of the POD ™ Futures for the Reference Entity, whose settlement price shall be determined as described in the contract specification of the POD ™ Futures.<br>1. Credit Event<br>If it is determined that a Credit Event did occur, the exchange will post an announcement on its website detailing the anticipated settlement process. This procedure is considered preliminary. If |

TABLE 2a-continued there is an ISDA ® auction, the Settlement Recovery Rate shall be the result of the ISDA ® auction. A cash settlement shall occur on the business day following the Recovery Rate Determination Date, which shall be the date of the ISDA ® auction. If there is no ISDA ® auction, either because ISDA ® determines that it will not hold an auction or cancels an auction, or because ISDA ® does not recognize the default, the Recovery Rate shall be the average bid price for $US 50 million of bonds on the third business day following the Credit Event Determination Date, as determined by the average of five dealer quotes, excluding the highest and lowest. The result will be announced by 9:15 p.m. (GMT) on the Recovery Rate Determination Date. A cash settlement shall occur on the business day following the Recovery Rate Determination Date.
2. No Credit Event
If it is determined that no Default Credit Event did occur prior to the expiration of the POD ™ Futures, the Settlement Recovery Rate, and consequently the settlement price will be zero (0). A cash settlement shall occur on the business day following the Recovery Rate Determination Date.
3. Special Circumstance
A ruling may be delayed if a conclusive determination cannot be made by the seventh business day at 9:15 p.m. (GMT) following the announcement of a Credit Event. If the contract has expired, a new contract would be issued for the purpose of position transfer. The final determination shall be announced by the exchange as soon as a decision is reached and a cash settlement shall occur on the close of business on the day following the Credit Event Determination Date.
Early Settlement:

All later contracts in any series of contracts will immediately settle at 0 if any early contract in the series settles at a realized recovery rate following a default by the reference entity.
Settlement Procedure for Annual Contracts:

Annual contracts will settle on the delivery date with three years to final maturity. They will settle in kind, with both long and short positions delivering four quarterly equivalent contracts each at the following function of the last traded price of the annual contract in question. Each quarterly contract will initially be priced at P = (price of annual contract − 100) ÷ 4) + 100.

In this example, the contract is for a bond recovery rate future in an individual credit contract, denoted as "[Entity name]" which corresponds to the entity for which a bond recovery rate contract is purchased. In this example, the face value is the value on which the realized recovery rate is applied to determine the settlement value in the event of a default (bankruptcy or insolvency) by the entity referred in the contract in the specified time period. In this example, the face value of the contract is $1,000,000, and in this particular example, the face value of each contract monitored for exchange by a PODM system, is the same.

In alternative embodiments, the face values may be constrained to a limited number of potential face values, e.g., two or three (although other embodiments may have more or unlimited possibilities), generally (although not necessarily) face values that are easily divisible in the face value of the POD™ futures. By constraining the face value of the contract (or other terms of the contract) to a fixed number of possibilities that may be divisible in the face value of the POD™ futures, the ability to establish a uniform, automated exchange facility for the bond recovery rate contract and for combinations of one or more bond recovery rate contract and one or more POD™ futures is promoted. In other embodiments, the exchange may be structured by fixing aspects of the contract other than the face value of the contract.

In this example, another contract term that is constrained is the period for which a futures contract is made. In this example, the face value is fixed at $1,000,000 for specific periods of time (which are constrained in this example to quarterly contracts for the first three years and annual contracts for an additional seven years). If at the end of the specified period no default has occurred, the long pays and the short receives a settlement based on a settlement value of zero. On the other hand, if a default does occur in the specified time period, the exchange determines the realized recovery rate based on publically available information or based on a survey of market participants. The settlement value is the product of the face value of the futures contract and the realized recovery rate determined by the exchange. At a later date, the long receives and the short pays a settlement based on the final settlement value. In this example, as indicated in "early settlement," if a default occurs in advance of the specified time period for a particular contract belonging to a particular series, an early settlement is triggered on these later contracts where the long position pays and the short receives a settlement based on the face value of those later contracts. In this embodiment, the risk associated with short term default is separated from the risk associated with a default in the longer term (assuming there is no short-term default). Thus, with this embodiment, tightness in the short term credit market may not spill over to the same degree to the long term credit market.

In other embodiments, an earlier default could result in all contracts on the reference entity being settled early at the realized recovery rate. Also, other embodiments may manifest different relationships between defaults and obligations to pay. For example, in one embodiment, payment of the realized recovery rate may be obliged when a reference entity defaults within a specified time period. In another embodiment, payment of the realized recovery rate may be obliged when a reference entity defaults in a particular manner (for example, filing for bankruptcy) within a specified time period.

In other embodiments, payments may be based on events other than default or based on other variables than the recovery rate upon default and, depending on the nature of the possibility of multiple occurrences of these events, may or may not have a similar "early settlement" provision for later contracts. More specifically, embodiments in accord with the present invention may provide for contracts valued by occurrence or non-occurrence of a single occurrence event, i.e. a binary reference event, and may provide for similar "early settlement" of particular single occurrence futures contracts.

Other time periods for the futures contracts may be fixed and the face value could either be the same, or different, for different time periods. For example, a Recovery Rate Futures could be limited only to quarterly, to quarterly for some time frames and annual for others (as in the example illustrated in Table 1a), or may permit quarterly and annual (or other time frame) contracts to be placed at any particular time through the PODM.

In one embodiment, the probability of default and expected recovery rate associated with these contracts are determined by the market based on the trading price for the particular REC futures, and the price of the contracts is set accordingly. In this example, the pricing mechanism used by the market for these contracts may be (100×P×R) to two decimal places, where P is the probability of default as determined by the market for the period specified and R is the recovery rate expected by the market for the senior unsecured funded debt of the reference entity. In this example, the multiplier is $10,000 and the tick size is 0.01. Changes in contract prices may be cleared and settled daily. Thus, the profit or loss that a trader incurs on a given day of trading is based upon the change in the market's perception of the P and R at the end of that day. For example, if $P_p$ at the end of the previous trading day was 8%, $R_p$ at the end of the previous trading day was 40%, the $P_c$ at the end of the current trading day is 10%, and $R_c$ at the end of the current trading day is 42%, the amount of money gained by the long position (and the amount of money lost by the short position) on a $1,000,000 face value contract would be $10,000 as shown by the following calculations:

$$\$10,000 \times (100 \times P_c \times R_c) = \$10,000 \times (100 \times .10 \times 0.42) = \$42,000$$

$$\$10,000 \times (100 \times P_p \times R_p) = \$10,000 \times (100 \times .08 \times 0.40) = \underline{\$32,000}$$

$$\$10,000$$

In this embodiment, price at contract maturity may be determined in the same manner. For example, at maturity the P is either 1 or 0 and the expected recovery rate is indeterminate as the bond neither defaulted nor matured (except under unusual circumstances, in which case the recovery would be 100%). Thus, where the value of P=0 the settlement price of the contract would be:

$$\$10,000 \times (100 \times 0 \times R_m) = \$0.$$

Where the value of P=1, the settlement price of the contract would be determined once a realized recovery rate can be established. In this embodiment, the realized recovery rate will be either the ISDA® determined recovery rate if ISDA® holds a public auction for the bonds or the average of 3 of 5 bids for $50 million face value of senior unsecured bonds, where the greatest and lowest bids are excluded. Thus, the amount of money gained or lost by the long would be the difference between either the realized recovery rate times 100 multiplied by $10,000 in the event of a default or zero otherwise and the contract price at the end of the previous day multiplied by $10,000, and the amount of money gained or lost by the short would be the difference between either the realized recovery rate times 100 multiplied by $10,000 in the event of a default or zero otherwise and the contract price at the end of the previous day multiplied by $10,000.

Since P and R are determined by the market, in this example, in establishing the price of a contract with a face value of $1,000,000, rather than expressly agreed upon as such or set by an external entity, different entities in the market may arrive at different estimates of P and R and, therefore, wish to enter into or exchange a bond recovery rate contract for this reason (of course, other reasons may exist for motivating a sale or purchase). Additionally, other models may be applied for determining price, e.g. the model above was a function of the product of the probability of default and the expected recovery rate, other functions could be used. Moreover, other factors (such as time value of money, tolerance to risk or currently held assets/positions, cash bond prices, phase of the economic cycle) may be reflected in a trader determining a price point at which they are willing to enter the market.

The tick size, or smallest unit of increasing or decreasing the change of the price of a particular contract, in this example, is 0.01 and therefore corresponds to $100. Establishing a tick size can assist in facilitating the setting of prices and trading of interests.

In this example, there is a fixed time for permitting trading of futures contracts and a fixed time and mechanism identified for establishing whether a default has occurred, as illustrated in Table 1a. This permits orderly trading and administration of futures contracts and settlement of futures contracts.

As described above, in this example and for quarterly contracts, if there is no default in the time period specified in a futures contract, the settlement is in cash and the final settlement value is zero. If there is a default, the final settlement value is the realized recovery rate multiplied by 100 and by the multiplier of $10,000.

In this example, annual contracts may also be purchased for time periods more than three years out. These contracts could also be settled in cash at the end of the specified period, with a final settlement value equal to zero when there is no default occurring in the specified period as for quarterly contracts.

In an alternative embodiment, and in particular the one illustrated in Table 2, the annual contract may instead be settled in kind (e.g., in exchange for other futures contracts) when its final maturity is within an identified period of time from the present which may be any period of time grater than the shortest risk period available. For example, when the final maturity is three years out, an annual futures contract could be converted into four quarterly futures contracts, one for each of the four quarters leading up to the final maturity date. Thus, the entire series, taken as a whole, may have the same risk period as the previously traded futures contract, e.g. one year. In this example, the face amount of the quarterly contract would be equal to the face value of the annual contract.

In an alternative embodiment, the futures contracts for time periods farther than three years out may also be maintained as separate quarterly contracts. For those periods, the PODM may require trading of contracts in blocks of four, one for each quarter of the applicable calendar year. This would achieve a similar effect, without a formal in-kind settlement of annual futures contracts into quarterly ones. In other embodiments as described above, such a restriction could be omitted and only quarterly (or some other time unit) time periods employed for all periods of time for which a futures contract may be specified.

By allowing sale of bond recovery rate futures contracts in specified time periods, an institution may hedge recovery risk when considering using POD™ futures to hedge a bond. For example, if an institution is considering hedging the default risk and the risk of a lower than expected realized bond recovery rate on a bond with a POD™ futures and a REC futures by selling default futures and bond recovery rate futures contracts to cover the risk of a short term default and bond recovery rate risk. Any increase from the sale price of the POD™ futures less the decrease in the price of the REC futures would be the net cost of the hedging in the event no default occurs, but in the event of a default, the institution will net the decrease from sale price of the POD™ futures less the increase from sale price of the REC futures, which could provide a precise hedge for the bond in addition to covering the margin between sale price and the face values of any other futures contracts that were sold (i.e., cover the payout for those time periods where no default occurred, either before or after the actual default). Adding a REC futures to the trade will allow the institution to ensure that the gain on the trade in an event of default matches the loss on the bonds of the reference entity and to cheapen the cost of the hedge by avoiding over hedging. Thus, this type of facility can permit institutions to continue to hold bonds, while hedging the short-term default and recovery risk.

An example of an alternative set of standard terms for a bond recovery rate futures contract is given in Table 2b. In this example, the terms Credit Event shall have the meaning ascribed in the contract specification of the POD™ Futures (Table 1b); Special Circumstances shall have the meaning ascribed in the contract specification of the POD™ Futures (Table 1b); and Credit Event Determination Date shall have the meaning ascribed in the contract specification of the POD™ Futures (Table 1b).

TABLE 2b

| Contract Description |
| --- |
| $100,000 in face value linked to the recovery rate of a specific corporate, government, institutional or financial entity (reference entity) in the event that a Credit Event occurs for the Reference Entity causing the POD ™ Futures for the Reference Entity with the same Risk Period to settle at zero (0). |
| Contract Name |
| "[Entity name] bond recovery rate (REC) futures" |
| Final Settlement Price |
| Contracts will settle at 100 × R to two decimal places, where R is the recovery rate of the Reference Entity ("Settlement Recovery Rate") and is a number from 0 to 1 inclusive. |
| Tick Size |
| Minimum price fluctuations will be .01. A tick of .01 will represent $10 of value. |
| Multiplier |
| $1,000 |
| Contracts Listed |
| Contracts expiring quarterly contracts for three years: March, June, September, December; and contracts expiring annually for 7 additional years: December ("Settlement Month") |
| Risk Period |
| A period starting from the date of the listing of the contract and ending at 11:59 pm (GMT) on the $20^{th}$ calendar day of the Settlement Month. |
| Recovery Rate Determination Date |
| The Recovery Rate Determination Date shall not occur any later than 45 calendar days after the 20th calendar day of the Settlement Month unless Special Circumstances ("Special Circumstances") apply. <br> 1. Credit Event <br> If ISDA ® also recognizes the Credit Event for a specific Reference Entity and determines that it will have an auction, the Recovery Rate Determination Date ("Recovery Rate Determination Date") will be the date of the ISDA ® auction. If ISDA ® does not hold an auction either because it determines that it will not hold an auction, because it cancels an auction, or because it does not recognize the Credit Event, the Recovery Rate Determination Date will be the later of a) third business day following a decision by ISDA ® not to hold an auction or to cancel an auction or b) the third business day following the Credit Event Determination Date. <br> 2. No Credit Event <br> If the exchange determines that no Credit Event has occurred prior to the expiration of the POD ™ Futures on the Reference Entity, the Recovery Rate Determination Date shall be the Credit Event Determination Date. |
| Last Trading Day |
| Trading terminates on the Recovery Rate Determination Date. |
| Settlement Day |
| The next business day following the Last Trading Day. |
| Trading Hours |
| Electronic Trading from 6:30 pm to 4:00 pm (New York time) time Sunday to Friday. For expiring contracts last trade on the last trading day will be at 12:00 noon (New York time). |
| Settlement Procedure |
| The settlement of the REC is dependent upon the settlement price of the POD ™ Futures for the Reference Entity, whose settlement shall be determined as described in the contract specification of the POD ™ Futures. <br> 1. Credit Event <br> If it is determined that a Credit Event did occur, the exchange will post an announcement on its website detailing the anticipated settlement process. This procedure is considered preliminary. If there is an ISDA ® auction, the Settlement Recovery Rate shall be the result of the ISDA ® auction. A cash settlement shall occur on the business day following the Recovery Rate Determination Date, which shall be the date of the |

TABLE 2b-continued

ISDA ® auction. If there is no ISDA ® auction, either because it determines that it will not
hold an auction or cancels an auction after recognizing the default or because it does not
recognize the default, the Recovery Rate shall be the average bid price for $US 50 million
of bonds on the third business days following the Credit Event Determination Date, as
determined by the average of five dealer quotes, excluding the highest and lowest. The
result will be announced by 9:15 p.m. (GMT) on the Recovery Rate Determination Date.
A cash settlement shall occur on the business day following the Recovery Rate
Determination Date.
2. No Credit Event
If it is determined that no Default Credit Event did occur, the Settlement Recovery
Rate, and consequently the settlement price will be zero (0). A cash settlement shall occur
on the business day following the Recovery Rate Determination Date.
3. Special Circumstance
A ruling may be delayed if a conclusive determination cannot be made by the
seventh business day at 9:15 p.m. (GMT) following the announcement of a Credit Event.
If the contract has expired, a new contract would be issued for the purpose of position
transfer. The final determination shall be announced by the exchange as soon as a
decision is reached and a cash settlement shall occur on the close of business on the day
following the Credit Event Determination Date.
Early Settlement:

All later contracts in any series of contracts will settle early at 100 × R if the
exchange determines that a Credit Event has occurred for the Reference Entity.

In this example, all contracts on a reference entity have exposure to the default of the reference entity from the first date that they are listed until the $20^{th}$ calendar day of the settlement month of the contract. The notional value of the futures contract also differs.

Trading Indexes

In addition (or instead) to permitting individual credit default futures contracts or bond recovery rate futures contracts, a PODM may permit exchange of futures contracts for an index of possible entity default events and/or an index of possible entity bond recovery rate following entity default events. An index may, for example, be established to track the default risk of a group of financial institutions. Similarly, an index may be formed from a variety of individual POD™ futures contracts to correspond to an index on the general probability of default in the market. Indices may also be formed using the corresponding REC futures contracts. Such recovery indices may be, for example, established to track the bond recovery rates of a group of industrial names or for an index on the general recovery rate in the market. Indices may be included as part of a PODM, and traded in a fashion similar to the individual contracts described above with reference to Tables 1 and 2. An example of a set of contract terms and system constraints for an index called High Grade POD™ Futures Index are included Table 3. Like other provided examples, Special Circumstance shall have the meaning ascribed in the contract specification of the POD™ Futures (Table 1a or Table 1b).

TABLE 3

Contract Description $1,000,000 in face value linked to the final settlement price of a specific basket of
POD ™ Futures with High Grade Reference Entities.
Contract Name "High Grade POD ™ index futures"
Final Settlement Price Contracts will settle at the sum of the POD ™ Futures settlement prices contained
in the index divided by the original number of POD ™ Futures in the index.
Tick Size Minimum price fluctuations will be .01. A tick of .01 will represent $100 of
settlement value.
Multiplier $10,000
Contracts Listed Contracts expiring quarterly for three years: March, June, September, December;
and contracts expiring annually for 7 additional years: December
Risk Period 1. Quarterly Contracts
A period of one quarter beginning at 12:00 am (GMT) on the 21st calendar day of
the month that is 3 months before the settlement month and ending at 11:59 pm (GMT) on
the 20th calendar day of the Settlement Month.
2. Annual Contracts
A period of one year beginning at 12:00 am (GMT) on the 21st calendar day of the
month that is 12 months before the settlement month and ending at 11:59 pm (GMT) on
the 20th calendar day of the Settlement Month.

TABLE 3-continued

Last Trading Day

The next business day following the determination of the final settlement price.
Trading Hours Electronic Trading from 6:30 pm to 4:00 pm (New York time) time Sunday to
Friday. For expiring contracts last trade on the last trading day will be at 12:00 noon
(New York time).
Settlement Procedure for Quarterly Contracts The settlement of the POD ™ Index Futures is dependent upon the settlement of
each individual POD ™ Futures contained in the index, whose settlement prices shall be
determined as described in the contract specification of the POD ™ Futures.
The exchange will post on its website a preliminary settlement price of the POD ™
Index Futures by 4:30 p.m. (GMT) on the Last Trading Day. This settlement price is
based on the preliminary settlement prices of the POD ™ Futures and considered
preliminary. Contracts that have been settled early due to Credit Events will be assigned a
settlement price of zero (0). The normal final determination of the exchange is made by
9:30 p.m. (GMT) on the third business day following the 20th calendar day of the
Settlement Month. A cash settlement shall occur on the close of business on the
following business day. If the final settlement price of any of the POD ™ Futures
contained in the index is not available, the exchange may postpone ("Postponement") the
announcement of the final settlement price of the POD ™ Index Futures by up to four
additional business days. The final settlement price of the POD ™ Index Futures will be
announced by the exchange as soon as the final settlement prices for all the POD ™
Futures contained in the index have been determined. A cash settlement shall occur on the
close of business on the following business day.
Special Circumstance
The determination of the final settlement price of the POD ™ Index Futures may be
delayed beyond the seventh business day following the announcement of a Credit Event if
Special Circumstances apply to the settlement of any of the POD ™ Futures contained in
the index. If the contract has expired, a new contract would be issued for the purpose of
position transfer. The final settlement price shall be announced by the exchange as soon
as the final settlement prices of all POD ™ Futures contained in the index are available and
a cash settlement shall occur on the close of business on the following business day.
Settlement Procedure for Annual Contracts Annual contracts will settle on the delivery date with three years to final maturity.
They will settle in kind, with both long and short positions delivering four quarterly
equivalent contracts each at the following function of the last traded price of the annual
contract in question. Each quarterly contract will be priced at P = (price of annual contract −
100) ÷ 4) + 100.

---

In this example, the index corresponds to n different institutions/set of default contracts, each being weighted equally in the index. Thus, the pricing mechanism corresponds to an average price of a futures contract for the applicable time period of each of the n entities in the index. As with POD™ futures contracts, changes in index contract prices may be cleared and settled daily. Thus, the profit or loss that a trader incurs on a given day of trading is based upon the change in price of the individual POD™ futures contained in the index at the end of that day. For settlement at maturity, at the end of the quarterly (in this example) period for a quarterly contract, the index is priced and settled as though it were composed of n contracts in the n individual entities—each having a face value in the amount of the face value of the index (here, $1,000,000) divided by the number of entities (here, n).

In this example annual contracts are converted in-kind to quarterly contracts in a manner similar to that described above.

Since an index futures contract is itself a futures contract, the index contract may correspond to various listed individual contracts but it may also be established in the abstract. That is, for example, an index can be created including entities that do not have individual contracts being traded since it is possible for the market to determine a price for the index as a whole and it is possible to settle a contract by ascertaining the default status of an individual entity whether or not the entity happens to also have individual futures contracts listed on the PODM.

In the example of Table 3, the index is linearly weighted; that is, each listed entity contributes the same weight to the index as a whole. In alternative embodiments, the fund could be weighted in some other fashion, e.g., with the weight of one entity included in the index participating in the value (for price and return) more than another.

In the example of Table 3, the index is linked to the POD™ futures contracts with contract specifications given in Table 1a. In alternative embodiments, the POD™ index futures may be linked to POD™ futures contracts with contract specifications given in Table 1b or with other specifications.

In the example of Table 3, the face amount, trading times, settlement dates are the same as in Table 1a. Some aspects may facilitate trading, such as permitting trading at the same times for a system that includes both indexes and individual entity futures contracts (some systems may include only one or the other). This is not a requirement, however. Similarly, indexes could have different face amounts from each other or from individual futures contracts.

An example of a set of contract terms and system constraints for an index called High Grade recovery index futures are included Table 4. As with other examples, Special Circumstance shall have the meaning ascribed in the contract specification of the POD™ Futures (Table 1a or Table 1b).

TABLE 4

| Contract Description |
| --- |

$1,000,000 in face value linked to the final settlement price of a specific basket of REC Futures with High Grade Reference Entities
Contract Name "High Grade recovery (REC) index futures"
Final Settlement Price Contracts will settle at the sum of the REC Futures settlement prices contained in the index divided by the original number of REC Futures in the index.
Tick Size Minimum price fluctuations will be .01. A tick of .01 will represent $100 of settlement value.
Multiplier $10,000
Contracts Listed Contracts expiring quarterly for three years: March, June, September, December; and contracts expiring annually for 7 additional years: December
Risk Period 1. Quarterly Contracts
A period of one quarter beginning at 12:00 am (GMT) on the 21st calendar day of the month that is 3 months before the settlement month and ending at 11:59 pm (GMT) on the 20th calendar day of the Settlement Month.
2. Annual Contracts
A period of one year beginning at 12:00 am (GMT) on the 21st calendar day of the month that is 12 months before the settlement month and ending at 11:59 pm (GMT) on the 20th calendar day of the Settlement Month.
Last Trading Day Trading ceases on the earlier of the day that the Settlement Recovery Rate is determined for all REC Futures contained index and 45 calendar days following the end of the Risk Period
Settlement Day The next business day following the determination of the final settlement price.
Trading Hours The settlement of the REC Index Futures is dependent upon the settlement of each individual REC Futures contained in the index, whose settlement prices shall be determined as described in the contract specification of the REC Futures.
The exchange will post on its website a preliminary settlement price of the REC Index Futures by 4:30 p.m. (GMT) on the Last Trading Day. This settlement price is based on the preliminary settlement prices of the REC Futures and considered preliminary. Contracts that have been settled early due to Credit Events will be assigned a settlement price of zero (0). The normal final determination of the exchange is made by 9:30 p.m. (GMT) on the third business day following the 20th calendar day of the Settlement Month. A cash settlement shall occur on the close of business on the following business day. If the final settlement price of any of the REC Futures contained in the index is not available, the exchange may postpone ("Postponement") the announcement of the final settlement price of the REC Index Futures by up to four additional business days. The final settlement price of the REC Index Futures will be announced by the exchange as soon as the final settlement prices for all the REC Futures contained in the index have been determined. A cash settlement shall occur on the close of business on the following business day.
Special Circumstance
The determination of the final settlement price of the REC Index Futures may be delayed beyond the seventh business day following the announcement of a Credit Event if Special Circumstances apply to the settlement of any of the REC Futures contained in the index. If the contract has expired, a new contract would be issued for the purpose of position transfer. The final settlement price shall be announced by the exchange as soon as the final settlement prices of all REC Futures contained in the index are available and a cash settlement shall occur on the close of business on the following business day.
Settlement Procedure for Annual Contracts Annual contracts will settle on the delivery date with three years to final maturity. They will settle in kind, with both long and short positions delivering four quarterly equivalent contracts each at the following function of the last traded price of the annual contract in question. Each quarterly contract will be priced at P = (price of annual contract − 100) ÷ 4) + 100.

In this example, the index corresponds to n different institutions/set of bond recovery rate contracts, each being weighted equally in the index. Thus, the pricing mechanism corresponds to an average price of a futures contract for the applicable time period of each of the n entities in the index. As with POD™ futures, REC futures and POD™ index futures, changes in bond recovery rate index contract prices may be cleared and settled daily. Thus, the profit or loss that a trader incurs on a given day of trading is based upon the change in the recovery rate index the end of that day. For settlement at maturity, at the end of the quarterly (in this example) period for a quarterly contract, the index is priced and settled as though it were composed of n contracts in the n individual entities—each having a face value in the amount of the face value of the index (here, $1,000,000) divided by the number of entities (here, n).

In this example annual contracts are converted in-kind to quarterly contracts in a manner similar to that described above.

Since a recovery index futures contract is itself a futures contract, the index contract may correspond to various listed individual contracts but it may also be established in the abstract. That is, for example, an index can be created including entities that do not have individual contracts being traded since it is possible for the market to determine a price for the index as a whole and it is possible to settle a contract by ascertaining the default status and realized bond recovery rate of an individual entity whether or not the entity happens to also have individual futures contracts listed on the PODM.

In the example of Table 4, the index is linearly weighted; that is, each listed entity contributes the same weight to the index as a whole. In alternative embodiments, the fund could be weighted in some other fashion, e.g., with the weight of one entity included in the index participating in the value (for price and return) more than another.

In the example of Table 4, the face amount, trading times, settlement dates are the same as in Table 1a, 1b, 2a, 2b and 3. Some aspects may facilitate trading, such as permitting trading at the same times for a system that includes both indexes and individual entity futures contracts (some systems may include only one or the other). This is not a requirement, however. Similarly, indexes could have different face amounts from each other or from individual futures contracts.

Trading Index Tranches

A PODM may also permit trading of indexes of POD™ futures and/or REC futures in tranches. In one example of an index of POD™ futures, a tranche is a slice of the index corresponding to an order of defaults. For example, the first 0-3% of defaults in an index for the specified time period could be assigned to one (highest risk) tranche. The next 3-10% of the defaults could correspond to the next tranche, etc. Similarly, in one example, a tranche is a slice of the index corresponding to an order of defaults on the reference entities of the REC futures contained in the index and the settlement values of the futures are linked to the bond recovery rates realized on the bonds of the entities contained in an index tranche. For example, the first 0-3% of defaults in an index for the specified time period could be assigned to one (highest risk) tranche and the settlement value of the tranche would be linked to the recovery rates of the bonds of the names in the tranche once defaults are realized. The next 3-10% of the defaults could correspond to the next tranche, etc.

In these examples, the credit futures contract and the bond recovery rate futures contract are divided not just based on number of defaults but also temporally, e.g., a tranche may be sold covering a tranche of risk (e.g., the first 0-3% of defaults in the index and their corresponding recovery rates) that occur in a specified time period such as a particular quarter. These tranches may also be formed and traded as default futures contracts or bond recovery rate contracts on a PODM.

Table 5 provides one example of set of contract and system specifications for one example of a credit tranche futures contract. In this example, Credit Event Determination Date shall have the meaning ascribed in the contract specification of the POD™ Futures (Table 1a or Table 1b); Special Circumstance shall have the meaning ascribed in the contract specification of the POD™ Futures.

TABLE 5

| Contract Description |
|---|
| $1,000,000 in face value of default exposure linked to the final settlement price of a specific tranche of a named index of probability of default futures. |
| Contract Name |
| "[Tranche name] on [index name] probability of default futures" Series: |
| 0%-3%, 3%-10%, 10%-20%, 20%-30%, 30%-100% Final Settlement Price |
| Contracts will settle at $100[1 - \min(\max((D - LB), 0), (UB - LB))/(UB - LB)]$ to two decimal places where D is the realized percentage of POD ™ Futures contained in the index with a final settlement price of zero (0) from the start of the series and UB and LB are the upper and lower bounds of the tranches, expressed in percentage, respectively. In other words, the percentage loss on the index is first allocated to the lowest tranche (the 0-3% tranche) to the degree the loss does not exceed the detachment point. Then the next lowest tranche is attached and so on until the loss is fully assigned. Once the loss assigned to a tranche is known, its settlement price equals 100 less the percent of the tranche represented by its assigned loss. Since the contract size is $1,000,000 the price will be multiplied by $10,000 to obtain the settlement value. |
| Tick Size |
| Minimum price fluctuations will be .01. A tick of .01 will represent $100 of settlement value. |
| Multiplier |
| $10,000 |

TABLE 5-continued

Contract Listed

Contracts expiring quarterly contracts for three years: March, June, September,
December; and contracts expiring annually for 7 additional years: December Risk Period 1. Quarterly Contracts
A period of one quarter beginning at 12:00 am (GMT) on the 21st calendar day of
the month that is 3 months before the settlement month and ending at 11:59 pm (GMT)
on the 20th calendar day of the Settlement Month.
2. Annual Contracts
A period of one year beginning at 12:00 am (GMT) on the 21st calendar day of
the month that is 12 months before the settlement month and ending at 11:59 pm (GMT)
on the 20th calendar day of the Settlement Month.

Last Trading Day

For each tranche, trading shall terminate on the earlier of the Credit Event Determination
Date of the POD ™ Futures that has (have) caused the percentage loss to equal or exceed the
upper bound of the tranche, or the close of business on the $20^{th}$ calendar day of the Settlement
Month. If the $20^{th}$ calendar day of the Settlement Month is a non-business day, trading shall
cease on the last business day preceding the $20^{th}$ calendar day of the Settlement Month.

Settlement Day

The next business day following the determination of the final settlement price..

Trading Hours

Electronic Trading from 6:30 pm to 4:00 pm (New York time) time Sunday to
Friday. For expiring contracts last trade on the last trading day will be at 12:00 noon
(New York time).

Settlement Procedure

The settlement of the POD ™ Index Tranche Futures is dependent upon the settlement of
each individual POD ™ Futures contained in the index, whose settlement prices shall be
determined as described in the contract specification of the POD ™ Futures.
1. Sufficient number of Credit Events to cause the loss to equal or exceed the upper
bound
Upon the declaration of a Credit Event or Credit Events that may cause the percentage of
POD ™ Futures contained in the index with a final settlement price of zero (0) to equal or
exceed the upper bound of a POD ™ Index Tranche Futures, thereby causing an Early
Settlement on the POD ™ Index Tranche Futures ("Early Settlement"), the exchange shall
post an announcement on its website. This determination is considered preliminary.
Under normal circumstances, the final determination on the Early Settlement shall be
announced by 9:30 p.m. (GMT) on the third business day following the announcement
and a cash settlement shall occur on the following business day if it is determined that the
Credit Event(s) did occur and cause the percentage of POD ™ Futures contained in the
index with a final settlement price of zero (0) to equal or exceed the upper bound or if the
contract has expired. In the event of a Postponement or Postponement(s) for the POD ™
Futures, the POD ™ Index Tranche Futures shall also be postponed by up to four
additional business days. In the event of a Postponement, the final determination shall be
announced by the exchange as soon as a decision is reached and a cash settlement shall
occur on the following business day if it is determined that a Credit Event(s) did occur
and cause the percentage of POD ™ Futures contained in the index with a final settlement
price of zero (0) to equal or exceed the upper bound or if the contract has expired.
2. Insufficient number of Credit Events to cause the loss to equal or exceed the upper
bound
The exchange will post on its website a preliminary settlement price by 4:30 p.m. (GMT)
on the 20th calendar day of the Settlement Month. This settlement price is considered
preliminary and based on the preliminary settlement prices of the POD ™ Futures. The
normal final determination of the exchange is made by 9:30 p.m. (GMT) on the third
business day following the 20th calendar day of the Settlement Month. In the event of a
Postponement, the final settlement price will be announced by the exchange as soon as it
is available and a cash settlement shall occur on the close of business on the day
following the final determination of the settlement price.
3. Special Circumstances
The determination on an Early Settlement or of the final settlement price of a
POD ™ Index Tranche Futures may be delayed beyond the seventh business day
following the announcement of a Credit Event if Special Circumstances apply to a
POD ™ Futures contained in the index. If the contract has expired, a new contract would
be issued for the purpose of position transfer. The final determination or final settlement
price shall be announced by the exchange as soon as a decision is reached and a cash
settlement shall occur on the close of business on the following business day.

Early Settlement:

In any quarter when a tranche reaches its detachment point all contracts of that
same tranche for later quarters will immediately settle at 100.

TABLE 5-continued

Settlement Procedure for Annual Contracts:

Annual contracts will settle on the delivery date with three years to final maturity. They will settle in kind, with both long and short positions delivering four quarterly equivalent contracts each at the following function of the last traded price of the annual contract in question. Each quarterly contract will be priced at P = (price of annual contract − 100) ÷ 4) + 100.

As for the other contract examples, the tranche is set up with the same face value, operating times, etc., although this is not intended to be limiting.

While in the embodiments disclosed above, the face value and accompanying multiplier are $1,000,000 and $10,000 respectively, other embodiments may use other face values and multipliers. For example, in one embodiment the face value and multiplier of futures contracts are $100,000 and $1,000 respectively. Further, different futures contracts may use different face values or multipliers and the invention is not limited to any specific face value or multiplier.

Pricing of Tranches

In one embodiment, tranche prices may be modeled as follows. The tranche boundaries represent a percent of losses and may be denoted by $a_m$, m=0, ..., M, where $a_0$=0% and $a_M$=100%, such that there are M tranches in the structure and the $n^{th}$ tranche accounts for the losses between $a_{n-1}$ and $a_n$, n=1, ..., M. The realized incremental loss percentage to be allocated among the tranches at each expiration time s may be denoted as $x_s$, s=1, ..., S $x_f$, f=1, ..., N, so that the cumulative loss percentage of the index at expiration time t may be expressed as $$\sum_{s=1}^{t} x_s.$$

The settlement price of the contract corresponding to the $n^{th}$ tranche that expires at expiration time t is denoted by $P_{n,t}$ and i corresponds to the percentage of the tranche interval that was not invaded by the incremental loss between expiration times t−1 and t. It is described by a function $P_{n,t}=f(x_1, \ldots, x_t; a_0, \ldots, a_M)$. This function may be iteratively specified by considering five cases enumerated below.

For each case, assume the cumulative loss percentage at the $t^{th}$ expiration time lies between the tranche boundaries of the $q^{th}$ $i^{th}$; tranche, such that $$a_{q-1} \leq \sum_{s=1}^{t} x_s < a_q$$

and the cumulative loss percentage up to the $(t-1)^{th}$ expiration period lies between the boundaries of the $p^{th}$ $i^{th}$ tranche such that $$a_{p-1} \leq \sum_{s=1}^{t-1} x_s < a_p$$

where $p \leq q$, $t^1 \leq 1$. Then, the expiration price of the futures contract on the $n^{th}$ index tranche expiring at time t is determined by:

1. If n>q, $P_{n,t}$=100 T≥f. In other words, at expiration time t, all tranches higher than the $q^{th}$ tranche that expire at time t settle at 100 since the cumulative loss does not invade their range.

2.

If $n = q$, $$P_{n,t} = \begin{cases} 100 \dfrac{a_n - a_{n-1} - x_t}{a_n - a_{n-1}}, & \text{if } \sum_{s=1}^{t-1} x_s > a_{n-1} \\ 100 \dfrac{a_n - \sum_{s=1}^{t} x_s}{a_n - a_{n-1}}, & \text{if } \sum_{s=1}^{t} x_s \leq a_{n-1} \end{cases}$$

The equation used to calculate the percentage of the $n^{th}$ tranche that has not been invaded between the $(t-1)^{th}$ and $t^{th}$ expiration dates depends upon whether the cumulative loss in the previous period had invaded the tranche. If the $n^{th}$ tranche was assigned a loss in the $(t-1)^{th}$ period (top equation), the numerator corresponds to the maximum total loss percentage range of the tranche minus the incremental loss occurring in period t; otherwise if the first time the $n^{th}$ tranche is assigned a loss is in the $t^{th}$ expiration period (lower equation), the numerator can be calculated as the difference between the upper bound of the tranche and the cumulative loss.

3.

If $n < q$, $P_{n,t} = \begin{cases} 0, & \text{if } n > p \\ 100 \dfrac{\sum_{s=1}^{t-1} x_s - a_{n-1}}{a_n - a_{n-1}}, & \text{if } n = p. \end{cases}$ For contracts below tranche q, the expiration price depends on whether the tranche is above or below tranche p, which was the highest tranche to be assigned a loss in period t−1. If the tranche lies between tranches p and q, the expiration value is 0 since its entire range is subsumed by the current period's incremental loss. For contracts on tranche p, the settlement price is 100 times the fraction of the tranche losses previously allocated as of the last period, which therefore cannot be re-allocated this period. (Note that contracts on tranches below the $p^{th}$ tranche that were initially to expire at the end of period t already will have settled, since all future-expiring contracts on a tranche are settled in the period in which the cumulative loss first exceeds the maximum total loss percentage of its upper bound.)

The expiration price of the futures contract on the $n^{th}$ index tranche expiring in future periods (i.e., s>t) is determined by:

4. If q>n≥p, $P_{n,s}=P_{p,s}$=100. In other words, contracts expiring in future periods on tranches for which the maximum total percentage loss is exceeded during period t have settlement values of 100, since no further losses can be assigned to contracts on these tranches. In this embodiment, these contracts are also settled at time t since their value is known with certainty at that time.

5. All other contracts expiring in future periods that have not been settled early due to excess cumulative losses will have values that are market determined (i.e. for example, a function of the last daily traded price and/or bid-ask prices as per the rules of the exchange). Market prices will depend upon, among other factors, the expected future incremental losses $x_s$, $s>t$.

Table 6 provides one example of set of contract and system specifications for one example of a bond recovery rate tranche futures contract. In this example, Special Circumstance shall have the meaning ascribed in the contract specification of the POD™ Futures (Table 1a or Table 1b).

TABLE 6

| Contract Description |
|---|
| $1,000,000 in face value linked to the recovery rates of a tranche of a named index of probability of default futures.<br>Contract Name |
| "[Tranche name] on [index name] bond index recovery rate futures"<br>Series: |
| 0%-3%, 3%-10%, 10%-20%, 20%-30%, 30%-100%<br>Final Settlement Price |
| Prices will be quoted will have a range of 0 to 100 inclusive. Once the individual REC Futures settlement prices have been determined the individual REC Futures will be assigned to a tranche based on the order of date and time of default starting with the lowest tranche (for example the 0-3% tranche) to the degree that it has not been assigned a REC Futures in a previous quarter in the same series and to the degree the loss does not exceed the detachment point. Once the detachment point is reached, that is once the number of defaults reaches the maximum number allowable for the tranche, the next lowest tranche is then attached and so on until all the REC Futures with defaults are allocated. The other REC Futures are all settled at 0, and therefore are not assigned in any particular order. For each tranche, the settlement price is 100 times the average settlement price of the REC Futures assigned to the tranche. Since the contract size is $1,000,000 the price will be multiplied by $10,000 to obtain the settlement value.<br>Tick Size |
| Minimum price fluctuations will be .01. A tick of .01 will represent $100 of settlement value.<br>Multiplier |
| $10,000<br>Contract Listed |
| Contracts expiring quarterly contracts for three years: March, June, September, December; and contracts expiring annually for 7 additional years: December<br>Risk Period |
| 1. Quarterly Contracts<br>A period of one quarter beginning at 12:00 am (GMT) on the 21st calendar day of the month that is 3 months before the settlement month and ending at 11:59 pm (GMT) on the 20th calendar day of the Settlement Month.<br>2. Annual Contracts<br>A period of one year beginning at 12:00 am (GMT) on the 21st calendar day of the month that is 12 months before the settlement month and ending at 11:59 pm (GMT) on the 20th calendar day of the Settlement Month.<br>Last Trading Day |
| Trading ceases on the earlier of the day that the Settlement Recovery Rate is determined for all REC Futures contained index and 45 calendar days following the end of the Risk Period.<br>Settlement Day |
| The next business day following the determination of the final settlement price.<br>Trading Hours |
| Electronic Trading from 6:30 pm to 4:00 pm (New York time) time Sunday to Friday. For expiring contracts last trade on the last trading day will be at 12:00 noon (New York time).<br>Settlement Procedure |
| The settlement of the POD ™ Index Recovery Tranche Futures is dependent upon the settlement of each individual REC Futures contained in the index, whose settlement prices shall be determined as described in the contract specification of the REC Futures.<br>1. Sufficient number of Credit Events to cause the loss to equal or exceed the upper bound<br>Upon the declaration of a Credit Event or Credit Events that may cause the percentage of REC Futures contained in the index with a final settlement price of zero (0) to equal or exceed the upper bound of a POD ™ Index Recovery Tranche Futures, thereby causing an Early Settlement on the POD ™ Index Recovery Tranche Futures ("Early Settlement"), |

TABLE 6-continued the exchange shall post an announcement on its website. This determination is considered preliminary. Under normal circumstances, the final determination on the Early Settlement shall be announced by 9:30 p.m. (GMT) on the third business day following the announcement and a cash settlement shall occur on the following business day if it is determined that the Credit Event(s) did occur and cause the percentage of REC Futures contained in the index with a final settlement price of zero (0) to equal or exceed the upper bound or if the contract has expired. In the event of a Postponement or Postponement(s) for the REC Futures, the POD ™ Index Recovery Tranche Futures shall also be postponed by up to four additional business days. In the event of a Postponement, the final determination shall be announced by the exchange as soon as a decision is reached and a cash settlement shall occur on the following business day if it is determined that a Credit Event(s) did occur and cause the percentage of REC Futures contained in the index with a final settlement price of zero (0) to equal or exceed the upper bound or if the contract has expired.
2. Insufficient number of Credit Events to cause the loss to equal or exceed the upper bound
The exchange will post on its website a preliminary settlement price by 4:30 p.m. (GMT) on the 20th calendar day of the Settlement Month. This settlement price is considered preliminary and based on the preliminary settlement prices of the REC Futures. The normal final determination of the exchange is made by 9:30 p.m. (GMT) on the third business day following the 20th calendar day of the Settlement Month. In the event of a Postponement, the final settlement price will be announced by the exchange as soon as it is available and a cash settlement shall occur on the close of business on the day following the final determination of the settlement price.
3. Special Circumstances
The determination on an Early Settlement or of the final settlement price of a POD ™ Index Recovery Tranche Futures may be delayed beyond the seventh business day following the announcement of a Credit Event if Special Circumstances apply to a POD ™ Futures contained in the index. If the contract has expired, a new contract would be issued for the purpose of position transfer. The final determination or final settlement price shall be announced by the exchange as soon as a decision is reached and a cash settlement shall occur on the close of business on the following business day.
Early Settlement:

In any quarter when a tranche reaches its detachment point all contracts of that same tranche for later quarters will immediately settle at 0.
Settlement Procedure for Annual Contracts:

Annual contracts will settle on the delivery date with three years to final maturity. They will settle in kind, with both long and short positions delivering four quarterly equivalent contracts each at the following function of the last traded price of the annual contract in question. Each quarterly contract will be priced at P = (price of annual contract − 100) ÷ 4) + 100.

As for the other contract examples, the REC futures tranche is set up with the same face value, operating times, etc., although this is not intended to be limiting.

While in the embodiments disclosed above, the face value and accompanying multiplier are $1,000,000 and $10,000 respectively, other embodiments may use other face values and multipliers. For example, in one embodiment the face value and multiplier of futures contracts are $100,000 and $1,000 respectively. Further, different futures contracts may use different face values or multipliers and the invention is not limited to any specific face value or multiplier.

Pricing of Tranches

In one embodiment, tranche prices may be modeled as follows. The tranche boundaries represent a number of defaulted names and may be denoted by $b_m$, m=0, ..., M, where $b_0$=1 and $b_M$=100, such that there are M tranches in the structure and the $n^{th}$ tranche accounts for the default numbers between $b_{n-1}$ and $b_n$, n=1, ..., M.

The settlement price of the contract corresponding to the $n^{th}$ tranche that expires at expiration time t is denoted by $P_{n,t}$ and i corresponds to the average bond recovery rate of the REC futures assigned to the tranche, all of which have exposure to defaults occurring between t−1 and t. It is described by a function $P_{n,t}=f(R_1, ..., R_{100}; b_0, ..., b_M)$, where $R_i$ denotes the realized recovery rate of the $i^{th}$ contract contained in the index and i=1, ..., 100 for an index of 100 names. The settlement values of $R_i$ are assigned up to the maturity date of the tranche as defaults occur. If a default on a name in index occurs prior to t−1, then for the purpose of pricing the $n^{th}$ tranche that expires at expiration time t, the name will take on the index i, starting from i=1 for the first default and taking on the next largest value of i for each subsequent default and its recovery rate, $R_i$, will be set at zero. Between t−1 and t, the settlement values of $R_i$ assigned begin with the next value of i as at t−1. The settlement value of the recovery rate for the $i^{th}$ name is the realized recovery rate on the name, as determined to price the single name REC futures contained in the index that default within the period. At the end of the period, all other names in the index that have not defaulted during the risk period specified for the contract are assigned a realized recovery rate of 0. In other words, once a name in the index has been assigned to a tranche, it continues to be assigned to the tranche with that index i and takes on a settlement recovery rate of 0 to price all futures on the tranche expiring in subsequent periods.

For each tranche, the final settlement price is given by:

$$P_{n,t} = 100 \frac{\sum_{j=b_{n-1}}^{b_j} R_j}{b_n - b_{n-1}}.$$

The three following examples are provided to illustrate the method. Although not limiting, embodiments of the present inventions shown in these examples include five tranches (n=1, 2, 3, 4, 5) expiring at the end of five periods (s=1, 2, 3, 4, 5). In all three examples, settlement prices are given at each maturity date, (t=1, 2, 3, 4, 5) and the vector of tranche boundaries for the credit futures may be expressed as:

$$a = [0\ 3\ 10\ 20\ 30\ 100]$$

$$a = \begin{bmatrix} 100 \\ 30 \\ 20 \\ 10 \\ 3 \\ 0 \end{bmatrix},$$

such that tranche n=1 corresponds to the 0-3% cumulative loss level or equivalently of defaults since the there are 100 names in the index according to this embodiment, n=2 to the 3-10% cumulative loss, etc.

Example 1

In this first example, small numbers of defaults take out the first tranche and portions of the second tranche over the five periods. Assume the vector of numbers of defaults, or equivalently of incremental percentage loss (since the index in this example contains 100 names) is:

$x=[1\ 2\ 1\ 1\ 2]$, and also assume that the recovery rates achieved for these names are given by:

Recoveries=(40%,35%,25%,55%,65%,30%,45%)

in chronological order of default occurrence, with the first default occurring in period 1, the next two defaults occurring in period 2, etc. as illustrated in the vector x.

In this example, the matrices of settlement prices for the credit futures and recovery rate futures at the end of each period are given in Tables 7 through 16 and may be found using the above pricing algorithms. All tables show the settlement prices ordered by seniority from top to bottom, with the most senior (30-100%/30-100 defaults) at the top and the most junior (0-3%/1-3 defaults) at the bottom, and by expiration date from left to right, with contracts expiring in period 1 in the leftmost column and contracts expiring at the end of period 5 in the rightmost column. As such, the number of columns decreases by one each hypothetical period. In all cases, MDDS represents a market determined daily settlement price as explained in the above algorithm.

TABLE 7

| 100   | MDDS | MDDS | MDDS | MDDS |
|-------|------|------|------|------|
| 100   | MDDS | MDDS | MDDS | MDDS |
| 100   | MDDS | MDDS | MDDS | MDDS |
| 100   | MDDS | MDDS | MDDS | MDDS |
| 66.67 | MDDS | MDDS | MDDS | MDDS |

Table 7 shows the settlement prices of the credit futures contracts expiring in all periods at the end of period 1. In this example, the first tranche absorbs 1% of loss assigned to the structure, leaving 2%/3% of the tranche unassigned and none of the other tranches maturing at the end of period 1 absorb any losses. All other settlement prices are market determined as per the usual daily settlement procedure of the exchange.

TABLE 8

| 0     | MDDS | MDDS | MDDS | MDDS |
|-------|------|------|------|------|
| 0     | MDDS | MDDS | MDDS | MDDS |
| 0     | MDDS | MDDS | MDDS | MDDS |
| 0     | MDDS | MDDS | MDDS | MDDS |
| 13.33 | MDDS | MDDS | MDDS | MDDS |

Table 8 shows the settlement prices of the bond recovery rate contracts expiring in all periods at the end of period 1. In this example, for the contracts expiring in period 1, $R_1$=40%, while $R_2$ to $R_{100}$ take on the value of 0. The settlement prices of the 0-3% tranche will be, 100*0.4/3=13.33, while all other tranches will have final settlement prices of 0. All other settlement prices are market determined as per the usual daily settlement procedure of the exchange.

TABLE 9

| 100   | MDDS | MDDS | MDDS |
|-------|------|------|------|
| 100   | MDDS | MDDS | MDDS |
| 100   | MDDS | MDDS | MDDS |
| 100   | MDDS | MDDS | MDDS |
| 33.33 | 100  | 100  | 100  |

Table 9 shows the settlement prices of the credit default contracts that expire in periods 2 to 5 at the end of period 2. As shown, in this example, the first tranche continues to absorb all of the losses in period 2; however this exhausts the tranche as the total loss now equals 3%. In this embodiment, the futures on the same tranche with later maturity dates are settled early at the end of period 2 at a settlement price of 100. After the 2% loss is assigned to the lowest tranche, 1%/3% of the tranche is unassigned during the period. All other futures maturing in period 1 settle at 100. All other settlement prices are market determined as per the usual daily settlement procedure of the exchange.

TABLE 10

| 0  | MDDS | MDDS | MDDS |
|----|------|------|------|
| 0  | MDDS | MDDS | MDDS |
| 0  | MDDS | MDDS | MDDS |
| 0  | MDDS | MDDS | MDDS |
| 20 | 0    | 0    | 0    |

Table 10 shows the settlement prices of the bond recovery rate contracts that expire in periods 2 to 5 at the end of period 2. In this example, for the contracts expiring in period 2, $R_1$=0%, $R_2$=35%, $R_3$=25% while $R_4$ to $R_{100}$ take on the value of 0. The settlement prices of the 0-3% tranche will be, 100*(0+0.35+0.25)/3=20, while all other tranches maturing at the end of period 2 will have final settlement prices of 0. In this embodiment, the futures on the same tranche with later maturity dates are settled early at the end of period 2 since the maximum number of defaults of the tranche has been reached. All other settlement prices are market determined as per the usual daily settlement procedure of the exchange.

TABLE 11

| 100     | MDDS    | MDDS    |
|---------|---------|---------|
| 100     | MDDS    | MDDS    |
| 100     | MDDS    | MDDS    |
| 85.71   | MDDS    | MDDS    |
| Settled | Settled | Settled |

Table 11 shows the settlement prices of the credit default contracts that expire in periods 3 to 5 at the end of period 3. As shown, in this example, the second tranche begins to attach as the first tranche was exhausted by previous defaults. The unused portion of the tranche at the end of the period is 6%/7%. Contracts on the other tranches maturing at the end of period 2 have a settlement value of 100. All other settlement prices are market determined as per the usual daily settlement procedure of the exchange. Note that the 0-3% tranche futures were settled early. For clarity, the table shows these contracts as Settled.

TABLE 12

| | | |
|---|---|---|
| 0 | MDDS | MDDS |
| 0 | MDDS | MDDS |
| 0 | MDDS | MDDS |
| 7.86 | MDDS | MDDS |
| Settled | Settled | Settled |

Table 12 shows the settlement prices of the bond recovery rate contracts that expire in periods 3 to 5 at the end of period 3. In this example, for the contracts expiring in period 3, $R_4=55\%$ while $R_1$ to $R_3$ and $R_5$ to $R_{100}$ take on the value of 0. The settlement prices of the 3-10% tranche will be, 100*0.55/7=7.86, while all other tranches expiring at the end of period 3 will have final settlement prices of 0. All other settlement prices are market determined as per the usual daily settlement procedure of the exchange. Note that the 0-3% tranche was settled early.

TABLE 13

| | |
|---|---|
| 100 | MDDS |
| 100 | MDDS |
| 100 | MDDS |
| 85.71 | MDDS |
| Settled | Settled |

Table 13 shows the settlement prices of the credit default contracts that expire in periods 4 and 5 at the end of period 4. As shown, in this example, the losses continue to be assigned to the 3-10% tranche. The unassigned loss remaining at the end of period 4 is 6%/7%. The other contracts maturing at the end of period 4 have settlement values of 100. All other settlement prices are market determined as per the usual daily settlement procedure of the exchange.

TABLE 14

| | |
|---|---|
| 0 | MDDS |
| 0 | MDDS |
| 0 | MDDS |
| 9.29 | MDDS |
| Settled | Settled |

Table 14 shows the settlement prices of the bond recovery rate contracts that expire in periods 4 and 5 at the end of period 4. In this example, for the contracts expiring in period 4, $R_5=65\%$ while $R_1$ to $R_4$ and $R_6$ to $R_{100}$ take on the value of 0. The settlement prices of the 3-10% tranche will be, 100*0.65/7=9.29, while all other tranches will have final settlement prices of 0. All other settlement prices are market determined as per the usual daily settlement procedure of the exchange.

TABLE 15

| |
|---|
| 100 |
| 100 |
| 100 |
| 71.45 |
| Settled |

Table 15 shows the settlement prices of the credit default contracts that expire in period 5 at the end of period 5. As shown, the second tranche absorbs all of the losses in this period and 5%/7% of the loss in this contract is unassigned at the end of period 5. At that time, in this example, all contracts on the index mature.

TABLE 16

| |
|---|
| 0 |
| 0 |
| 0 |
| 10.71 |
| Settled |

Table 16 shows the settlement prices of the bond recovery rate contracts that expire in period 5 at the end of period 5. In this example, for the contracts expiring in period 3, $R_6=30\%$, $R_7=45\%$ while $R_1$ to $R_5$ and $R_8$ to $R_{100}$ take on the value of 0. The settlement prices of the 3-10% tranche will be, 100*(0.30+0.45)/7=10.71, while all other tranches will have final settlement prices of 0. All other settlement prices are market determined as per the usual daily settlement procedure of the exchange.

Example 2

This example illustrates the case where the loss in the first period exhausts the maximum potential loss of the lowest tranche as well as some boundary cases where the cumulative loss in some intermediate periods corresponds to the lower boundary of tranche q. Assume the numbers of defaults, or equivalently of incremental default percentages (since the index in this example contains 100 names) is given by:

$$x=[5\ 5\ 5\ 5\ 5].$$

and the recovery rates achieved for these names are given by:

$$\text{Recoveries}=(40\%,35\%,25\%,55\%,65\%,40\%,35\%,\\25\%,55\%,65\%,40\%,35\%,25\%,55\%,65\%,40\%,\\35\%,25\%,55\%,65\%,40\%,35\%,25\%,55\%,65\%)$$

in chronological order of default occurrence.

Tables 17 through 26 illustrate the settlement prices of the credit default and bond recovery rate contracts at the end of periods 1 through 5 with the same ordering as in example

TABLE 17

| | | | | |
|---|---|---|---|---|
| 100 | MDDS | MDDS | MDDS | MDDS |
| 100 | MDDS | MDDS | MDDS | MDDS |
| 100 | MDDS | MDDS | MDDS | MDDS |
| 71.43 | MDDS | MDDS | MDDS | MDDS |
| 0 | 100 | 100 | 100 | 100 |

Table 17 shows the settlement prices of the credit default contracts at the end of period 1. As shown, the incremental loss of 5% exhausts the maximum potential loss of 3% of the 0-3% tranche. As a result, the contract on this tranche expiring in period 1 settles with a value of 0 and contracts on this tranche expiring in future periods settle at 100 and are settled early at the end of period 1. The remaining 2% of incremental loss is assigned to the next lowest tranche, leaving 5%/7% of the loss for the 3-10% tranche unassigned. All other settlement prices are market determined as per the usual daily settlement procedure of the exchange.

TABLE 18

| | | | | |
|---|---|---|---|---|
| 0 | MDDS | MDDS | MDDS | MDDS |
| 0 | MDDS | MDDS | MDDS | MDDS |
| 0 | MDDS | MDDS | MDDS | MDDS |
| 17.14 | MDDS | MDDS | MDDS | MDDS |
| 33.33 | 0 | 0 | 0 | 0 |

Table 18 shows the settlement prices of the bond recovery rate contracts at the end of period 1. For the purpose of determining the final settlement prices of these contracts the realized recovery rates are as follows: $R_1=40\%$, $R_2=35\%$, $R_3=25\%$, $R_4=55\%$, $R_5=65\%$ while $R_6$ to $R_{100}$ take on the value of 0. As shown, the occurrence of 5 defaults in period 1 exhausts the 0-3% default tranche. This contract settles at $100\times(0.40+0.35+0.25)/3=33.33$. Since the maximum allowable number of default is exceeded, all other futures contracts of this tranche are settled early with a value of 0. The 3-10% tranche settles at $100\times(0.55+0.65)/7=17.14$ and all other recovery contracts expiring at the end of period 1 settle at 0. All other settlement prices are market determined as per the usual daily settlement procedure of the exchange.

TABLE 19

| | | | |
|---|---|---|---|
| 100 | MDDS | MDDS | MDDS |
| 100 | MDDS | MDDS | MDDS |
| 100 | MDDS | MDDS | MDDS |
| 28.57 | 100 | 100 | 100 |
| Settled | Settled | Settled | Settled |

Table 19 shows the settlement prices of the credit default contracts that expire in periods 2 to 5 at the end of period 2. For clarity, the expired contracts of the 0-3% tranche are also included in the table. As shown, the second tranche absorbs all of its remaining incremental losses, leaving 2%/7% of the tranche unassigned in period 2. Since this loss exhausts the tranche all contracts of the second tranche expiring in future periods are settled at a value of 100 at the end of this period. For calculation purposes, note that at expiration period $t=2$ the middle tranche is tranche q in the notation of our previous equations, and that its lower boundary is just touched by the cumulative loss. Thus condition 2 of the algorithm correctly gives a settlement price of 100 for this tranche. All other settlement prices are market determined as per the usual daily settlement procedure of the exchange.

TABLE 20

| | | | |
|---|---|---|---|
| 0 | MDDS | MDDS | MDDS |
| 0 | MDDS | MDDS | MDDS |
| 0 | MDDS | MDDS | MDDS |
| 31.43 | 0 | 0 | 0 |
| Settled | Settled | Settled | Settled |

Table 20 shows the settlement prices of the bond recovery rate contracts at the end of period 2. For the purpose of determining the final settlement prices of these contracts the realized recovery rates are as follows: $R_6=40\%$, $R_7=35\%$, $R_8=25\%$, $R_9=55\%$, $R_{10}=65\%$ while $R_1$ to $R_5$ and $R_{11}$ to $R_{100}$ take on the value of 0. As shown, the occurrence of 5 defaults in period 2 exhausts the 3-10% default tranche. This contract settles at $100\times(0.40+0.35+0.25+0.55+0.65)/7=31.43$. Since the maximum allowable number of default is exceeded, all other futures contracts of this tranche are settled early with a value of 0. All other recovery contracts expiring at the end of period 2 settle at 0. All other settlement prices are market determined as per the usual daily settlement procedure of the exchange.

TABLE 21

| | | |
|---|---|---|
| 100 | MDDS | MDDS |
| 100 | MDDS | MDDS |
| 50 | MDDS | MDDS |
| Settled | Settled | Settled |
| Settled | Settled | Settled |

Table 2 shows the settlement prices of the credit default contracts that expire in periods 3 to 5 at the end of period 3 as well as the settled contracts of the lowest two tranches. As shown, the middle tranche absorbs all of the 5% incremental losses in this period, leaving 5%/10% of the tranche unused. All other futures expiring at the end of period 3 settle at 100. All other settlement prices are market determined as per the usual daily settlement procedure of the exchange.

TABLE 22

| | | |
|---|---|---|
| 0 | MDDS | MDDS |
| 0 | MDDS | MDDS |
| 22 | MDDS | MDDS |
| Settled | Settled | Settled |
| Settled | Settled | Settled |

Table 22 shows the settlement prices of the bond recovery rate contracts at the end of period 3. For the purpose of determining the final settlement prices of these contracts the realized recovery rates are as follows: $R_{11}=40\%$, $R_{12}=35\%$, $R_{13}=25\%$, $R_{14}=55\%$, $R_{15}=65\%$ while $R_1$ to $R_{10}$ and $R_{16}$ to $R_{100}$ take on the value of 0. This contract settles at $100\times(0.40+0.35+0.25+0.55+0.65)/10=22$. All other recovery contracts expiring at the end of period 3 settle at 0. All other settlement prices are market determined as per the usual daily settlement procedure of the exchange.

TABLE 23

| | |
|---|---|
| 100 | MDDS |
| 100 | MDDS |
| 50 | 100 |
| Settled | Settled |
| Settled | Settled |

Table 23 shows the settlement prices of the credit default contracts that expire in periods 4 and 5 at the end of period 4 as well as the previously settled contracts of the lowest two tranches. As shown, the middle tranche absorbs all of the remaining loss, and all other middle tranche contracts expire this period with a settlement price of 100. As in Table 19, tranche q (i.e., the fourth tranche) is not assigned a loss, as calculated using condition 2 of the algorithm. All other settlement prices are market determined as per the usual daily settlement procedure of the exchange.

TABLE 24

| | |
|---|---|
| 0 | MDDS |
| 0 | MDDS |
| 22 | 0 |
| Settled | Settled |
| Settled | Settled |

Table 24 shows the settlement prices of the bond recovery rate contracts at the end of period 4. For the purpose of determining the final settlement prices of these contracts the realized recovery rates are as follows: $R_{16}=40\%$, $R_{17}=35\%$, $R_{18}=25\%$, $R_{19}=55\%$, $R_{20}=65\%$ while $R_{21}$ to $R_{100}$ take on the value of 0. The defaults occurring in period This contract settles at $100\times(0.40+0.35+0.25+0.55+0.65)/10=22$. This exhausts the 10-20% tranche, such that all other bond recovery rate contracts on this tranche are settled early at a settlement value of 0. All other recovery contracts expiring at the end of period 4 settle at 0. All other settlement prices are market determined as per the usual daily settlement procedure of the exchange.

TABLE 25

| |
|---|
| 100 |
| 50 |
| Settled |
| Settled |
| Settled |

Table 25 shows the settlement prices of the credit default contracts that expire in period 5 at the end of period 5. As shown, the fourth tranche absorbs all of the incremental loss of the fifth period and thus settles with 5%/10% of its loss allocation unassigned in period 5. Note that all remaining contracts expire at the end of this period.

TABLE 26

| |
|---|
| 0 |
| 22 |
| Settled |
| Settled |
| Settled |

Table 26 shows the settlement prices of the bond recovery rate contracts at the end of period 5. For the purpose of determining the final settlement prices of these contracts the realized recovery rates are as follows: $R_{21}=40\%$, $R_{22}=35\%$, $R_{23}=25\%$, $R_{24}=55\%$, $R_{25}=65\%$ while $R_1$ to $R_{20}$ and $R_{26}$ to $R_{100}$ take on the value of 0. The contract on the 20-30% tranche settles at $100\times(0.40+0.35+0.25+0.55+0.65)/10=22$. All other recovery contracts expiring at the end of period 5 settle at 0. All other settlement prices are market determined as per the usual daily settlement procedure of the exchange.

Example 3

In the final example, we demonstrate the situation where the incremental loss in an intermediate period overwhelms a mezzanine tranche. This example also shows that all tranches may experience losses by the last maturity date. The following vector of number of defaults per period, or equivalently of incremental loss percentages (since the index in this example contains 100 names) may be used:

$x=[1\ 4\ 12\ 27\ 40]$.

and, for simplicity, we assume that all realized recovery rates are 40%.

Tables 27 through 36 provide the settlement prices at the end of periods 1 though 5, ordered as in the previous two examples.

TABLE 27

| | | | | |
|---|---|---|---|---|
| 100 | MDDS | MDDS | MDDS | MDDS |
| 100 | MDDS | MDDS | MDDS | MDDS |
| 100 | MDDS | MDDS | MDDS | MDDS |
| 100 | MDDS | MDDS | MDDS | MDDS |
| 66.67 | MDDS | MDDS | MDDS | MDDS |

Table 27 shows the settlement prices of the credit default contracts at the end of period 1. As shown, the incremental loss of 1% is absorbed by the lowest tranche, which settles with 2%/3% unused, while the other tranches maturing at the end of period 1 settle at 100 and all other settlement prices are market determined as per the usual daily settlement procedure of the exchange.

TABLE 28

| | | | | |
|---|---|---|---|---|
| 0 | MDDS | MDDS | MDDS | MDDS |
| 0 | MDDS | MDDS | MDDS | MDDS |
| 0 | MDDS | MDDS | MDDS | MDDS |
| 0 | MDDS | MDDS | MDDS | MDDS |
| 13.33 | MDDS | MDDS | MDDS | MDDS |

Table 28 shows the settlement prices of the bond recovery rate contracts expiring in all periods at the end of period 1. In this example, for the contracts expiring in period 1, $R_1=40\%$, while $R_2$ to $R_{100}$ take on the value of 0. The settlement prices of the 0-3% tranche will be, $100*0.4/3=13.33$, while all other tranches expiring at the end of period 1 will have final settlement prices of 0. All other settlement prices are market determined as per the usual daily settlement procedure of the exchange.

TABLE 29

| | | | |
|---|---|---|---|
| 100 | MDDS | MDDS | MDDS |
| 100 | MDDS | MDDS | MDDS |
| 100 | MDDS | MDDS | MDDS |
| 71.43 | MDDS | MDDS | MDDS |
| 33.33 | 100 | 100 | 100 |

Table 29 shows the settlement prices of the credit default contracts that expire in periods 2 to 5 at the end of period 2. As shown, the incremental loss exhausts the maximum capacity of the lowest tranche and the remainder of the loss is assigned to the second tranche. In particular, 2% of the incremental loss is assigned to the lowest tranche, which settles with 1%/3% unused this period, and 2% of the incremental loss is assigned to the second tranche, which settles with 5%/7% unassigned. In this embodiment, all contracts of the lowest tranche expire at the end of this period at an expiration value of 100, all other contracts expiring at the end of period 1 settle at 100, and all other settlement prices are market determined as per the usual daily settlement procedure of the exchange.

TABLE 30

| | | | |
|---|---|---|---|
| 0 | MDDS | MDDS | MDDS |
| 0 | MDDS | MDDS | MDDS |
| 0 | MDDS | MDDS | MDDS |
| 11.43 | MDDS | MDDS | MDDS |
| 26.66 | 0 | 0 | 0 |

Table 30 shows the settlement prices of the bond recovery rate contracts expiring periods 3 to 5 at the end of period 3. In this example, for the contracts expiring in period 3, $R_1=0\%$, $R_2=R_3=R_4=R_5=40\%$, while $R_6$ to $R_{100}$ take on the value of 0. The settlement price of the 0-3% tranche expiring in period 2 will be $100\times(0.4+0.4)/3=26.66$ and the futures contracts on this tranche expiring in later periods are settled early at a settlement value of 0. The settlement price of the 4-10 default tranche expiring in period 2 will be $100\times(0.4+0.4)/7=11.43$. All other tranches expiring at the end of period 2 will have final settlement prices of 0. All other settlement prices are market determined as per the usual daily settlement procedure of the exchange.

TABLE 31

| | | |
|---|---|---|
| 100 | MDDS | MDDS |
| 100 | MDDS | MDDS |
| 30 | MDDS | MDDS |
| 28.57 | 100 | 100 |
| Settled | Settled | Settled |

Table 31 shows the settlement prices of the credit default contracts that expire in periods 3 to 5 at the end of period 3. The table also includes the previously settled contracts of the lowest tranche. As shown, the incremental percentage loss exhausts the maximum remaining loss of the second tranche of 5% and the middle tranche absorbs the remainder of the incremental percentage loss. Since 5% is assigned to the second tranche, it settles with 2%/7% unallocated in period 3. The middle tranche settles with 3%/10% unallocated as it receives the remaining 7% of the incremental loss for this period. All contracts of the second tranche settle at the end of period 3, with contracts with later initially determined expiration dates settling at 100. All other settlement prices are market determined as per the usual daily settlement procedure of the exchange.

TABLE 32

| | | |
|---|---|---|
| 0 | MDDS | MDDS |
| 0 | MDDS | MDDS |
| 28 | MDDS | MDDS |
| 28.57 | 0 | 0 |
| Settled | Settled | Settled |

Table 32 shows the settlement prices of the bond recovery rate contracts expiring periods 3 to 5 at the end of period 3. In this example, for the contracts expiring in period 3, $R_6 = \ldots = R_{17} = 40\%$, while $R_1$ to $R_5$ and $R_{18}$ to $R_{100}$ take on the value of 0. The settlement price of the 0-3% tranche expiring in period 3 will be $100 \times (5 \times 0.4)/7 = 28.57$ and the futures contracts on this tranche expiring in later periods are settled early at a settlement value of 0. The settlement price of the 10-20% tranche expiring in period 3 will be $100 \times (7 \times 0.4)/10 = 28$. All other tranches expiring at the end of period 3 will have final settlement prices of 0. All other settlement prices are market determined as per the usual daily settlement procedure of the exchange.

TABLE 33

| | |
|---|---|
| 80 | MDDS |
| 0 | 100 |
| 70 | 100 |
| Settled | Settled |
| Settled | Settled |

Table 33 shows the settlement prices of the credit default contracts that expire in periods 4 and 5 at the end of period 5 as well as the settled contracts of the lowest two tranches. As shown, the middle tranche absorbs its remaining portion of the incremental percentage loss, 3%, and its capacity is exhausted. The capacity of the fourth tranche, 10%, is completely exhausted in this period and thus it settles at 0. The remainder of the loss, 14%, is assigned to the most senior tranche, using up 14%/70% of its loss capacity. The futures contracts of the middle and fourth tranches expiring in period 5 are settled at the end of period 4 at a value of 100 and the only remaining contract expiring in period 5 has a settlement price that is market determined as per the usual daily settlement procedure of the exchange.

TABLE 34

| | |
|---|---|
| 8 | MDDS |
| 40 | 0 |
| 12 | 0 |
| Settled | Settled |
| Settled | Settled |

Table 34 shows the settlement prices of the bond recovery rate contracts expiring periods 4 and 5 at the end of period 4. In this example, for the contracts expiring in period 4, $R_{18} = \ldots = R_{44} = 40\%$, while $R_1$ to $R_{17}$ and $R_{45}$ to $R_{100}$ take on the value of 0. The settlement price of the 10-20% tranche expiring in period 4 will be $100 \times (3 \times 0.4)/10 = 12$ and the futures contracts on this tranche expiring in later periods are settled early at a settlement value of 0. The settlement price of the 20-30% tranche expiring in period 4 will be $100 \times (10 \times 0.4)/10 = 40$ and the futures contracts on this tranche expiring in later periods are settled early at a settlement value of 0. The settlement price of the 30-100% tranche expiring in period 5 will be $100 \times (14 \times 0.4)/70 = 8$ and the only remaining contract expiring in period 5 has a settlement price that is market determined as per the usual daily settlement procedure of the exchange.

TABLE 35

| |
|---|
| 42.86 |
| Settled |
| Settled |
| Settled |
| Settled |

Table 35 shows the settlement prices of the one surviving credit default contract that expires in period 5 at the end of period 5 and the settled contracts for the four lower tranches. As shown, the senior layer absorbs all of the incremental loss of the fifth period, leaving 30%/70% of the tranche unassigned in period 5. This contract matures this period.

TABLE 36

| |
|---|
| 22.86+= |
| Settled |
| Settled |
| Settled |
| Settled |

Table 36 shows the settlement prices of the bond recovery rate contracts expiring period 5 at the end of period 5. In this example, for the contracts expiring in period 5, $R_{45} = \ldots = R_{84} = 40\%$, while $R_1$ to $R_{84}$ and $R_{85}$ to $R_{100}$ take on the value of 0. The settlement price of the 30-100% tranche expiring in period 4 will be $100 \times (40 \times 0.4)/70 = 22.86$. This contract matures this period.

PODM System Process Diagrams

FIG. 1A provides a context diagram that includes an embodiment of a PODM system 112 and various entities with which the embodiment may interact. The sundry computer systems shown in FIG. 1A, which include personal computing devices 104 and 106, a financial institution system 110, a firewall 114, an order system 118, a clearing system 120 and an auction engine 122, may include one or more computing devices that have at least one processor or controller, memory and an interface. Computer systems and devices are disclosed with further detail with regard to FIG. 10 below.

The PODM system 112 may include a variety of components such as a firewall 114, an order system 118, a clearing system 120 and an auction system 122 interconnected through a private network 116. As shown, the PODM system 112 may interact a variety of external entities, including personal computing devices 104 and 106 and financial institution system 110, via a public network 108. Furthermore, the PODM system 112 may also provide the personal computing devices 104 and 106 with interfaces that enable users, such as futures contract traders 100 and 102, to communicate with the PODM system 112. For example, in one embodiment, the PODM system 112 may serve browser-based interfaces to the personal computing devices 104 and 106 to allow futures contract traders 100 and 102 to place trade requests with the PODM system 112. Futures contract traders 100 and 102 may be entities taking long or short positions or may be representatives of these market participants, e.g. dealers or brokers. To ensure secure transactions, the trade requests may be transmitted through the public network 108 using a variety of security measures including TSL, SSL and/or VPN among other security techniques. The PODM system 112 may serve the user interfaces using any suitable protocol including HTML, DHTML, XML and PHP among others.

Both the public network 108 and the private network 116 may include any communication network through which member computer systems may exchange data. For example, in one embodiment, public network 108 may be a TCP/IP based network employing both wired and wireless connections, such as the Internet. Private network 116 may further restrict member computer systems based on one or more characteristics of each member computer system. For example, private network 116 may restrict member computer systems to only those devices collocated in the same computing facility and/or rack enclosure. Furthermore, while FIG. 1A depicts the communication conduit between entities and components as networks, any form of communication conduit may be used including specialized and/or standard computing bus technologies such as IDE, SCSI, PCI and InfiniBand.

As is discussed further below, in one embodiment, the credit futures or bond recovery rate futures contract traders 100 and 102 may authorize a trading session by logging into the order system 118 via personal computing devices 104 and 106. Once the trading session is authorized, the firewall 114 may allow data originating on personal computing devices 104 and 106 to pass into the private network 116. This data may be associated with specific transaction requests, such as requests to trade various credit futures or bond recovery rate contracts, addressed to the order system 118. After processing the transaction request, the order system 118 may transmit the requested transaction to the auction engine 122 for further handling.

The auction engine 122 may facilitate the completion of transactions by matching potentially countervailing trade requests. Upon finding suitable matches, the auction engine 122 may automatically finalize the matched trade requests and pass the completed transaction to the clearing system 120.

The clearing system 120 may ensure the financial integrity of the market in various ways. For instance, the clearing system 120 may act as an electronic central clearing and settlement agent for a portion or all of the transactions completed by the auction engine 122. In one embodiment, the clearing system 120 may monitor the positions of market participants and the pricing of the various market credit futures or bond recovery rate futures contracts. Based on the continual monitoring, the clearing system 120 may issue reports to market participants and may issue margin calls to market participants. In another embodiment, the clearing system 120 may also exchange financial data with financial institution system 110, such as receiving a deposit in response to a margin call.

While FIG. 1A depicts the physical components of the PODM system as separate, distinct computing devices, one of ordinary skill in the art will recognize that each of these components may be implemented in any combination of hardware and/or software, such as a computer system including multiple computing devices. Embodiments implementing these components using a variety of physical configurations exist. For example, in one embodiment, the components of the PODM system may reside on a single computing device.

Figure 1B:
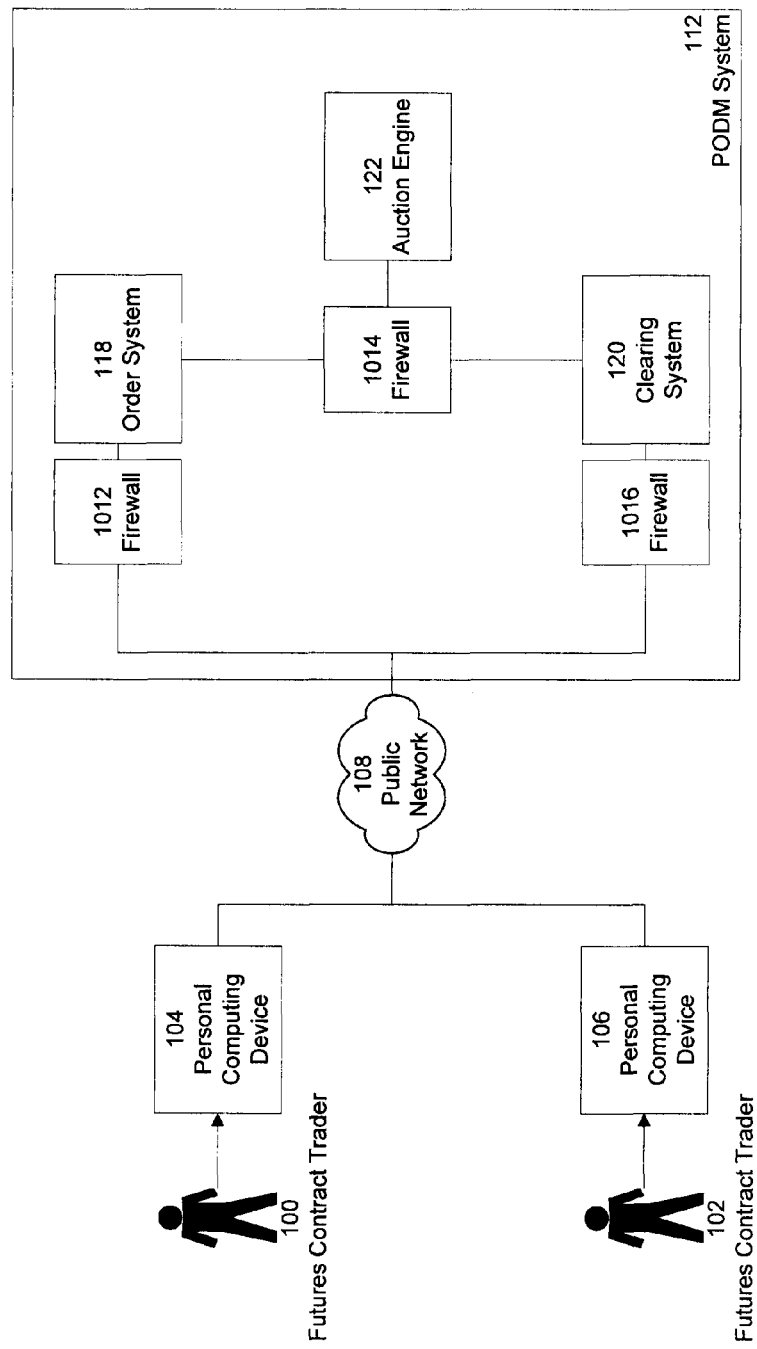
FIG. 1B is a block diagram of another example of a network environment that includes a POD™ futures contract market system.

FIG. 1B illustrates another embodiment in which security is administered via an alternate firewall configuration. More specifically, FIG. 1B incorporates many of the elements of FIG. 1A, but replaces the firewall 114 with firewalls 1012, 1014 and 1016. The firewalls 1012 and 1014 help secure the order system 118 and the clearing system 120 from unauthorized access through the public network 108. As shown, the auction engine 112 benefits from increased protection due to both the presence of the firewall 1014 and the isolated connection of the firewall 1014 with the order system 118 and the clearing system 120. In addition to increased security, this configuration may also support the distribution of these system elements to several different physical locations.

Figure 2:
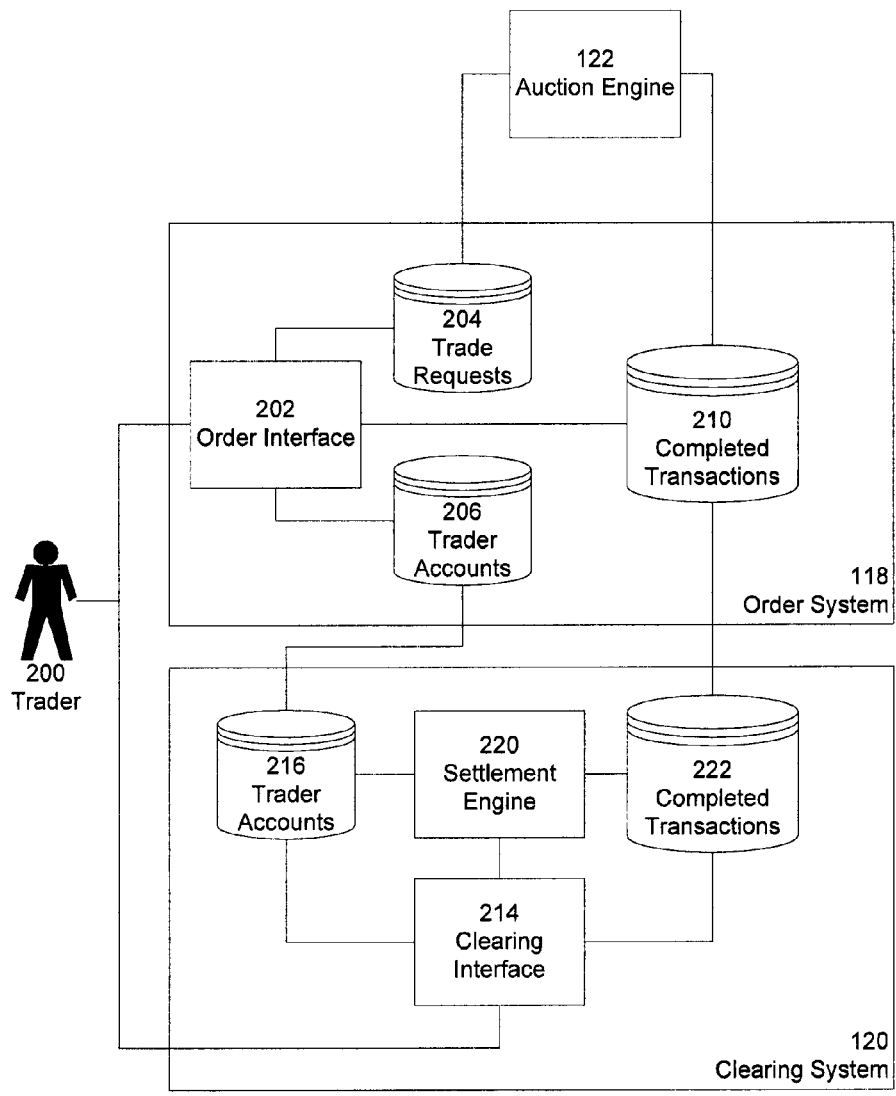
FIG. 2 is a visual representation of a logical architecture of a PODM system according to one embodiment.

FIG. 2 provides a more detailed illustration of the logical elements of one embodiment of a PODM system 112. Any of the system elements shown in FIG. 2 may be implemented in hardware, software or any combination thereof. Software elements may be implemented using customized software code or using existing software including email, FTP, batch system interface, database system data movement tools, middleware, any combination thereof, or otherwise. Moreover, the system structure and content recited below is for exemplary purposes only and is not intended to limit the invention to the specific structure shown in FIG. 2. As will be apparent to one of ordinary skill in the art, many variant system structures can be architected without deviating from the scope of the present invention. The particular modular arrangement presented in FIG. 2 was chosen to promote clarity.

Information may flow between these elements, components and subsystems using any technique known in the art. Such techniques include passing the information over the network via TCP/IP, passing the information between modules in memory and passing the information by writing to a file, database, or some other non-volatile storage device.

As disclosed above, the PODM system 112 in some embodiments includes three primary subsystems, the order entry system 118, the clearing system 120 and the auction engine 122. According to the embodiment depicted in FIG. 2, the order entry system 118 may include an order interface 202, a trade requests database 204, a trader accounts database 206 and a completed transactions database 210. The order interface 202 may receive trader and trade request information and may provide the trader and trade request information to the trade requests database 204 and the trader accounts database 206. The order interface 202 may also receive information regarding completed transactions from the completed transactions database 210 and may provide that information to trader 200. The trade requests database 204 may include information regarding open trade requests including the type of credit futures or bond recovery rate futures contract to be traded, the type of trade (buy or sell) and any price restriction information. The trader accounts database 206 may include trader logon credentials, identification and contact information as well as account positions in currency and holdings. These system elements are described in more detail below.

In one embodiment, the order interface 202 may present the trader 200 with less information than conventional credit derivative trading systems. More specifically, as will be discussed further below, embodiments disclosed herein provide for credit futures or bond recovery rate contracts that employ standardized terms and conditions, such as standard face values, terms, expiration dates and settlement procedures. Consequently, the trader 200 is not required to configure the standard terms and conditions when placing trade requests. This standardization may enable a more streamlined order interface 202 compared to conventional order interfaces.

The order interface 202 may accept user credentials, such as a user identifier and a password, from a trader 200 and authenticate the trader 200 by comparing the user credentials to user information received from the trader accounts database 206. After the trader 200 has been authenticated, the order interface 202 may accept trade requests from the trader 200. In one embodiment, the order interface 202 may validate, using information stored in the trader accounts database 206 or elsewhere, that the trader 200 has sufficient financial resources to complete the trade request prior to storing the trade request in the trade requests database 204. If the trader 200 has insufficient financial resources to complete the trade request, the order interface 200 may notify the trader of his insufficiency. The order interface 200 may also provide facilities for a trader to augment the financial resources he has allocated to trading activity.

In another embodiment, the order interface 202 may also enable the trader 202 to place various price restrictions on trade requests. A non-limiting list of price restrictions includes market orders, limit orders, stop limit orders, stop loss orders, trailing stop loss orders and trailing stop limit orders. Providing for multiple price restriction options enables traders to customize their trade requests to suit their particular needs.

The order interface 202 may present the trader 200 with a choice of credit futures or bond recovery rate futures contracts from which to choose when requesting a trade. A non-limiting list of these credit futures or bond recovery rate futures contracts may include POD™ futures, REC futures, POD™ index futures, REC index futures, POD™ index tranche futures, and REC index tranche futures. The trader 200 may use the order interface 202 to take long or short positions respective to any of these credit futures or bond recovery rate futures contracts. As discussed above, the settlement values of these positions are based on the whether one or more reference entities are in a state of credit default at an identified point in the future. To help provide for a more transparent market for the trader 200, according to one embodiment, the order interface 202 may present credit futures or bond recovery rate futures contracts that conform to a standardized set of contract terms and conditions. These terms and conditions may be specific to each type of futures contract and may include, among other contractual attributes, face value, entities referenced, maturation period and settlement procedures.

For example, according to one embodiment, the order interface 202 may present POD™ futures, REC futures, POD™ index futures, REC Index futures, POD™ index tranche futures, and REC index tranche futures with face values of $1,000,000 or any other pre-determined value, including $100,000 or $10,000, each. In another embodiment the order interface 202 may present POD™ futures, REC futures, POD™ index futures and REC index futures that have a face value of $1,000,000 each and may present POD™ indexes tranche futures and REC index tranche futures that have a face value of $500,000 or any other pre-determined value, including $100,000 or $10,000. The standards enforced by the order interface 202 may also include that the credit futures or bond recovery rate futures contract have standard term, for example, quarterly or annual, and that the entity referenced by the POD™ futures or the REC futures be any of an identified list of corporate, government, institutional and/or financial entities. With particular regard to POD™ index tranche futures and REC index tranche futuress, the order interface may present a set of standard tranche series. For instance, in one embodiment, the standard set of tranche series may include 0%-3%, 3%-10%, 10%-20%, 20%-30% and 30%-100%. Furthermore, standard maturity periods for POD™ futures and REC futures contracts traded by the PODM system 112 may include three years for quarterly contracts and up to an additional seven years for annual contracts.

In one embodiment, the order interface 202 may restrict trading of credit futures or bond recovery rate futures contracts after an identified point in time. For example, quarterly contracts may be restricted from trading after the $20^{th}$ day of the settlement month of the quarterly contract. In another embodiment, annual contracts may be restricted from trading after the $20^{th}$ day of December in the year that is three years before the settlement year. As is discussed further below, according to another embodiment, settlement procedures may also be subject to standardization by a settlement engine.

In another embodiment, the order interface 202 may also provide, to the trader 200, market information received from the completed transactions database 210. For example, the order interface 202 may provide the current trading volume and prices of various credit futures or bond recovery rate futures contracts traded on the PODM system 112. Additionally, the order interface 202 may provide the view of the PODM as to the probability of default of various reference entities to external entities. Furthermore, the order interface 202 may provide recent historical trading activity regarding POD™ futures sharing a common characteristic, such as a common reference entity.

The order interface 202 may also receive financial data, such as an electronic deposit of cash and/or other liquid instruments. The order interface 202 may update the account balances included in the trader accounts database 206 to reflect any deposits received. Thus, traders are provided with a convenient method of managing account balances.

With continued reference to FIG. 2, as discussed above, the auction engine 122 may match buy and sell trade requests and steward the trade requests into completed transactions. More particularly the auction engine 122 may periodically or continually scan the trade requests database 204 for potentially matching offsetting trade requests, such as, for example, a market buy and a market sell of a POD™ futures associated with a particular reference entity. In one embodiment, the auction engine 122 may only actively attempt to complete transactions during an identified time window. For instance, the auction engine 122 may be configured to operate from 6:30 PM to 4:00 PM, Eastern Standard Time, Sunday to Friday of each week. Furthermore, the auction engine may be configured to stop trading of expiring contracts on the last trading day at 12:00 PM, Eastern Standard Time.

Additionally, according to one embodiment, the auction engine may give priority to trade requests with certain characteristics. For example, a market buy may be given priority to a limit buy. Once matching trade requests are determined, the auction engine 122 may record them as complete and insert them into the completed transaction database 210. Completed transactions are settled and cleared by the clearing system 120.

Again referring to FIG. 2, the clearing system 120 may include a clearing interface 214, a trader accounts database 216, a settlement engine 220 and a completed transactions database 222. The completed transactions database 222 may receive data from the completed transactions database 210 by replication or other data transfer methods and may provide transactional information to the settlement engine 220 and the clearing interface 214. The settlement engine 220 may exchange information with the completed transactions database 222, the trader accounts database 216 and the clearing interface 214. The trader accounts database 216 may receive trader account information from the trader accounts database 206 by replication or other data transfer methods. These system elements are discussed further below.

According to one embodiment, the settlement engine 220 may periodically attempt to settle any unsettled transactions included in the completed transactions database 222. The processes used by the settlement engine 220 may vary based, at least in part, on the type of credit futures or bond recovery rate futures contract being settled because each type of credit futures or bond recovery rate futures contract has different characteristics. For example, as discussed above, the value of a POD™ futures is based on the probability of default of a reference entity as determined by the market, while the value of a POD™ index futures is based on the values of POD™ futures referencing several entities. According to one embodiment, changes to credit futures or bond recovery rate futures contract prices may cause daily settlement. As discussed above, daily settlement causes the changes in futures contract price to be settled to the accounts of owners of long and short positions after each trading day. This practice may help manage risk by ensuring that relatively smaller increments of money are exchanged more frequently, thus limiting the exposure of all participants to a daily amount.

Figure 3:
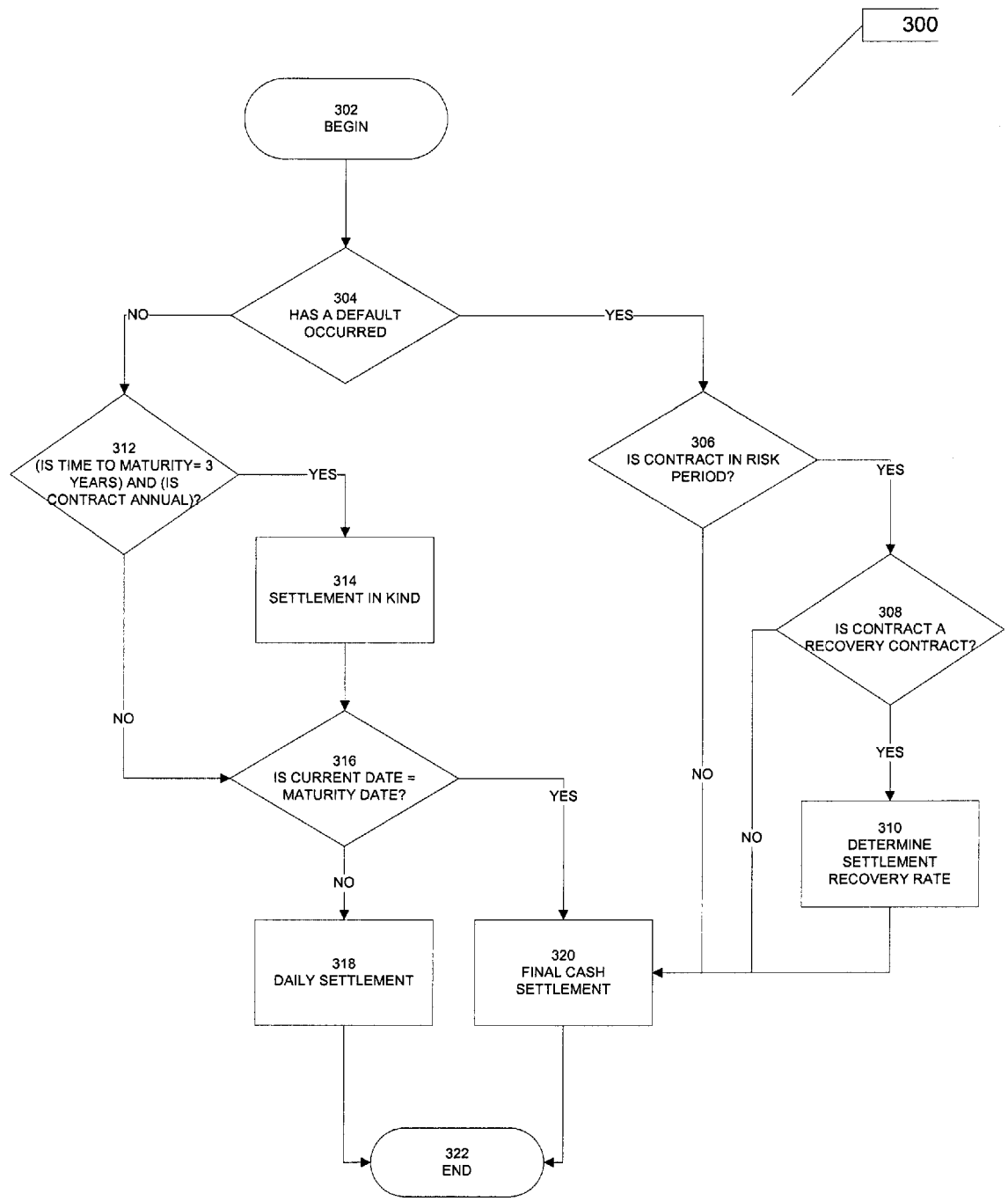
FIG. 3 is a flow chart of a process for settling POD™ futures and REC futures contracts according to one embodiment.

FIG. 3 illustrates of a process 300 used to settle POD™ futures and REC futures contracts daily, in kind and at maturity. At block 302, process 300 begins. At block 304, each POD™ futures or REC futures targeted for processing may be reviewed to determine if the entity referenced in the POD™ futures or REC futures is in a credit default state as of 11:59 PM, Greenwich Mean Time, on the maturity date. A credit default state may be any indication that an entity may be insolvent. According to one embodiment, an entity is deemed to be in a credit default state if that entity is either bankrupt or insolvent as evidenced by the failure to pay principal payments due on loans or bonds and which payment requirements are beyond their contractual cure period. Each processed POD™ futures or REC futures that references an entity deemed to be in a credit default state may be targeted for processing by block 306. Each processed POD™ futures or REC futures that references an entity deemed to not be in a credit default state may be targeted for processing by block 312.

At block 306, each POD™ futures or REC futures targeted for processing may be reviewed to determine whether the default occurred during its risk period. According to one embodiment, a POD™ futures or REC futures contract's risk period is from the beginning of a specific quarter, starting on the $21^{st}$ calendar day of March, June, September or December, to the end of the quarter, which will be the business day before the $21^{st}$ calendar day of the next quarterly settlement month in the cycle. Annual POD™ futures and REC futures contracts would have exposures beginning on the $21^{st}$ calendar day of December at 12:00 AM Greenwich Mean Time and ending at 11:59 PM Greenwich Mean Time on the $20^{th}$ calendar day of December the following year. Thus the settlement engine breaks up credit and bond recovery rate exposures into short term exposures, which allows market participants to express their credit market view with greater temporal precision. If the reference entity defaulted during the risk period of the contract, then the contract proceeds to block 308. If the reference entity defaulted in a period that is earlier than the beginning of the risk period of the contract, then it proceeds directly to block 320.

At block 308, each POD™ futures or REC futures targeted for processing may be reviewed to determine if it is a POD™ futures or a REC futures. Each contract that is deemed to be a REC futures is targeted for processing at block 310. At block 310, the settlement recovery rate is determined for each REC futures and the REC futures then proceeds to block 320 with a settlement price that is at least in part determined by the settlement recovery rate. Each contract that is deemed to be a POD™ futures is directly targeted for processing at block 320.

At block 312, each POD™ futures or REC futures targeted for processing may be reviewed to determine if the POD™ futures or REC futures has a maturity date equal to an identified date and an exposure period equal to a certain time period. For example, the identified date may be three years from the current settlement date and a one-year exposure period. If the POD™ futures or REC futures has the identified maturity date and exposure period, the POD™ futures or REC futures proceeds to block 314. At block 314, the POD™ futures or REC futures is settled in kind, with short positions delivering short positions on four quarterly equivalent contracts and vice versa. A system executing block 314 may record this settlement by updating the trader accounts database 216 to reflect the new long or short positions. The quarterly contracts will be priced according to equation (1):

$$P_{Quarterly} = (\text{Last traded price of annual contract} - \text{Face value price of annual contract})/4 + \text{Face value price of quarterly contract} \quad (1)$$

After processing at block 314, the POD™ futures or REC futures proceeds to block 316. If a POD™ futures or REC futures has a maturity date that is not equal to an identified date and an exposure period equal to a certain time period, then it proceeds directly to block 316.

At block 316, the maturity date of each unsettled transaction may be compared to the current date. In this example, the method may target all transactions for settlement daily. In one embodiment, the final settlement dates of each POD™ futures and REC futures are fixed to one of a set of standard settlement dates. For example, POD™ futures may have a final settlement date of the second business day after the $21^{st}$ day of a settlement month and REC futures may have a final settlement date of the business day after 45 calendar days following the final settlement date of the POD™ futures on the name for the same risk period. For quarterly POD™ futures, settlement months may include March, June, September and December. Correspondingly, REC futures settlement months for REC futures, in this example, would be February, May, August and November. For annual POD™ futures, the settlement month may be December and annual REC futures may have settlement months in February. If a contract is not maturing, it proceeds to block 318. At block 318, the settlement engine assigns the contract a daily settlement price based on recent market trading activity. The act of settling contracts daily may include updating the trader accounts database 216 to reflect the inflow or outflow of cash from the settled contracts, if any. If a contract is maturing, it proceeds to block 320.

At block 320, each POD™ futures or REC futures targeted for processing is given its final settlement value and cash settled. The act of settling may include updating the trader accounts database 216 to reflect the retirement of the POD™ futures and inflow of cash from the settled contracts, if any. POD™ futures contracts coming from blocks 306 and 316 are cash settled at a settlement price of $100, while POD™ futures contracts coming from block 308 are cash settled at a settlement price of $0. REC futures contracts coming from blocks 306 and 316 are settled at a settlement price of $0, while REC futures contracts coming from block 310 are settled at a settlement price that is related to the realized recovery rate.

At block 322, process 300 ends.

Figure 4:
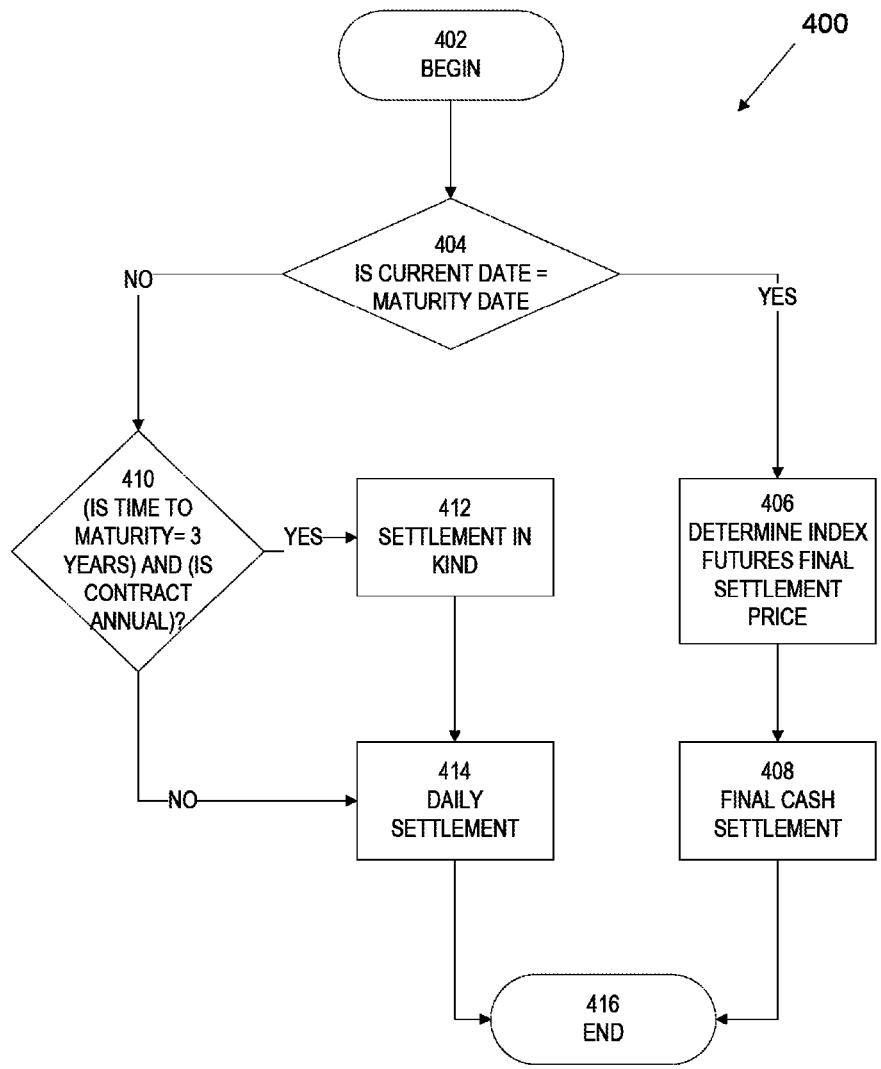
FIG. 4 is a flow chart of a process for settling POD™ index futures contracts and bond recovery rate index futures contracts according to another embodiment.

In another embodiment, the settlement engine 220 may settle POD™ index futures and REC index futures, both daily and at maturity. Daily settlement of POD™ index futures may be performed based on the change in POD™ index futures market value, as discussed above. FIG. 4 illustrates a process 400 used to settle POD™ index futures daily, in kind and at maturity. At block 402, process 400 begins. At block 404, the settlement date of each unsettled transaction may be compared to the current date. For each unsettled transaction with a maturity date equal to the current date, the method targets that transaction for processing at block 406.

In one embodiment, the settlement date of each POD™ futures or REC futures index is fixed to one of a set of standard settlement dates. For example, POD™ futures or Recovery indexes may have a settlement date of the second business day after the 21$^{st}$ day of a settlement month. For quarterly POD™ futures or REC futures indexes, settlement months may include March, June, September and December. For annual POD™ futures or REC futures indexes, the settlement month may be December. Thus the settlement engine breaks up credit exposures into short term exposures, which allows market participants to express their credit market view with greater temporal precision.

At block 406, the term of each POD™ futures or REC futures index targeted for final settlement will be given its final settlement price. In this embodiment, the final settlement price of an index of POD™ futures will be the sum of the final settlement prices of the POD™ futures contained in the index, divided by the initial number of names in the index. Similarly, the final settlement price of an index of REC futures will be the sum of the final settlement prices of the REC futures contained in the index, divided by the initial number of names in the index. Once they have received their final settlement price, contracts proceed to block 408.

At block 408, each POD™ futures or REC futures index targeted for processing may be settled to the POD™ futures or REC futures index final settlement price in cash. The act of settling may include updating the trader accounts database 216 to reflect the inflow of cash from the settled contracts, if any. Following cash settlement, the contract proceeds to block 416.

If the current date is not the maturity date of the POD™ futures or REC futures index contract, then the contract proceeds to block 410. At block 410, the contract's risk period and time to maturity may be compared to an identified risk period and time to maturity to determine subsequent processing actions. In this example, for each POD™ futures or REC futures index targeted for settlement whose term is equal to the identified time to maturity or risk period, for example, three years and one year, the method may target that POD™ futures or REC futures index for processing by block 412.

At block 412, each POD™ futures or REC futures index targeted for processing is settled in kind, with both long and short positions delivering four quarterly equivalent contracts each. A system executing block 412 may record this settlement by updating the trader accounts database 216 to reflect the new long and short positions. The quarterly contracts will be priced according to equation (1):

$$P_{Quarterly} = (\text{Last traded price of annual contract} - \text{Face value price of annual contract})/4 + \text{Face value price of quarterly contract} \quad (1)$$

Once they are settled in kind, contracts proceed to block 414. Contracts that do not have a term equal to the identified risk period and a time to maturity equal to the identified time to maturity proceed directly to block 414. At block 414, contracts targeted for processing are cash settled based on the daily change in their market value. Contracts then proceed to block 416.

At block 416, process 400 ends.

Figure 5:
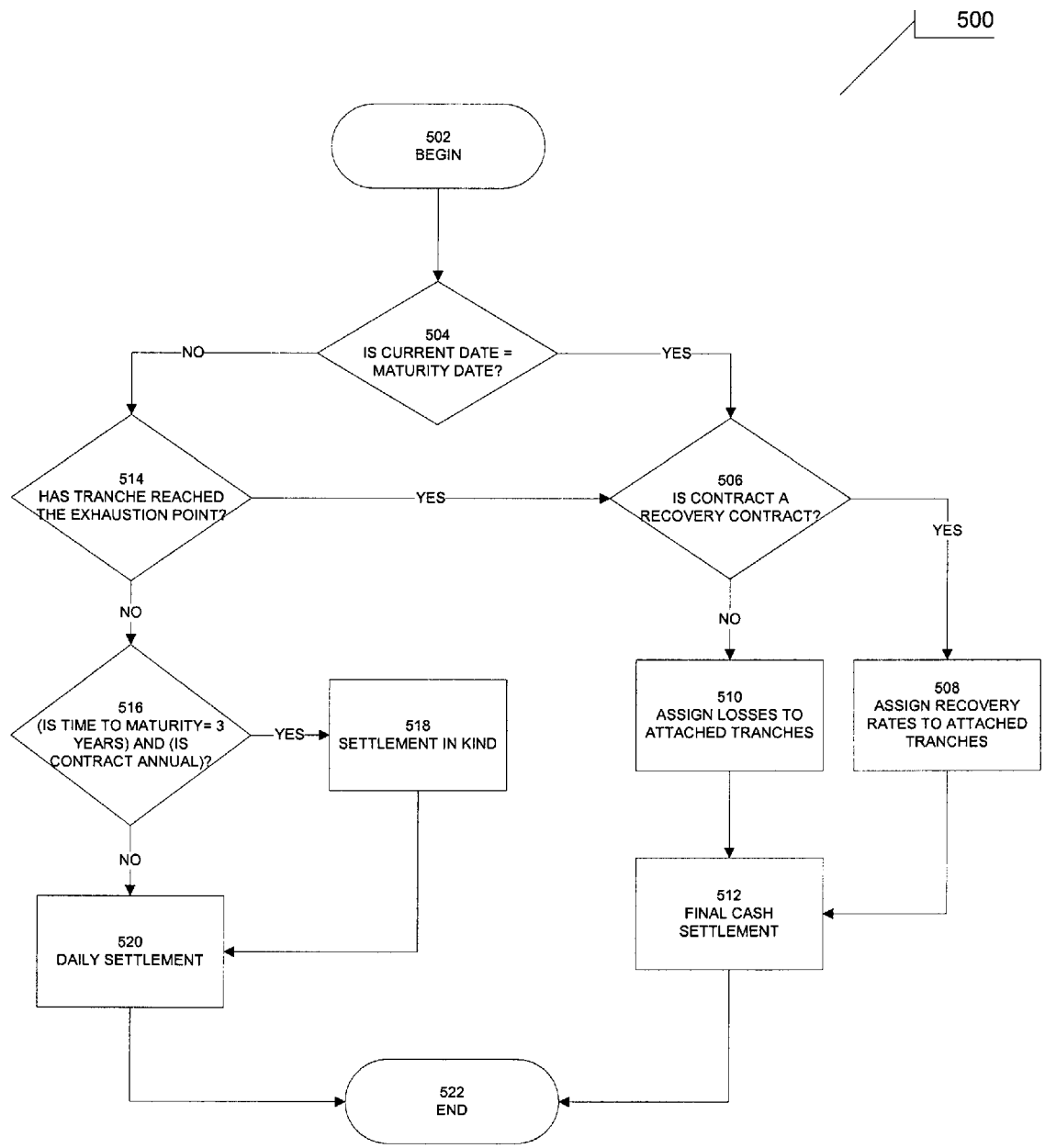
FIG. 5 is a flow chart of a process for settling POD™ index tranche futures contracts and bond recovery rate index tranche futures contracts according to another embodiment.

In still another embodiment, the settlement engine 220 may settle POD™ index tranche futures only at maturity. FIG. 5 illustrates of a process 500 used to settle POD™ index tranche futures and REC tranche futures daily, in kind and at maturity. At block 502, process 500 begins. At block 504, the maturity date of each contract may be compared to the current date. For each contract with a maturity date equal to the current date, the method targets that transaction for processing at block 506.

At block 506, each POD™ or REC index tranche futures targeted for processing may be reviewed to determine if it is a POD™ or a REC index tranche futures. Each contract that is deemed to be a REC index tranche futures is targeted for processing at block 508. At block 508, the Recovery rates that will be averaged are assigned to each tranche based on the order of the occurrence of the defaults. In this embodiment, recovery rates are assigned a value of 0 if the default occurred in a previous period, while keeping their rank. Recovery rates occurring in the current period are given a rank and take the value used to settle their corresponding REC futures contracts. For example, if 5 defaults occur in the current period and one default has occurred on the index in the previous period, $R_1$ takes the value of 0, $R_2$ to $R_6$ take the values of the recovery rates determined for the corresponding REC futures and $R_7$ to $R_{100}$ take the value of 0 to price the expiring REC tranche index futures. REC index tranche futures contracts then proceeds to block 512 with a settlement price that is the average of the recovery rates assigned to the tranche. Each contract that is deemed to be a POD™ index tranche futures contract is targeted for processing at block 510.

At block 510, each POD™ index tranche futures targeted for processing may be allocated losses up to the detachment point of the POD™ index tranche futures. Each POD™ index tranche futures may be reviewed to determine the settlement price for the POD™ index futures referenced by the POD™ index tranche futures. A POD™ index futures loss calculation may be performed. In one embodiment, the POD™ index futures loss may be the difference between the face value of the POD™ index futures and the settlement price of the index. The POD™ index futures loss may be first allocated to the lowest tranche, for example a 0-3 tranche, to the degree that it has not been allocated to in previous quarters in the same series and to the degree the loss does not exceed the detachment point for the POD™ index tranche futures. In this embodiment, the final settlement price of a POD™ index tranche futures is the face value of the tranche minus any POD™ index futures loss allocated to the tranche. Once a POD™ index tranche futures contract is assigned its final settlement price, it proceeds to block 512. At block 512, expiring contracts are targeted for final cash settlement and proceed to block 522.

If the current date is not the maturity date of the POD™ futures or Recovery futures, the tranche futures proceeds to block 514. At block 514, the contract is reviewed to determine whether it has reached its exhaustion point. If it has, it proceeds to block 506. Otherwise, it proceeds to block 516.

At block 516, each POD™ futures or REC futures index tranche futures targeted for processing may be reviewed to determine if the POD™ futures or REC futures tranche index futures has a maturity date equal to an identified date and an exposure period equal to a certain time period. For example, the identified date may be three years from the current settlement date and a one-year exposure period. If the POD™ or REC tranche index futures has the identified maturity date and exposure period, the POD™ or REC tranche index futures proceeds to block 518. At block 518, the POD™ or REC index tranche futures is settled in kind, with short positions delivering short positions on four quarterly equivalent contracts and vice versa. A system executing block 518 may record this settlement by updating the trader accounts database 216 to reflect the new long positions. The quarterly contracts will be priced according to equation (1):

$$P_{Quarterly} = (\text{Last traded price of annual contract} - \text{Face value price of annual contract})/4 + \text{Face value price of quarterly contract} \quad (1)$$

After processing at block 518, the POD™ or REC index tranche futures proceeds to block 520. If a POD™ or REC index tranche futures has a maturity date that is not equal to an identified date and an exposure period equal to a certain time period, then it proceeds directly to block 520.

At block 520, the settlement engine assigns the contract a daily settlement price based on recent market trading activity. The act of settling contracts daily may include updating the trader accounts database 216 to reflect the inflow or outflow of cash from the settled contracts, if any. Contracts then proceed to block 522.

At block 522, process 500 ends.

In another embodiment, the settlement engine 220 may settle the changes in the price of credit futures or bond recovery rate futures contracts, only at maturity or on a less frequent basis. For example, in at least one embodiment, the settlement engine 220 may settle the changes in the price of credit futures or bond recovery rate futures contracts only after their last trading day. As discussed above, each type of credit futures or bond recovery rate futures contract has a particular pricing mechanism. The settlement engine 220 may employ any of these mechanisms and/or others to determine the final settlement price based on the state of the reference entity and possibly another variable for bond recovery rate futures contract traded each day. The settlement engine 220 may then update the trader accounts database 216 to reflect inflows or outflows of cash based on the change of the price of each credit futures or bond recovery rate futures contract at maturity.

Each of processes 300, 400 and 500 depicts one particular sequence of acts in a particular embodiment. Other actions can be added, or the order of actions can be altered in these methods without departing from the scope of the present invention.

Referring again to FIG. 2, the clearing interface 214 may monitor account positions included in the trader accounts database 216 to ensure traders are able to honor their contractual commitments. More specifically, the clearing interface 214 may process completed transaction information retrieved from the completed transactions database 222 to maintain near real-time pricing information regarding the various credit futures or bond recovery rate futures contracts traded using the PODM system 112. Furthermore, the clearing interface 214 may access the impact of changing market conditions on trader accounts included within the trader accounts database 216. If changing market conditions will take a trader's account resources below an identified level, the clearing interface 214 may issue a margin call to the trader. In one example, the margin call may be issued to a dealer who, in turn, is responsible to the clearing house for executing the margin call with the entity holding the long or short position. The margin call may use any form of communication including email, fax, pager, POTS and VIOP among others.

The clearing interface 214 may also receive financial data, such as an electronic deposit of cash and/or other liquid instruments, in response to the margin call. The clearing interface 214 may update the account balances included in the trader accounts database 216 to reflect any deposits received. Moreover, the clearing interface may be configured to issue the margin call directly to the financial institution system 110. Thus providing an automated method of replenishing trader account resources as needed.

The clearing interface 214 may also interact with other exchanges. More particularly, the clearing interface 214 may be configured to execute trading strategies in response to changing market conditions and information. For example, in one embodiment the clearing interface 214 may issue a buy order for stock of in a reference entity when the probability of default implied by the POD™ futures price for the reference entity to be below a defined level for a defined series of contracts. Similarly, the clearing interface 214 may issue a sell order for the stock of a reference entity when probability of default implied by the POD™ futures price for the reference entity to be above a defined level for a defined series of contracts.

The clearing interface 214 may also perform transaction clearing functions. In one embodiment, for example, the clearing interface 214 may record the long and short positions of market participants after for each completed trade transaction. This record may be made in the trader accounts database 216. Alternatively, the clearing interface 214 may clear a transaction, and record the resulting long and short positions, after ensuring that the buyer's credit is sufficient to limit the risk of default, such as when the buyer is trading on margin.

In one embodiment, the clearing interface 214 may also transfer funds from and to the accounts of holders of long and short positions daily, after daily settlement has been completed. This funds transfer may be made to the trader accounts database 216 or may be made using an interface to a financial institution.

In another embodiment, the clearing interface 214 may perform clearing functions using a central clearing entity as a counterpart to both parties of a transaction. For example, the clearing interface may transfer funds between the holders of long and short positions and the central clearing entity. In another embodiment, the central clearing entity may be a PODM exchange. Use of a central clearing entity may provide market participants with increased confidence that transactions conducted on the exchange will be honored.

The databases 204, 206, 210, 216 and 222 may take the form of any logical construction capable of storing information on a computer readable medium including flat files, indexed files, hierarchical databases, relational databases and/or object oriented databases. The data may be modeled using unique and foreign key relationships and indexes. The unique and foreign key relationships and indexes may be established between the various fields and tables to ensure both data integrity and data exchange performance.

The order interface 202 and the clearing interface 214 each exchange information with various providers and consumers. These providers and consumers may include users and system interfaces. In the exemplary embodiment illustrated in FIG. 2, the trader 200 exchanges information with both the order interface 202 and the clearing interface 214. In an alternative embodiment, this information may be exchanged with other applications or storage media using system interfaces exposed by each of these elements. Each of these elements may both restrict input to a predefined set of values and validate any information entered prior to using the information or providing the information to other components.

Figure 6:
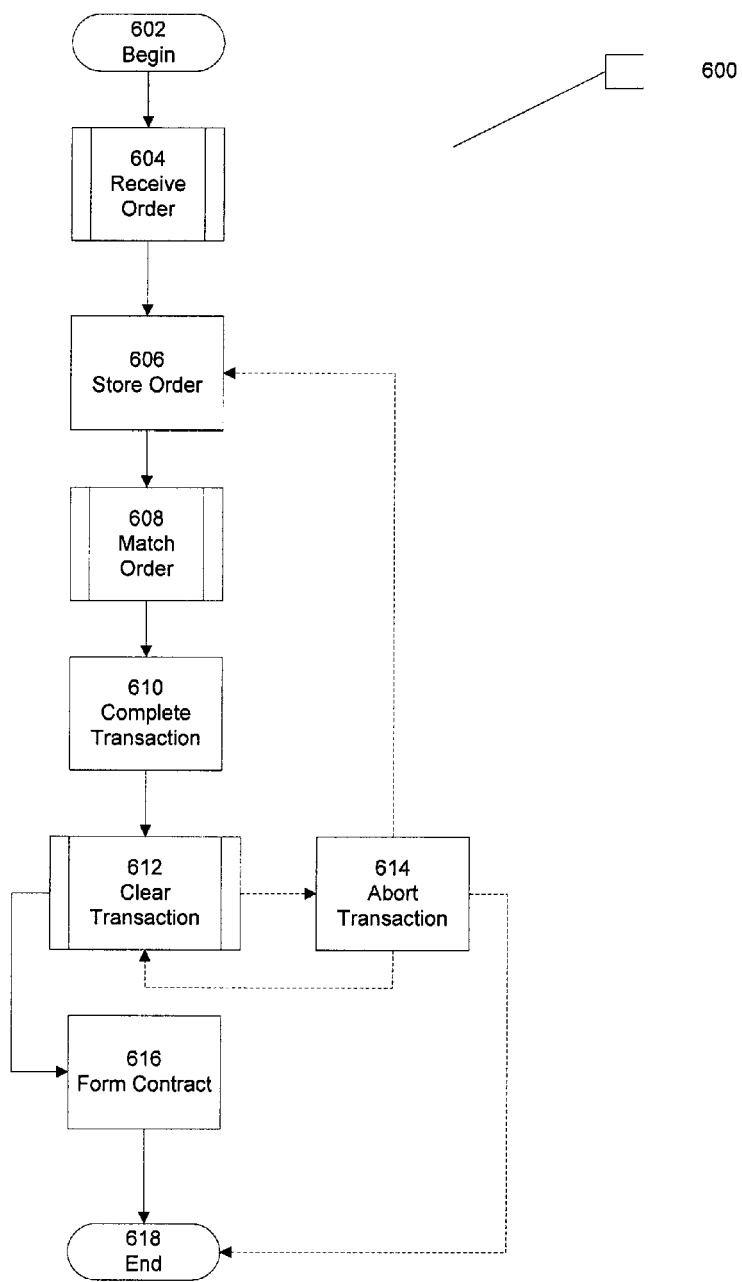
FIG. 6 is flow chart of a process for forming a credit default or bond recovery rate contract according to another embodiment.

The PODM system 112 may be used to perform various processes in accord with the present inventions. For example, FIG. 6 illustrates one such embodiment, process 600. At block 602, process 600 begins. At block 604, a system executing process 600 receives a trade order. The trade order may be any trade request as discussed above including a request to buy a credit futures or bond recovery rate futures contract or a request to sell a credit futures or bond recovery rate futures contract. The trade order may be subject to price restrictions, as discussed above. Referring back to FIG. 2, in one embodiment, the system may receive the trade order via the order interface 202.

Figure 7:
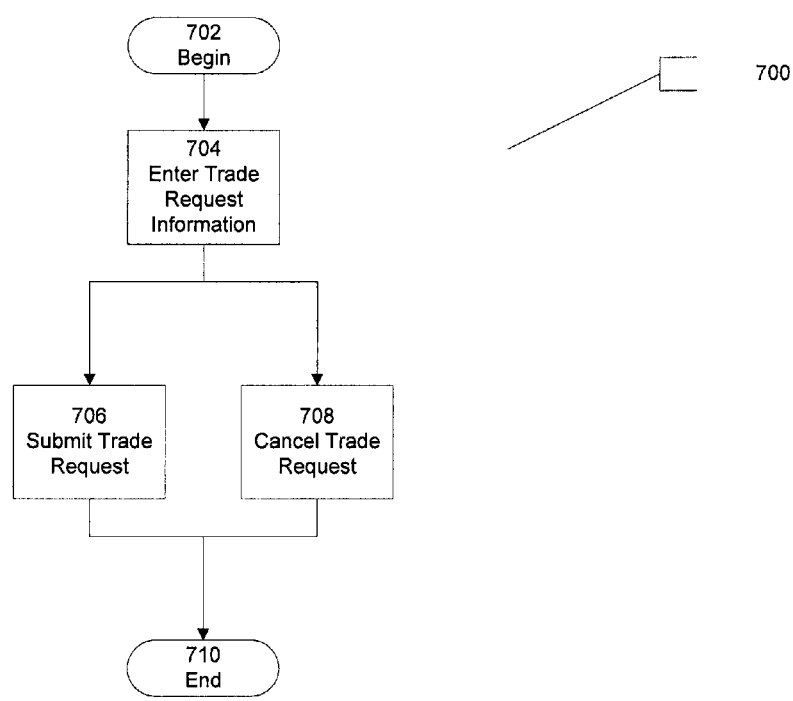
FIG. 7 is a flow chart of a process for receiving trade orders of credit futures contracts or bond recovery rate contracts according to an embodiment.

More particularly, FIG. 7 shows one embodiment of a process 700 for placing a trade request, by which a system executing process 600 may receive a trade order. At block 702, process 700 begins. At block 704, a trader may enter information required to place a trade into a user interface. This information may include various characteristics of the credit futures or bond recovery rate futures contract, including futures contract type (e.g. POD™ futures, REC futures, POD™ index futures, REC index futures, or POD™ index tranche futures), face value, term, entity or entities referenced, tranche series, price restrictions and position sought (long or short) etc. . . .

At block 706, the trader may submit the trade request by actuating a user interface element designated for submission of trade requests. After the trader submits the trade request, a system executing process 600 may further process the trade request as discussed further below. Alternatively, at block 708, a trader may cancel the trade request by actuating a user interface element designated for cancellation of trade requests. At block 710, process 700 ends.

Referring back to FIG. 6, at block 606, a system executing process 600 stores the order. The system may store the order in any computer readable medium including volatile and non-volatile memory implemented in magnetic media, optical media or otherwise. Furthermore, the system may store the order in any logical data structure including flat files, indexed files or databases. Referring back to FIG. 2, in one embodiment the system may store the order in the trade requests database 204.

At block 608, a system executing process 600 may match countervailing orders. The system may perform this matching continuously or periodically. As discussed above, in one embodiment, the matching process may actively only during specified time periods, for example 6:30 PM to 4:00 PM, Eastern Standard Time, Sunday to Friday of each week. Referring back to FIG. 2, in one embodiment, the system may match orders using the auction engine 122 and may move completed transactions to the completed transactions database 210.

Figure 8:
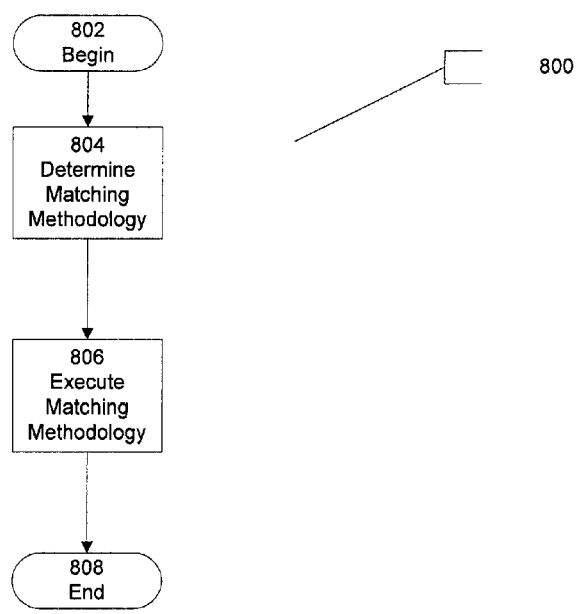
FIG. 8 is a flow chart of a process for matching trade orders of credit futures contacts or bond recovery rate contracts according to an embodiment.

More particularly, FIG. 8 illustrates one embodiment of a process 800 for matching trade requests. At block 802, process 800 begins. At block 804, a system executing process 800 may determine a matching methodology. In one embodiment, trade requests may be matched continuously and may be given priority on a first-come, first-served basis. In another embodiment, the system may attempt to match all trade requests belonging to by priority group or tier, prior to matching other trade requests. Membership in a tier may be based on any characteristic of trade requests, such as, for example, the price restrictions included in a trade request. For instance, the system may group all market buy and sell orders into a first tier and attempt match the first tier requests prior to identifying and matching other tiers. This embodiment may provide for a more efficient matching process as market buy and sell orders are less restrictive than other types of orders, and thus are more likely to be matched by the system.

Other embodiments may employ other matching methodologies and may combine matching methodologies, for example, one embodiment may use tier based priority matching with first-come, first-served matching within each tier.

At block 806, a system executing process 800 may employ the matching methodology to match offsetting orders based at least in part on any of the characteristics that may vary according to credit futures or bond recovery rate futures contract. For example, the system may match based on the futures contract type (e.g. POD™ futures, REC futures, POD™ index futures, REC index futures or POD™ index tranche futures), face value, term, entity or entities referenced, tranche series and price restrictions. The system may employ indexes into the trade orders while searching for matches. In one embodiment, the system may search using the most statistically discriminating index first, followed by other indexes or sequential searching until a match for the current target trade request is found. Once a match is found, the two offsetting orders may form the basis of a completed transaction. At block 808, process 800 ends.

Referring back to FIG. 6, at block 610, a system executing process 600 may complete a transaction including the matched orders. In one embodiment, a system executing process 600 may complete the transaction by modifying the trade orders to have a "complete" status. In another embodiment, the system may also complete a transaction by removing the orders from their current storage location and placing the orders, or some transformation of them, in the same or a different logical or physical storage location. Referring back to FIG. 2, in one embodiment, the system may complete a transaction by, at least in part, removing the orders that make up the transaction from the trade requests database 204 and storing the completed transaction in the completed transactions database 210.

Figure 9:
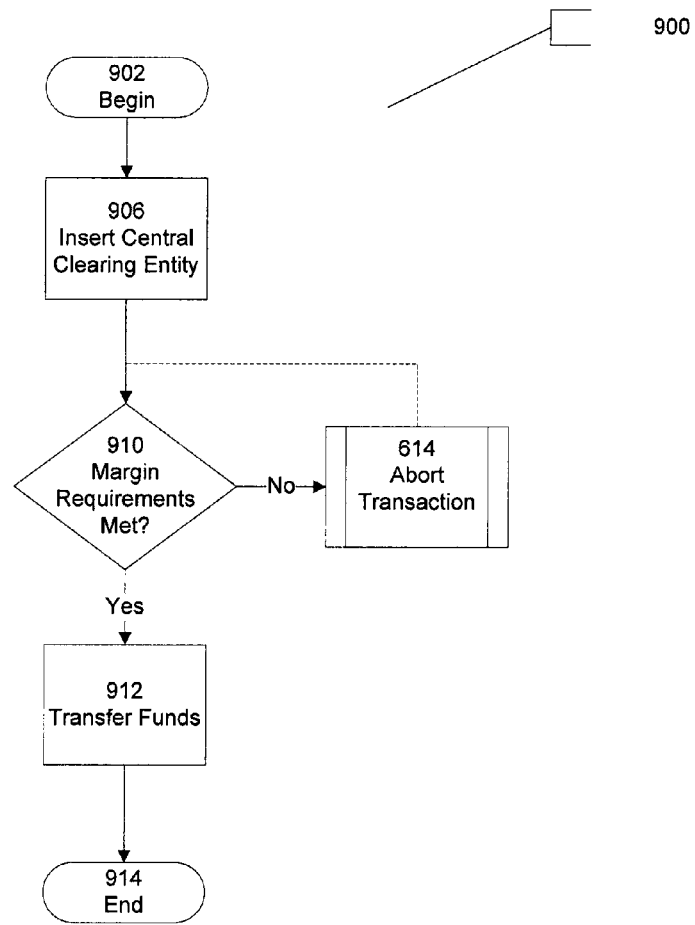
FIG. 9 is flow chart of a process for clearing credit future contract or bond recovery rate contract transactions according to an embodiment.

At block 612, a system executing process 600 may clear a transaction. FIG. 9 shows, with more particularity, one embodiment of a process 900 for clearing a transaction. At block 902, process 900 begins. At block 906, the system may insert the central clearing entity as the counterparty for each original party to the transaction. Record of the introduction of a central clearing entity may be made in a database administered by the system, such as completed transactions database 222. As central clearing entities are typically well capitalized institutions, this aspect may provide less risk to each original party.

At block 910, the system may determine if one of the parties to the transaction has sufficient credit and/or holdings within their account to meet margin requirements prior to continuing with the clearing process. These margin requirements may be set by various industry or exchange standards.

If the margin requirements are not met, the system may abort the transaction using block 614.

At block 912, a system executing process 900 may clear the transaction by transferring currency from one trading account to another. More specifically, the system may transfer funds to or from the counterparty of the seller to the seller. The system may also transfer funds to or from the buyer to the counterparty of the buyer. Alternatively, the system may clear a transaction by requesting a funds transfer through a user or system interface to a separate financial institution.

At block 914 process 900 ends. Referring back to FIG. 2, in one embodiment, the system clears transactions using the clearing interface 214.

Referring again to FIG. 6, at block 614, a system executing process 600 may abort a transaction. In one embodiment, the system may notify the party that is unable to honor the transaction of its deficiency. The system may request that the deficient party remedy its current state by providing any resources required to complete the transaction, for example by issuing a margin call to the deficient party. As previously discussed, the system may also have replaced the deficient party with another party, such as a central clearing entity, thus enabling partial settlement of the transaction with the non-deficient party. In one embodiment, if the deficient party does meet its margin call obligations, a system executing process 600 may close the deficient party's positions via appropriate trade orders. Referring back to FIG. 2, in one embodiment, the system may abort a transaction using the clearing interface 214.

At block 616, a system executing process 600 forms a contract. In one embodiment, the system forms the contract by recording each party's contractual long and short positions.

At block 618, process 600 ends.

Each of process 600, 700, 800 and 900 depicts one particular sequence of acts in a particular embodiment. Other actions can be added, or the order of actions can be altered in these methods without departing from the scope of the present invention.

Figure 10:
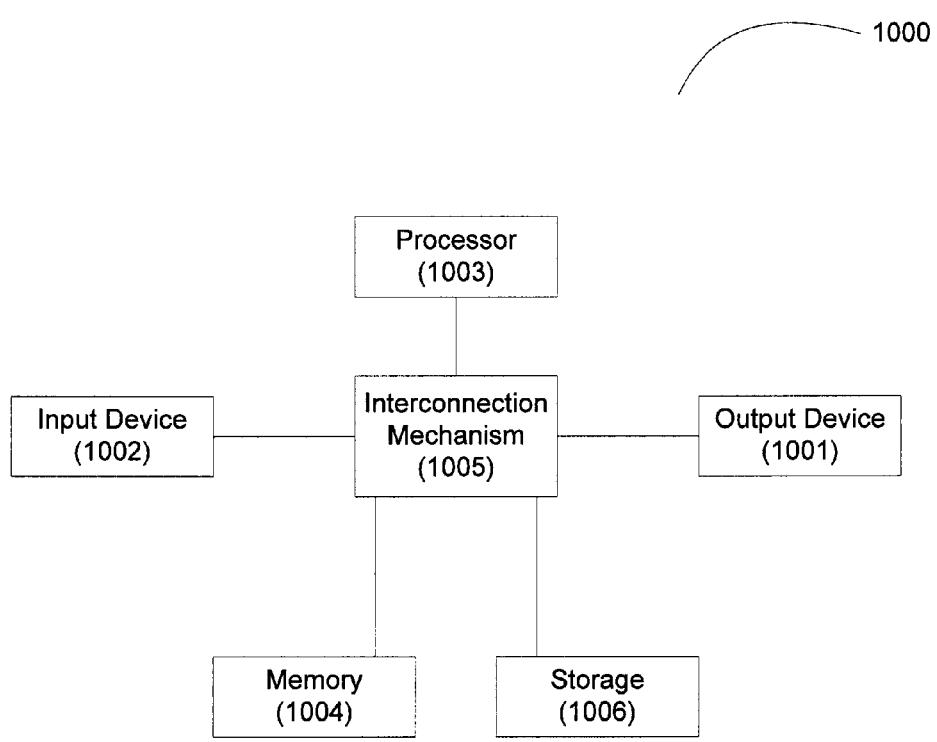
FIG. 10 shows a general-purpose computer system upon which various embodiments may be practiced.

As discussed above, various aspects disclosed herein may be implemented as specialized software executing in a computer system 1000 such as that shown in FIG. 10. Computer system 1000 may include one or more output devices 1001, one or more input devices 1002, a processor 1003 connected to one or more memory devices 1004 through an interconnection mechanism 1005 and one or more storage devices 1006 connected to interconnection mechanism 1005. Output devices 1001 typically render information for external presentation and examples include a monitor and a printer. Input devices 1002 typically accept information from external sources and examples include a keyboard and a mouse. Processor 1003 typically performs a series of instructions resulting in data manipulation. Processor 1003 is typically a commercially available processor such as an Intel Xeon, Itanium, Core, Celeron, or Pentium, AMD Opteron, Sun UltraSPARC, IBM Power5+, or IBM mainframe chip technology, but may be any type of processor. Memory devices 1004, such as a disk drive, memory, or other device for storing data is typically used for storing programs and data during operation of the computer system 1000. Devices in computer system 1000 may be coupled by at least one interconnection mechanism 1005, which may include, for example, one or more communication elements (e.g., busses) that communicate data within system 1000.

Figure 11:
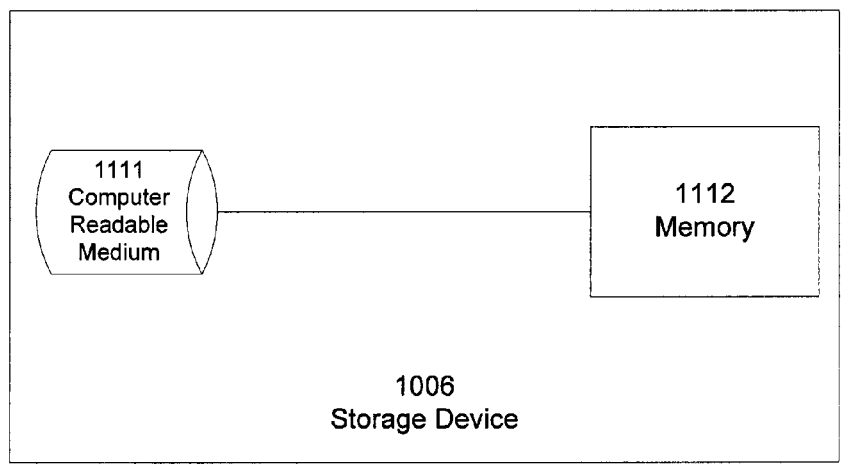
FIG. 11 illustrates a storage device of a general-purpose computer system suitable for implementing various embodiments.

The storage device 1006, shown in greater detail in FIG. 11, typically includes a computer readable and writeable nonvolatile recording medium 1111 in which signals are stored that define a program to be executed by the processor or information stored on or in the medium 1111 to be processed by the program. The medium may, for example, be a disk or flash memory. Typically, in operation, the processor causes data to be read from the nonvolatile recording medium 1111 into another memory 1112 that allows for faster access to the information by the processor than does the medium 1111. This memory 1112 is typically a volatile, random access memory such as a dynamic random access memory (DRAM), static memory (SRAM). Memory 1112 may be located in storage device 1006, as shown, or in memory device 1004. The processor 1003 generally manipulates the data within the memory 1004, 1112 and then copies the data to the medium 1111 after processing is completed. A variety of mechanisms are known for managing data movement between the medium 1111 and the memory 1004, 1112, and embodiments are not limited thereto. Embodiments are not limited to a particular memory device 1004 or storage device 1006.

Computer system 1000 may be implemented using specially programmed, special purpose hardware, or may be a general-purpose computer system that is programmable using a high-level computer programming language. For example, computer system 1000 may include cellular phones, personal digital assistants and/or other types of mobile computing devices. Moreover, a computing device may include any sort of computer such as a personal computer, a workstation, a mainframe, a networked client, a server, media servers and application servers. Computer system 1000 usually executes an operating system which may be, for example, the Windows XP, Windows Vista or other operating systems available from the Microsoft Corporation, MAC OS System X available from Apple Computer, the Solaris Operating System available from Sun Microsystems, or UNIX operating systems available from various sources (e.g., Linux). Many other operating systems may be used, and embodiments are not limited to any particular implementation. For example, an embodiment may process a trade request using a general-purpose computing device with a Sun UltraSPARC processor running the Solaris operating system.

Although computer system 1000 is shown by way of example as one type of computer system upon which various aspects of embodiments may be practiced, it should be appreciated that embodiments are not limited to being implemented on the computer system as shown in FIG. 11. Various aspects of embodiments may be practiced on one or more computer systems having a different architecture or components than that shown in FIG. 11. To illustrate, one embodiment may receive search criteria using several general-purpose computing devices running Windows Vista with Intel processors and several specialized computing devices running proprietary hardware and operating systems.

Figure 12:
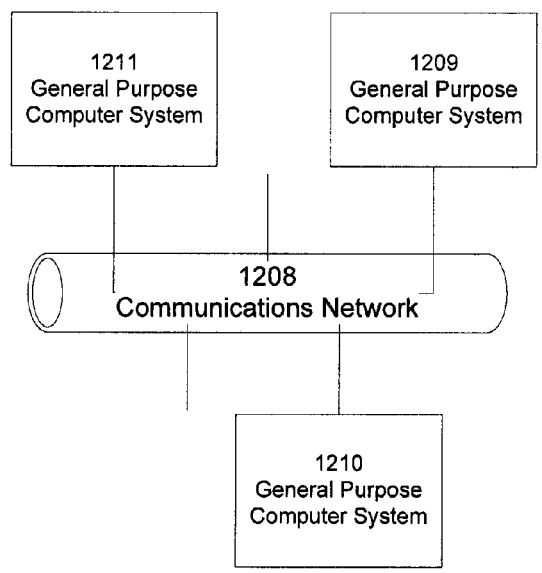
FIG. 12 depicts a network of general-purpose computer systems in which various embodiments may be practiced.

As depicted in FIG. 12, one or more portions of the system may be distributed to one or more computers (e.g., devices 1209-1211) coupled to communications network 1208. These computer systems 1209-1211 may also be general-purpose computer systems. For example, various aspects may be distributed among one or more computer systems configured to provide a service (e.g., servers) to one or more client computers, or to perform an overall task as part of a distributed system. More particularly, various aspects may be performed on a client-server system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). To illustrate, one embodiment may report market information though a browser interpreting HTML forms and may replicate account balance information using a data translation service running on a separate server.

Various embodiments may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects may be implemented in a non-programmed environment (e.g., documents created in HTML, XML or other format that, when viewed in a window of a browser program, render aspects of a graphical-user interface (GUI) or perform other functions). Various aspects may be implemented as programmed or non-programmed elements, or any combination thereof. For example, an order interface may be implemented using a Microsoft Excel spreadsheet while the auction engine may be written in C++.

It should be appreciated that a general-purpose computer system may perform functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB of UPPSALA, Sweden and WebSphere middleware from IBM of Armonk, N.Y. If SQL Server is installed on a general-purpose computer system to implement an embodiment, the same general-purpose computer system may be able to support databases for sundry applications.

Based on the foregoing disclosure, it should be apparent to one of ordinary skill in the art that the invention is not limited to a particular computer system platform, processor, operating system, network, or communication protocol. Also, it should be apparent that the present invention is not limited to a specific architecture or programming language.

Having now described some illustrative aspects of the invention, it should be apparent to those skilled in the art that the foregoing is merely illustrative and not limiting, having been presented by way of example only. While the bulk of this disclosure is focused on embodiments including futures contracts with a settlement value based on a credit default state that is trigger by a credit default event, other binary reference events may be the basis of future contracts in accordance to the present invention. For example, according to one embodiment, market participants may deal in futures contracts with a binomial settlement value based on the occurrence, or non-occurrence, of an event that damages insured property, such as a hurricane. Similarly, aspects of the present invention may be used to achieve other objectives including allowing insurance companies to hedge against the occurrence of a hurricane in a specific part of the country. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

What is claimed is:

1. A method for exchanging credit futures contracts comprising:

receiving, by a computer, a first trade order from a first party requesting a long position on a bond recovery rate (REC) futures contract, the REC futures contract having a reference entity, a maturity date and a settlement price at the maturity date based at least in part on solvency of the reference entity and a realized bond recovery rate of the reference entity;

receiving, by the computer, a second trade order from a second party requesting a short position on the REC futures contract;

matching, by the computer, the first trade order with the second trade order;

recording, on a computer readable storage medium, a completed transaction, the completed transaction indicating the first trade order, the second trade order, and a traded price;

determining, by the computer, a daily settlement price for the REC futures contract for each day of trading of the REC futures contract;

determining, by the computer, a daily settlement payment between the first party and the second party based on the daily settlement price;

determining the settlement price based at least in part on the solvency of the reference entity;

determining, by the computer, a final settlement payment between the first party and the second party based on the settlement price, the first party and the second party both being obligated to settle the REC futures contract at the final settlement price via a payment of the final settlement payment, the final settlement payment being paid by the first party to the second party if the reference entity is solvent at the maturity date and the final settlement payment being paid by the second party to the first party if the reference entity is insolvent at the maturity date; and recording on a computer readable storage medium, settlement of the REC futures contract at the final settlement price.

2. The method of claim 1, wherein the method further comprises determining whether the first party has sufficient resources to meet a margin requirement for the position requested in the first trade order.

3. The method of claim 1, wherein the method further comprises recording a clearing house as a counterparty to both the first party and the second party.

4. The method of claim 1, further comprising settling the REC futures contract to a realized bond recovery rate multiplied by 100 and by a multiplier, the multiplier being a fixed dollar amount, when the reference entity is insolvent at the maturity date.

5. The method of claim 4, wherein the fixed dollar amount is $10,000.

6. The method of claim 1, further comprising settling the REC futures contract to a fixed amount when the reference entity is solvent at the maturity date.

7. The method of claim 6, wherein the fixed amount is an amount selected from a group consisting of: zero and an amount near zero.

8. The method of claim 1, further comprising settling the REC futures contract in kind at a time prior to the maturity date.

9. The method of claim 8, wherein settling the REC futures contract in kind comprises settling the REC futures contract in kind based at least in part on a comparison between the maturity date and an identified date.

10. The method of claim 9, wherein settling the REC futures contract in kind comprises settling the REC futures contract in kind when a difference between the maturity date and the identified date is a fixed time period longer than the difference between the current date and the maturity date of the shortest maturity offered.

11. The method of claim 8, wherein settling the REC futures contract in kind comprises settling the REC futures contract into a series of REC futures contracts, each of the series of REC futures contracts having a reference entity, a maturity date and a settlement price at the maturity date based at least in part on solvency of the reference entity and a bond recovery rate in the event that the reference entity is insolvent, none of the series of REC futures contracts sharing a common maturity date.

12. The method of claim 11, wherein each of the series of REC futures contracts has a maturity date based on a shorter time interval than the original REC futures contract.

13. The method of claim 11, further comprising settling each of the series of REC futures contracts subsequent to one of the series of REC futures contracts when the one of the series of REC futures contracts is settled early due to the occurrence of a default by the reference entity.

14. A method for exchanging futures contracts comprising:
recording, on a computer readable storage medium, a completed transaction including:
at least one first trade order from a first party requesting a long position on a series of bond recovery rate (REC) futures contracts, each of the series of futures contracts having at least one of reference entity and a settlement price at a maturity date, the settlement price at the maturity date being based at least in part on solvency of the at least one reference entity and a realized bond recovery rate of the reference entity, none of the series of futures contracts sharing a common maturity date;
at least one second trade order from a second party requesting a short position on the series of futures contracts; and
a traded price for each of the series of REC futures contracts;
matching, by the computer, the first trade order with the second trade order;
determining, by the computer, for each of the REC futures contracts, a daily settlement price for the REC futures contract for each day of trading of the REC futures contract;
determining, by the computer, for at least one of the REC futures contracts, a daily settlement payment between the first party and the second party based on the daily settlement price;
determining, for each of the REC futures contracts, the settlement price based at least in part on the solvency of the reference entity;
determining, by the computer, for at least one of the REC futures contracts, a final settlement payment between the first party and the second party based on the settlement price, the first party and the second party both being obligated to settle the REC futures contract at the final settlement price via a payment of the final settlement payment, the final settlement payment being paid by the first party to the second party if the reference entity is solvent at the maturity date and the final settlement payment being paid by the second party to the first party if the reference entity is insolvent at the maturity date; and
recording on a computer readable storage medium, for each of the REC futures contracts, settlement of the REC futures contract at the final settlement price.

15. The method of claim 14, wherein recording, on a computer readable storage medium, a completed transaction comprises recording a long position on a series of bond recovery rate index futures contracts and recording a short position on the series of bond recovery rate index futures contracts.

16. The method of claim 14, wherein recording, on a computer readable storage medium, a completed transaction comprises recording a long position on a series of bond recovery rate index tranche futures contracts and recording a short position on the series of bond recovery rate index tranche futures contracts.

17. A computer readable storage medium comprising computer readable instructions that, as a result of being executed by a processor, instruct the processor to perform a method, the method comprising:
receiving, by the processor, a first trade order from a first party requesting a long position on a bond recovery rate (REC) futures contract, the REC futures contract having a reference entity, a maturity date and a settlement price at the maturity date based at least in part on solvency of the reference entity and a realized bond recovery rate of the reference entity;
receiving, by the processor, a second trade order from a second party requesting a short position on the REC futures contract;
matching, by the processor, the first trade order with the second trade order;
recording, on a computer readable storage medium, a completed transaction, the completed transaction indicating the first trade order, the second trade order, and a traded price;
determining, by the processor, a daily settlement price for the REC futures contract for each day of trading of the REC futures contract;
determining, by the processor, a daily settlement payment between the first party and the second party based on the daily settlement price;
determining the settlement price based at least in part on the solvency of the reference entity;
determining, by the processor, a final settlement payment between the first party and the second party based on the settlement price, the first party and the second party both being obligated to settle the REC futures contract at the final settlement price via a payment of the final settlement payment, the final settlement payment being paid by the first party to the second party if the reference entity is solvent at the maturity date and the final settlement payment being paid by the second party to the first party if the reference entity is insolvent at the maturity date; and
recording on a computer readable storage medium, settlement of the REC futures contract at the final settlement price.

18. A system for providing a bond recovery rate futures contract exchange comprising:
a computer;
the computer having computer readable storage media with instructions stored therein that when executed by the computer cause the computer to implement:
an order interface configured to receive a first trade order from a first party requesting a long position on a bond recovery rate (REC) futures contract and a second trade order from a second party requesting a short position on the REC futures contract, the REC futures contact having at least one reference entity, a maturity date and a settlement price at the maturity date based at least in part on solvency of the at least one reference entity and a realized bond recovery rate of the reference entity;

an auction engine configured to match the first and second trade orders and store the first and second trade orders as completed transactions; and a settlement engine configured to
determine a daily settlement price for the REC futures contract for each day of trading of the REC futures contract;
determine a daily settlement payment between the first party and the second party based on the daily settlement price;
determine the settlement price based at least in part on the solvency of the reference entity;
determine a final settlement payment between the first party and the second party based on the settlement price, the first party and the second party both being obligated to settle the REC futures contract at the final settlement price via a payment of the final settlement payment, the final settlement payment being paid by the first party to the second party if the reference entity is solvent at the maturity date and the final settlement payment being paid by the second party to the first party if the reference entity is insolvent at the maturity date; and
record on a computer readable storage medium, settlement of the REC futures contract at the final settlement price.

19. The system of claim 18, wherein the futures contract comprises a contract selected from a group consisting of a REC futures contract, a bond recovery index futures contract, and a bond recovery rate index tranche futures contract.

20. The system of claim 18, wherein having a probability of default futures contract traded on an exchange allows for the determination of a market value for the probability of default that is independent of the expected bond recovery rate.

21. The system of claim 18, wherein having a probability of default futures contract and a REC futures contract traded on an exchange allows for the determination of a market value for the expected bond recovery rate.

22. The system of claim 18, wherein having probability of default index futures contract and probability of default index tranche futures contract traded on an exchange allows for price discovery for systemic and idiosyncratic risks.

23. A method for exchanging an index of bond recovery rate (REC) futures contracts comprising:
receiving, by a computer, a first trade order requesting a long position on the index, the index having an index settlement price based at least in part on a plurality of REC futures contracts, each of the REC futures contracts having a reference entity, a maturity date and an REC settlement price at the maturity date based at least in part on solvency of the reference entity and a realized bond recovery rate of the reference entity;
receiving, by the computer, a second trade order from a second party requesting a short position on the index;
matching, by the computer, the first trade order with the second trade order;
recording, on a computer readable storage medium, a completed transaction, the completed transaction indicating the first trade order, the second trade order, and a traded price;
determining, for each of the REC futures contracts, a daily settlement price for the REC futures contract for each day of trading of the REC futures contract;
determining, for each of the REC futures contracts, the REC settlement price based at least in part on the solvency of the reference entity;
determining, by the computer, the index settlement price, the index settlement price being based on the settlement prices of each of the REC futures contracts at the maturity date;
determining, by the computer, a final index settlement payment between the first party and the second party based on the settlement price, the first party and the second party both being obligated to settle the index at the index settlement price via a payment of the final index settlement payment, wherein (1) the final index settlement payment is owed by the first party to the second party if all of the reference entities are solvent at the maturity date, (2) the final index settlement payment is owed by the second party to the first party if all of the reference entities are insolvent at the maturity date, and (3) if some of the reference entities are solvent and some of the reference entities are insolvent at the maturity date, the final index settlement payment is owed either by the first party to the second party or by the second party to the first party, depending on how many of the reference entities are solvent and how many of the reference entities are insolvent; and
recording on a computer readable storage medium, settlement of the index at the index settlement price.

24. The method of claim 23, further comprising settling the index in kind at a time prior to a maturity date of the index.

25. The method of claim 24, wherein settling the index in kind comprises settling the index in kind based at least in part on a comparison between the maturity date and an identified date.

26. The method of claim 24, wherein settling the index in kind comprises settling the index in kind when a difference between the maturity date and the identified date is a fixed time period longer than the difference between the current date and the shortest maturity offered.

27. The method of claim 24, wherein settling the index in kind comprises settling the index into a series of index contracts, each of the series of index contracts having a settlement value based at least in part on a plurality of REC futures contract, none of the series of index contracts sharing a common maturity date.

28. The method of claim 24, wherein settling the index in kind comprises settling the index into a series of index contracts, each of the series of index contracts having a maturity date shorter than the time to maturity of the original index.

29. The method of claim 25, wherein the shorter maturity date is a quarterly maturity date.

30. The method of claim 24, further comprising settling each of the series of index contracts subsequent to one of the series of index contracts when the one of the series of index contracts settles to one of the series of index contracts when the one of the series of index contracts settles to the realized recovery rate for REC index futures contract.

31. A method for exchanging a tranche in an index of bond recovery rate fREC) futures contracts comprising:
receiving, by a computer, a first trade order requesting a long position on the tranche, the tranche having a tranche settlement price based at least in part on an index settlement price of the index, the index settlement price being based at least in part on a plurality of REC futures contracts, each of the REC futures contracts having a reference entity, a maturity date and a REC settlement price at the maturity date based at least in part on solvency of the reference entity and a realized bond recovery rate of the reference entity;

receiving, by the computer, a second trade order requesting a short position on the tranche;

matching, by the computer, the first trade order with the second trade order;

recording, on a computer readable storage medium, a completed transaction, the completed transaction indicating the first trade order, the second trade order, and a traded price;

determining, for each of the REC futures contracts, a daily settlement price for the REC futures contract for each day of trading of the REC futures contract;

determining, for each of the REC futures contracts, the REC settlement price based at least in part on the solvency of the reference entity;

determining, by the computer, the index settlement price, the index settlement price being based on the settlement prices of each of the REC futures contracts at the maturity date;

determining, by the computer, a final tranche settlement payment between the first party and the second party based on the settlement price, the first party and the second party both being obligated to settle the index at the index settlement price via a payment of the final tranche settlement payment, wherein (1) the final tranche settlement payment is owed by the first party to the second party if all of the reference entities are solvent at the maturity date, (2) the final tranche settlement payment is owed by the second party to the first party if all of the reference entities are insolvent at the maturity date, and (3) if some of the reference entities are solvent and some of the reference entities are insolvent at the maturity date, the final tranche settlement payment is owed either by the first party to the second party or by the second party to the first party, depending on how many of the reference entities are solvent and how many of the reference entities are insolvent; and recording on a computer readable storage medium, settlement of the tranche at the tranche settlement price.

32. The method of claim 31, further comprising settling the tranche in kind at a time prior to a maturity date of the tranche.

33. The method of claim 32, wherein settling the tranche in kind comprises settling the tranche in kind based at least in part on a comparison between the maturity date and an identified date.

34. The method of claim 33, wherein settling the tranche in kind comprises settling the tranche in kind when a difference between the maturity date and the identified date is a fixed time period longer than the difference between the current date and the maturity date of the shortest maturity offered.

35. The method of claim 33, wherein settling the tranche in kind comprises settling the tranche into a series of tranche contracts, each of the series of tranche contracts having a settlement price based at least in part on the index settlement price of the index, none of the series of tranche contracts sharing a common maturity date.

36. The method of claim 33, wherein settling the tranche in kind comprises settling the tranche into a series of tranche contracts, each of the series of tranche contracts having a maturity date shorter than the time to maturity of the original tranche.

37. The method of claim 31, wherein the shorter maturity date is a quarterly maturity date.

38. The method of claim 36, further comprising settling each of the series of tranche contracts subsequent to one of the series of tranche contracts when the one of the series of tranche contracts settles to an average recovery rate for REC futures contract.

39. A method for exchanging a series of futures contracts comprising:

receiving, by a computer, a first trade order from a first party requesting a long position on at least one of the series of futures contracts, the series of futures contracts having a risk period substantially equivalent to a risk period of a previously traded futures contract, each of the series of futures contracts having a maturity date, none of the series of futures contracts sharing a common maturity date, each of the series of futures contracts having a settlement price at the maturity date being at least in part on solvency of at least one reference entity;

receiving, by a computer, a second trade order from a second party requesting a short position on the at least one of the series of futures contracts;

matching the first trade order with the second trade order;

recording, on a computer readable storage medium, a completed transaction, the completed transaction indicating the first trade order, the second trade order, and a traded price;

determining, by the computer, for each of the futures contracts, a daily settlement price for the futures contract for each day of trading of the futures contract;

determining, by the computer, for at least one of the futures contracts, a daily settlement payment between the first party and the second party based on the daily settlement price;

determining, for each of the futures contracts, the settlement price based at least in part on the solvency of the reference entity;

determining, by the computer, for at least one of the futures contracts, a final settlement payment between the first party and the second party based on the settlement price, the first party and the second party both being obligated to settle the futures contract at the final settlement price via a payment of the final settlement payment, the final settlement payment either being paid by the first party to the second party or being paid by the second party to the first party depending on the solvency of the reference entity at the maturity date; and recording on a computer readable storage medium, for each of the futures contracts, settlement of the futures contract at the final settlement price.

40. The method of claim 39, wherein receiving a first trade order comprises receiving a first trade order requesting a long position on at least one of the series of futures contracts, each of the series of futures contracts having a quarterly maturity date.

41. A method of creating a financial position comprising:

receiving, by a computer, a first trade order from a first party requesting a short position on a probability of default futures contract, the probability of default futures contract having a reference entity and a maturity date, a probability of default settlement price at the maturity date based at least in part on the solvency of the reference entity, the probability of default futures contract having first and second potential settlement prices at the maturity date that are predetermined prior to a beginning of a term of the probability of default futures contract, the first party holding a financial instrument in the reference entity;

receiving, by the computer, a second trade order from the first party, the second order requesting a short position on a bond recovery rate (REC) futures contract with a notional amount equal to the financial instrument exposure, the REC futures contract having the same reference entity and an REC settlement price at the maturity date based at least in part on solvency of the reference entity and a realized bond recovery rate of the reference entity;

receiving, by the computer, a third trade order from a second party requesting a long position on the probability of default futures contract;

receiving, by the computer, a fourth trade order from a third party requesting a long position on the REC futures contract;

matching the computer, the first trade order and the third trade order;

matching the computer, the second trade order and the fourth trade order;

recording, on a computer readable storage medium, a completed transaction, the completed transaction indicating the first trade order, the second trade order, the third trade order, and the fourth trade order;

determining, by the computer, a daily probability of default settlement price for the probability of default futures contract for each day of trading of the probability of default futures contract;

determining, by the computer, a daily probability of default settlement payment between the first party and the second party based on the daily probability of default settlement price;

selecting one of the first and second potential settlement prices to be a final probability of default settlement price of the probability of default futures contract, the selecting being performed based at least in part on solvency of the reference entity;

determining, by the computer, a final probability of default settlement payment between the first party and the second party based on the final settlement price, the first party and the second party both being obligated to settle the probability of default futures contract at the final probability of default settlement price via a payment of the final probability of default settlement payment, the final probability of default settlement payment being paid by the first party to the second party if the reference entity is solvent at the maturity date and the final probability of default settlement payment being paid by the second party to the first party if the reference entity is insolvent at the maturity date;

determining, by the computer, a daily REC settlement price for the REC futures contract for each day of trading of the REC futures contract;

determining, by the computer, a daily REC settlement payment between the first party and the third party based on the daily settlement price;

determining the REC settlement price based at least in part on the solvency of the reference entity;

determining, by the computer, a final REC settlement payment between the first party and the third party based on the REC settlement price, the first party and the third party both being obligated to settle the REC futures contract at the final REC settlement price via a payment of the final REC settlement payment, the final REC settlement payment being paid by the first party to the third party if the reference entity is insolvent at the maturity date and the final REC settlement payment being paid by the third party to the first party if the reference entity is solvent at the maturity date; and recording on a computer readable storage medium, settlement of the probability of default futures contract at the final probability of default settlement price and settlement of the REC futures contract at the final REC settlement price.

42. The method of claim 41, wherein the financial instrument is an instrument selected from a group consisting of a bond and a short position in a credit default swap.

43. The method of claim 42, wherein the short position on a probability of default futures contract is a short position on an index of probability of default futures contract, the short position on REC futures contract is a short position on an index of REC futures contract, and the financial instrument is a plurality of financial instruments.

44. The method of claim 43, wherein the plurality of financial instruments is a plurality selected from a group consisting of a portfolio of bonds and a portfolio of short positions in credit default swaps.

45. A method of creating a financial position comprising receiving, by a computer, a first trade order from a first party requesting a long position on a probability of default futures contract, the probability of default futures contract having a reference entity and a maturity date, a probability of default settlement price at the maturity date based at least in part on the solvency of the reference entity, the probability of default futures contract having first and second potential settlement prices at the maturity date that are predetermined prior to a beginning of a term of the probability of default futures contract;

receiving, by the computer, a second trade order from the first party, the second order requesting a long position on a bond recovery rate (REC) futures contract, the REC futures contract having the same reference entity and an REC settlement price at the maturity date based at least in part on solvency of the reference entity and on a realized bond recovery rate of a funded bond of the reference entity;

receiving, by the computer, a third trade order from a second party requesting a short position on the probability of default futures contract;

receiving, by the computer, a fourth trade order from a third party requesting a short position on the REC futures contract;

matching the computer, the first trade order and the third trade order;

matching the computer, the second trade order and the fourth trade order;

recording, on a computer readable storage medium, a completed transaction, the completed transaction indicating the first trade order, the second trade order, the third trade order, and the fourth trade order;

determining, by the computer, a daily probability of default settlement price for the probability of default for each day of trading of the probability of default futures contract;

determining, by the computer, a daily probability of default settlement payment between the first party and the second party based on the daily probability of default settlement price;

selecting one of the first and second potential settlement prices to be a final probability of default settlement price of the probability of default futures contract, the selecting being performed based at least in part on solvency of the reference entity;

determining, by the computer, a final probability of default settlement payment between the first party and the second party based on the final settlement price, the first party and the second party both being obligated to settle the probability of default futures contract at the final probability of default settlement price via a payment of the final probability of default settlement payment, the final probability of default settlement payment being paid by the first party to the second party if the reference entity is insolvent at the maturity date and the final probability of default settlement payment being paid by the second party to the first party if the reference entity is solvent at the maturity date;

determining, by the computer, a daily REC settlement price for the REC futures contract for each day of trading of the REC futures contract;

determining, by the computer, a daily REC settlement payment between the first party and the third party based on the daily settlement price;

determining the REC settlement price based at least in part on the solvency of the reference entity;

determining, by the computer, a final REC settlement payment between the first party and the third party based on the REC settlement price, the first party and the third party both being obligated to settle the REC futures contract at the final REC settlement price via a payment of the final REC settlement payment, the final REC settlement payment being paid by the first party to the third party if the reference entity is solvent at the maturity date and the final REC settlement payment being paid by the third party to the first party if the reference entity is insolvent at the maturity date; and whereby the combination of the completed transaction and a government bond provide the user with the returns of a synthetic corporate bond.

46. The method of claim 45, wherein the long position on a probability of default futures contract is a long position on an index of probability of default futures contract and the long position on REC futures contract is a long position on an index of REC futures contract.

\* \* \* \* \*